(12) United States Patent
Kusashima et al.

(10) Patent No.: US 10,172,125 B2
(45) Date of Patent: Jan. 1, 2019

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Naoki Kusashima, Sakai (JP); Wataru Ouchi, Sakai (JP); Kazuyuki Shimezawa, Sakai (JP); Takashi Hayashi, Sakai (JP); Alvaro Ruiz Delgado, Sakai (JP); Toshizo Nogami, Sakai (JP); Kimihiko Imamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 104 days.

(21) Appl. No.: 15/307,034

(22) PCT Filed: Apr. 24, 2015

(86) PCT No.: PCT/JP2015/062576
§ 371 (c)(1),
(2) Date: Oct. 27, 2016

(87) PCT Pub. No.: WO2015/166892
PCT Pub. Date: Nov. 5, 2015

(65) Prior Publication Data
US 2017/0055242 A1     Feb. 23, 2017

(30) Foreign Application Priority Data
Apr. 28, 2014   (JP) ................................. 2014-092343

(51) Int. Cl.
*H04W 72/04*     (2009.01)
*H04L 27/26*     (2006.01)
(Continued)

(52) U.S. Cl.
CPC ......... *H04W 72/042* (2013.01); *H04L 5/0051* (2013.01); *H04L 5/0092* (2013.01);
(Continued)

(58) Field of Classification Search
CPC .................................................... H04W 72/042
(Continued)

(56) References Cited

U.S. PATENT DOCUMENTS

| | | | | |
|---|---|---|---|---|
| 2010/0232373 A1* | 9/2010 | Nory | ................. | H04W 72/1289 370/329 |
| 2010/0279628 A1* | 11/2010 | Love | ...................... | H04L 5/003 455/70 |

(Continued)

FOREIGN PATENT DOCUMENTS

| | | |
|---|---|---|
| EP | 2 765 723 A1 | 8/2014 |
| EP | 2 905 910 A1 | 8/2015 |

OTHER PUBLICATIONS

Official Communication issued in International Patent Application No. PCT/JP2015/062576, dated Jul. 21, 2015.
(Continued)

*Primary Examiner* — Shripal K Khajuria
(74) *Attorney, Agent, or Firm* — Keating & Bennett, LLP

(57) ABSTRACT

There is provided a terminal device capable of efficiently performing communication in a communication system in which the terminal device and a base station device communicate with each other. The terminal device that communicates with the base station device by using a plurality of aggregated cells includes a reception unit that monitors a first CSS and/or USS in a certain serving cell, and monitors a second CSS and/or USS in the certain serving cell. The reception unit monitors the first CSS and USS in a case where the certain serving cell is a primary cell, and monitors the second CSS and USS in a case where the certain serving
(Continued)

cell is a secondary cell and has at least one function of the primary cell.

9 Claims, 14 Drawing Sheets

(51) Int. Cl.
  *H04W 24/10* (2009.01)
  *H04L 5/00* (2006.01)
  *H04W 16/32* (2009.01)
  *H04W 88/02* (2009.01)
(52) U.S. Cl.
  CPC ......... *H04L 27/2607* (2013.01); *H04W 24/10* (2013.01); *H04L 5/001* (2013.01); *H04L 5/0098* (2013.01); *H04W 16/32* (2013.01); *H04W 88/02* (2013.01); *Y02B 60/50* (2013.01); *Y02D 70/00* (2018.01)
(58) Field of Classification Search
  USPC .......................................................... 370/329
  See application file for complete search history.

(56) References Cited

U.S. PATENT DOCUMENTS

2011/0019776 A1* 1/2011 Zhang .................. H04L 5/0023
    375/340
2012/0113827 A1* 5/2012 Yamada ................ H04L 1/0031
    370/252

OTHER PUBLICATIONS

Ericsson, "Summary of email discussion [77-08]: Small cell on/off transition time reduction", 3GPP TSG RAN WG1 Meeting #78, R1-143396, Aug. 18-22, 2014, 17 pages.
MediaTek Inc., "Views on Support of Small Cell On/Off", 3GPP TSG-RAN WG1 Meeting #74bis, R1-134448, Oct. 7-11, 2013, 6 pages.
ASUSTeK, "UE measurement based on discover signal", 3GPP TSG RAN WG1 Meeting #76bis, R1-141574, Mar. 31-Apr. 4, 2014, 4 pages.
China Telecom, "Enhanced procedure for activated SCell operating on/off", 3GPP TSG RAN WG1 Meeting #76bis, R1-141268, Mar. 31-Apr. 4, 2014, 5 pages.
Ericsson, "On Transition Time Reduction for Small Cell on/off", 3GPP TSG RAN WG1 Meeting #76bis, R1-141640, Mar. 31-Apr. 4, 2014, 8 pages.
"3rd Generation Partnership Project; Technical Specification Group Radio Access Network; Small cell enhancements for E-UTRA and E-UTRAN—Physical layer aspects (Release 12)", 3GPP TR 36.872 V12.1.0, Dec. 2013, pp. 1-100.
LTE; Evolved Universal Terrestrial Radio Access (E-UTRA); Physical channels and modulation (Release 11), 3GPP TS 36.211 V11.5.0, ETSI TS 136 211 V11.5.0, Jan. 2014, 122 pages.

* cited by examiner

FIG. 12

| DRS configuration | (k', l') | $n_s \mod 2$ |
|---|---|---|
| 0 | (9,5) | 0 |
| 1 | (11,2) | 1 |
| 2 | (9,2) | 1 |
| 3 | (7,2) | 1 |
| 4 | (9,5) | 1 |
| 5 | (8,5) | 0 |
| 6 | (10,2) | 1 |
| 7 | (8,2) | 1 |
| 8 | (6,2) | 1 |
| 9 | (8,5) | 1 |
| 10 | (3,5) | 0 |
| 11 | (2,5) | 0 |
| 12 | (5,2) | 1 |
| 13 | (4,2) | 1 |
| 14 | (3,2) | 1 |
| 15 | (2,2) | 1 |
| 16 | (1,2) | 1 |
| 17 | (0,2) | 1 |
| 18 | (3,5) | 1 |
| 19 | (2,5) | 1 |
| 20 | (11,1) | 1 |
| 21 | (9,1) | 1 |
| 22 | (7,1) | 1 |
| 23 | (10,1) | 1 |
| 24 | (8,1) | 1 |
| 25 | (6,1) | 1 |
| 26 | (5,1) | 1 |
| 27 | (4,1) | 1 |
| 28 | (3,1) | 1 |
| 29 | (2,1) | 1 |
| 30 | (1,1) | 1 |
| 31 | (0,1) | 1 |

FIG. 14

$$L\{(Y_k + m') \bmod \lfloor N_{CCE,k} / L \rfloor\} + i \quad \cdots \text{EXPRESSION (1)}$$

$$L\left\{\left(Y_{p,k} + \left\lfloor \frac{m \cdot N_{ECCE,p,k}}{L \cdot M_p^{(L)}} \right\rfloor + b\right) \bmod \lfloor N_{ECCE,p,k} / L \rfloor\right\} + i \quad \cdots \text{EXPRESSION (2)}$$

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

BACKGROUND ART

A radio access scheme and a radio network for cellular mobile communication (hereinafter, referred to as "Long-Term Evolution (LTE)" or "Evolved Universal Terrestrial Radio Access: EUTRA") have been examined in the 3rd Generation Partnership Project (3GPP). In the LTE, a base station device (base station) is also referred to as Evolved Node B (eNodeB), and a terminal device (mobile station, mobile station device, or terminal) is also referred to as user equipment (UE). The LTE is a cellular communication system in which a plurality of areas within the coverage of the base station device is arranged in the form of cells. A single base station device may manage a plurality of cells.

The LTE supports frequency-division duplexing (FDD) and time-division duplexing (TDD). The LTE that adopts the FDD system is also referred to as FD-LTE or LTE FDD. The TDD is a technology that enables full-duplex communication in at least two frequency bands by performing frequency-division multiplexing on uplink signals and downlink signals. The LTE that adopts the TDD system is also referred to as TD-LTE or LTE TDD. The TDD is a technology that enables full-duplex communication in a single frequency band by performing time-division multiplexing on uplink signals and downlink signals. The details of the FD-LTE and the TD-LTE are disclosed in NPL 1.

The base station device may transmit, to the terminal device, a reference signal (referred to as RS) which is a known signal between the base station device and the terminal device. As the reference signal, a plurality of reference signals may be transmitted for various purposes such as demodulation of a signal channel or reporting of a channel state. For example, a cell-specific reference signal is transmitted as a reference signal specific to the cell in all downlink subframes. For example, a UE-specific reference signal is transmitted as a reference signal specific to the terminal device in a resource to which a data signal for the terminal device is mapped. The details of the reference signals are disclosed in NPL 1.

In the 3GPP, the introduction of a small cell has been examined. The small cell is the general term for cells of which a transmission power of the base station device constituting this cell is low and coverage is narrower than that of the cell (macrocell) of the related art. For example, since the small cell is applied in a high frequency band, it is possible to arrange the small cells with high density, and an effect of improving frequency utilization efficiency per area is exhibited. In the examination of the introduction of the small cell, a technology that switches the state of the base station device to a deactivated state has been examined for various purposes such as low power consumption or inter-cell interference reduction. The details thereof are disclosed in NPL 2.

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 11), 3GPP TS 36.211 V11.5.0 (2014-01).

NPL 2: 3rd Generation Partnership Project; Technical Specification Group Radio Access Network; Small cell enhancements for E-UTRA and E-UTRAN—Physical layer aspects (Release 12), 3GPP TR 36.872 V12.1.0 (2013-12).

SUMMARY OF INVENTION

Technical Problem

However, in a case where the state of the base station device is switched to the deactivated state, the transmission of the synchronization signal or the reference signal is also stopped, and the terminal device is difficult to discover the base station device in the deactivated state. In such a situation, since much preparation time is necessary when the terminal device is connected to the base station device in the deactivated state, transmission efficiency may be greatly deteriorated.

The invention has been made in view of such problems, and it is an object of the invention to provide a base station device, a terminal device, a communication system, a communication method and an integrated circuit capable of improving transmission efficiency in a communication system in which the base station device and the terminal device communicate with each other.

Solution to Problem

In order to achieve the above-described object, the present invention provides the following means. That is, a terminal device according to the present embodiment is a terminal device including: a reception unit that receives PDCCH; and a channel measurement unit that measures CSI based on a CSI reference resource defined by one effective downlink subframe. It is expected that a subframe indicated by the PDCCH is the effective downlink subframe.

A base station device according to the present embodiment is a base station device including: a transmission unit that transmits PDCCH. A CSI reference resource is defined by one effective downlink subframe, and the effective downlink subframe is indicated by the PDCCH.

A communication method according to the present embodiment is a communication method of a terminal device. The method includes: a step of receiving PDCCH; and a step of measuring CSI based on a CSI reference resource defined by one effective downlink subframe. It is expected that a subframe indicated by the PDCCH is the effective downlink subframe.

A communication method according to the present embodiment is a communication method in a base station device. The method includes: a step of transmitting PDCCH. A CSI reference resource is defined by one effective downlink subframe, and the effective downlink subframe is indicated by the PDCCH.

An integrated circuit according to the present embodiment is an integrated circuit mounted in a terminal device. The integrated circuit is adapted to have: a function of receiving PDCCH; and a function of measuring CSI based on a CSI reference resource defined by one effective downlink subframe. It is expected that a subframe indicated by the PDCCH is the effective downlink subframe.

An integrated circuit according to the present embodiment is an integrated circuit mounted in a base station device. The integrated circuit is adapted to have: a function of transmitting PDCCH. A CSI reference resource is defined by one effective downlink subframe, and the effective downlink subframe is indicated by the PDCCH.

Advantageous Effects of Invention

According to the present invention, it is possible to improve transmission efficiency in a wireless communication system in which a base station device and a terminal device communicate with each other.

BRIEF DESCRIPTION OF DRAWINGS

FIG. 12 is a diagram showing an example of designation of a resource element in a configuration of DRS.

FIG. 14 is a diagram showing an expression of a search space of PDCCH and EPDCCH.

DESCRIPTION OF EMBODIMENTS

Figure 1:
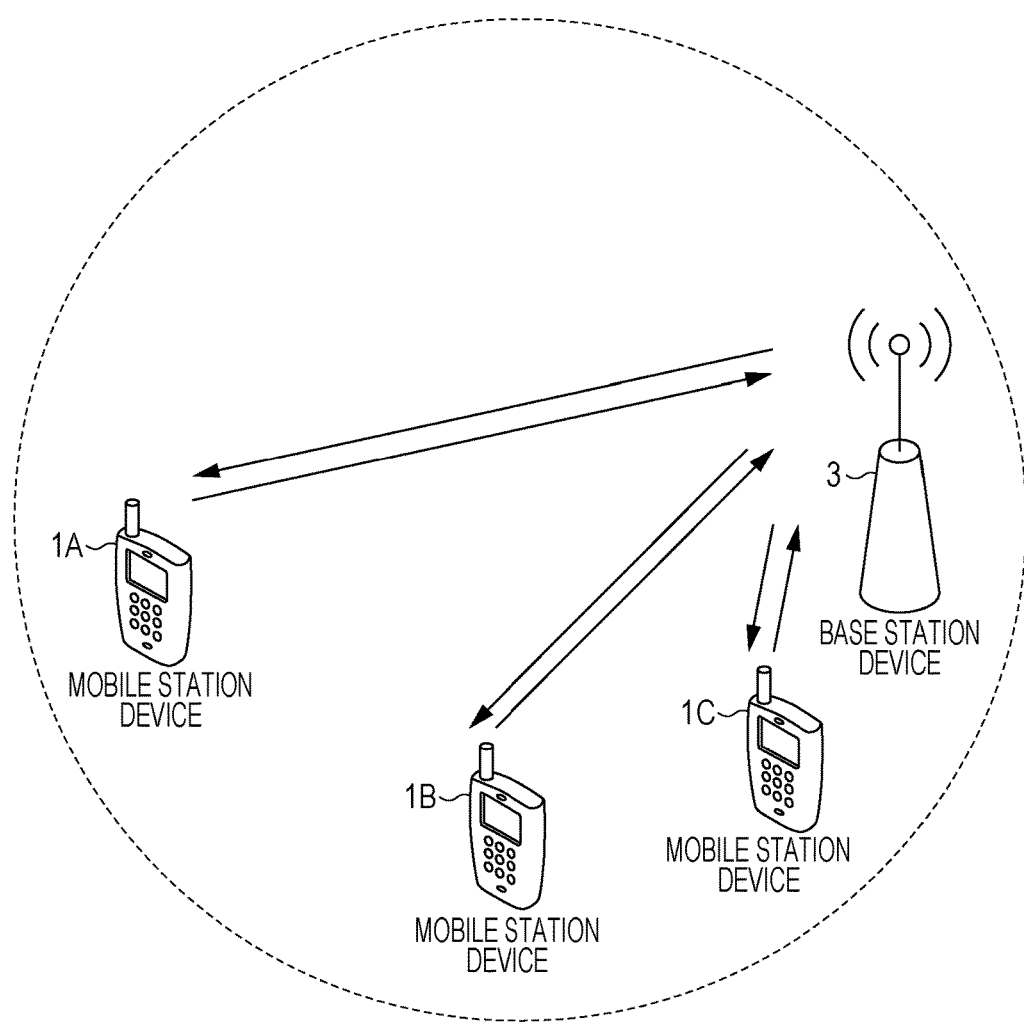
FIG. 1 is a conceptual diagram of a wireless communication system according to the present embodiment.

Hereinafter, embodiments of the present invention will be described.

In the present embodiment, a plurality of cells may be configured for a terminal device 1. Here, a technology in which the terminal device 1 communicates through a plurality of cells is referred to as cell aggregation, carrier aggregation, or dual connectivity. The present invention may be applied to each of the plurality of cells configured for the terminal device 1. The present invention may be applied to some of the plurality of configured cells. The cell configured for the terminal device 1 is referred to as a serving cell.

In the carrier aggregation (CA), the plurality of configured serving cells includes one primary cell (PCell), and one or a plurality of secondary cells (SCell).

The primary cell is a serving cell in which an initial connection establishment procedure is performed, a serving cell in which a connection re-establishment procedure is started, or a cell indicated as a primary cell in a handover procedure. The primary cell is operated at a primary frequency. The secondary cell may be configured when or after the connection is (re)established. The secondary cell is operated at a secondary frequency. The connection may be referred to as RRC connection.

One primary cell and one or more secondary cells are aggregated for the terminal device 1 that supports the CA.

The dual connectivity is an operation in which a certain terminal device 1 consumes radio resources provided from at least two different network points (a master base station device (MeNB: master eNB) and a secondary base station device (SeNB: secondary eNB)). In other words, the dual connectivity means that the terminal device 1 performs RRC connection in at least two network points. In the dual connectivity, the terminal device 1 may be connected in a RRC connection (RRC_CONNECTED) state and through non-ideal backhaul.

In the dual connectivity, a base station device 3 which is connected to at least S1-Mobility Management Entity (MME) and serves as mobility anchor of a core network is referred to as a master base station device in some cases. The base station device 3 that is not the master base station device which provides additional radio resources to the terminal device 1 is referred to as a secondary base station device. A group of serving cells associated with the master base station device is referred to as a master cell group (MCG) and a group of serving cells associated with the secondary base station device is referred to a secondary cell group (SCG) in some cases.

In the dual connectivity, the primary cell belongs to the MCG. In the SCG, a secondary cell corresponding to the primary cell is referred to as a primary secondary cell (pSCell). The pSCell is referred as a special cell or a special secondary cell (SCell) in some cases. The special SCell (the base station device constituting the special SCell) may be supported by the same function (capability or performance) as that of the PCell (a base station device constituting the PCell). Only a part of the function of the PCell may be supported by the pSCell. For example, the pSCell may be supported by a function of transmitting PDCCH. The pSCell may be supported by a function of performing the PDCCH transmission by using a search space different from that of CSS or USS. For example, the search space different from that of the USS is a search space determined based on a value defined by the specification, or a search space determined based on RNTI different from that of C-RNTI. The pSCell may be constantly in an activated state. The pSCell is a cell capable of receiving PUCCH.

In the dual connectivity, a radio bearer (data radio bearer (DRB) and/or signalling radio bearer (SRB)) may be individually assigned in the MeNB and the SeNB.

In the dual connectivity, a duplex mode may be individually configured in the MCG and the SCG, or the PCell and the pSCell.

In the dual connectivity, the MCG and the SCG, or the PCell and the pSCell may not be synchronized.

In the dual connectivity, a parameter (timing advance group: TAG) for adjusting a plurality of timings may be configured in each of the MCG and SCG (or the PCell and pSCell). That is, the MCG and the SCG may be not be synchronized.

In the dual connectivity, the terminal device 1 transmits UCI corresponding to the cell within the MCG to only the MeNB (PCell), and transmits UCI corresponding to the cell within the SCG to only the SeNB (pSCell). For example, the UCI is SR, HARQ-ACK, and/or CSI. In the transmission of each UCI, a transmission method using the PUCCH and/or the PUSCH is applied to each cell group.

All signals can be transmitted and received in the primary cell, but there are signals that are not able to be transmitted and received in the secondary cell. For example, physical uplink control channels (PUCCHs) are transmitted only in the primary cell. Physical random access channels (PRACHs) are transmitted only in the primary cell between the cells as long as the plurality of timing advance groups (TAGs) is not configured. Physical broadcast channels (PBCHs) are transmitted only in the primary cell. Master information blocks (MIB) are transmitted only on the primary cell.

In the primary secondary cell, the signals that can be transmitted and received in the primary cell are transmitted and received. For example, the PUCCHs may be transmitted in the primary secondary cell. The PRACHs may be transmitted in the primary secondary cell irrespective of whether or not the plurality of TAGs is configured. The PBCHs or the MIBs may be transmitted in the primary secondary cell.

Radio link failure (RLF) is detected in the primary cell. In the secondary cell, even though a condition in which the RLF is detected is satisfied, it is not recognized that the RLF is detected. In the primary secondary cell, if the condition is satisfied, the RLF is detected. In the primary secondary cell, in a case where the RLF is detected, a higher layer of the primary secondary cell notifies a higher layer of the primary cell that the RLF is detected.

In the primary cell and/or the primary secondary cell, semi-persistent scheduling (SPS) or discontinuous transmission (DRX) may be performed. The total number of SPS configurations and DRX configurations may be determined by the total number of primary cells and primary secondary cells. In the secondary cell, the same DRX as that of the primary cell or the primary secondary cell of the same cell group may be performed.

In the secondary cell, information/parameters related to the configurations of the MAC are basically shared with the primary cell/the primary secondary cell of the same cell group. A part (for example, sTAG-Id) of the parameters may be configured for each secondary cell.

A part of timers or counters may be applied to only the primary cell and/or the primary secondary cell. The applied timer or counter may be configured for only the secondary cell.

A frame structure type of a frequency division duplex (FDD) or time division duplex (TDD) system is applied to a wireless communication system according to the present embodiment. The frame structure type is referred to as a frame format type or a duplex mode in some cases. In the case of the cell aggregation, the TDD system may be applied to all the plurality of cells. In the case of the cell aggregation, the cells to which the TDD system is applied and the cells to which the FDD system is applied may be aggregated. In a case where the cells to which the TDD is applied and the cells to which the FDD is applied are aggregated, the present invention may be applied to the cells to which the TDD is applied.

A half-duplex FDD system or a full-duplex FDD system may be applied to the cells to which the FDD is applied.

In a case where the plurality of cells to which the TDD is applied is aggregated, a half-duplex TDD system or a full-duplex TDD system may be applied.

The terminal device 1 transmits information indicating combinations of bands in which the carrier aggregation is supported by the terminal device 1 to the base station device 3. The terminal device 1 transmits information indicating whether or not each of the combinations of the bands supports simultaneous transmission and reception in the plurality of serving cells in plurality of different bands to the base station device 3.

In the present embodiment, "X/Y" includes the meaning of "X or Y". In the present embodiment, "X/Y" includes the meaning of "X and Y". In the present embodiment, "X/Y" includes the meaning of "X and/or Y".

FIG. 1 is a conceptual diagram of the wireless communication system according to the present embodiment. In FIG. 1, the wireless communication system includes terminal devices 1A to 1C, and the base station device 3. Hereinafter, the terminal devices 1A to 1C are referred to as the terminal devices 1.

Physical channels and physical signals according to the present embodiment will be described.

In FIG. 1, uplink physical channels are used in uplink wireless communication from the terminal devices 1 to the base station device 3. The uplink physical channel may be used to transmit information output from the higher layer. The uplink physical channel includes a physical uplink control channel (PUCCH), a physical uplink shared channel (PUSCH), and a physical random access channel (PRACH).

The PUCCH is the physical channel used to transmit uplink control information (UCI). The uplink control information includes channel state information (CSI) of the downlink, scheduling request (SR) indicating a request for a PUSCH resource, and acknowledgement (ACK)/negative-acknowledgement (NACK) of downlink data (transport block (TB) or downlink-shared channel (DL-SCH)). The ACK/NACK is also referred to as HARQ-ACK, HARQ feedback, or response information.

The PUSCH is the physical channel used to transmit uplink-shared channel (UL-SCH). The PUSCH may be used to transmit the HARQ-ACK and/or the channel state information together with the uplink data. The PUSCH may be used to transmit only the channel state information, or only the HARQ-ACK and the channel state information.

The PRACH is the physical channel used to transmit a random access preamble. The PRACH is mainly used by the terminal device 1 to synchronize time domain with the base station device 3. In addition, the PRACH is used to indicate an initial connection establishment procedure, a handover procedure, a connection re-establishment procedure, synchronization (timing adjustment) of uplink transmission, and a request for a PUSCH resource.

In FIG. 1, uplink physical signals are used in uplink wireless communication. The uplink physical signal includes an uplink reference signal (UL RS). As the uplink reference signal, a demodulation reference signal (DMRS) and a sounding reference signal (SRS) are used. The DMRS is associated with the transmission of the PUSCH or the PUCCH. The DMRS is time-multiplexed with the PUSCH or the PUCCH. The base station device 3 uses the DMRS in order to perform channel compensation of the PUSCH or the PUCCH. Hereinafter, the transmission of both the PUSCH and the DMRS is simply referred to as the transmission of the PUSCH. Hereinafter, the transmission of both of the PUCCH and the DMRS is simply referred to as the transmission of the PUCCH. The DMRS of the uplink is also referred to as UL-DMRS. The SRS is not associated with the transmission of the PUSCH or the PUCCH. The base station device 3 uses the SRS in order to measure a channel state of the uplink.

As the SRS, there are two trigger types of SRSs (trigger type 0 SRS, and trigger type 1 SRS). The trigger type 0 SRS is transmitted by higher layer signalling in a case where a parameter related to the trigger type 0 SRS is configured.

The trigger type 1 SRS is transmitted by higher layer signalling in a case where a parameter related to the trigger type 1 SRS is configured and transmission is requested by a SRS request included in DCI formats 0/1A/2B/2C/2D/4. The SRS request is included in both the FDD and the TDD for the DCI formats 0/1A/4, and is included only in the TDD for the DCI formats 2B/2C/2D. In a case where the transmission of the trigger type 0 SRS and the transmission of the trigger type 1 SRS occur in the same subframe of the same serving cell, the transmission of the trigger type 1 SRS is prioritized.

In FIG. 1, downlink physical channels are used in downlink wireless communication from the base station device 3 to the terminal device 1. The downlink physical channels are used to transmit information output from the higher layer. The downlink physical channel includes a physical broadcast channel (PBCH), a physical control format indicator channel (PCFICH), a physical hybrid automatic repeat request indicator channel (PHICH), a physical downlink control channel (PDCCH), an enhanced physical downlink control channel (EPDCCH), a physical downlink shared channel (PDSCH), and a physical multicast channel (PMCH).

The PBCH is used to broadcast a master information block (MIB, broadcast channel (BCH)) which is commonly used in the terminal devices 1. The MIB may be updated at an interval of 40 ms. The PBCH is repeatedly transmitted at a cycle of 10 ms. Specifically, initial transmission of the MIB is performed in a subframe 0 in a radio frame that satisfies SFN mod 4=0, and repetition of the MIB in the subframe 0 in all other radio frames is performed. A system frame number (SFN) is a radio frame number (system frame number). The MIB is system information. For example, the MIB includes information indicating the SFN.

The PCFICH is used to transmit information indicating a region (OFDM symbol) used to transmit the PDCCH.

The PHICH is used to transmit a HARQ indicator (HARQ feedback or response information) indicating the acknowledgement (ACK) or the negative acknowledgement (NACK) of the uplink data (uplink shared channel (UL-SCH)) received by the base station device 3. For example, in a case where the terminal device 1 receives the HARQ indicator indicating the ACK, the corresponding uplink data is not retransmitted. For example, in a case where the terminal device 1 receives the HARQ indicator indicating the NACK, the corresponding uplink data is retransmitted. A single PHICH is used to transmit the HARQ indicator corresponding to single uplink data. The base station device 3 respectively transmits HARQ indicators corresponding to a plurality of uplink data items included in the same PUSCH by using a plurality of PHICHs.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The PDCCH is transmitted by the aggregation of one or a plurality of successive control channel elements (CCE). The CCE includes 9 resource element groups (REGs). The REG includes 4 resource elements. The PDCCH constituted by n number of successive CCEs is started with a CCE that satisfies i mod n=0. Here, i is a CCE number.

The EPDCCH is transmitted by the aggregation of one or a plurality of successive enhanced control channel elements (ECCEs). The ECCE includes a plurality of enhanced resource element groups (EREGs).

The downlink grant is used in scheduling a single PDSCH within a single cell. The downlink grant is used in scheduling a PDSCH within the same subframe as a subframe in which the downlink grant is transmit. The uplink grant is used in scheduling a single PUSCH within a single cell. The uplink grant is used in scheduling a single PUSCH within a subframe which is positioned after four or more subframes from a subframe in which the uplink grant is transmitted.

A cyclic redundancy check (CRC) parity bit is added to the DCI format. The CRC parity bit is scrambled with a radio network temporary identifier (RNTI). The RNTI is an identifier capable of being defined or configured depending on the purpose of the DCI. The RNTI is an identifier predefined in the specifications, an identifier configured as information specific to the cell, an identifier configured as information specific to the terminal device 1, or an identifier configured as information specific to a group belonging to the terminal devices 1. For example, the CRC parity bit is scrambled with a cell-radio network temporary identifier (C-RNTI), or a semi persistent scheduling cell-radio network temporary identifier (SPS C-RNTI). The C-RNTI and the SPS C-RNTI are identifiers for identifying the terminal devices 1 within the cell. The C-RNTI is used to control the PDSCH or the PUSCH in a single subframe. The SPS C-RNTI is used to periodically assign a resource of the PDSCH or PUSCH.

The PDSCH is used to transmit a downlink shared channel (DL-SCH). The PDSCH is used to transmit control information of the higher layer.

The PMCH is used to transmit multicast data (multicast channel (MCH)).

In FIG. 1, the following downlink physical signals are used in downlink wireless communication. The downlink physical signal includes a synchronization signal (SS), and a downlink reference signal (DL RS).

The synchronization signal is used by the terminal device 1 to synchronize the frequency domain and the time domain of the downlink. The synchronization signal is allocated to a predetermined subframe within the radio frame. For example, in the TDD system, the synchronization signals are allocated to subframes 0, 1, 5, and 6 within the radio frame. In the FDD system, the synchronization signals are allocated to the subframes 0 and 5 within the radio frame.

As the synchronization signal, there are a primary synchronization signal (PSS) and a secondary synchronization signal (SSS). The PSS is used to perform coarse frame/symbol timing synchronization (synchronization of the time domain) or to identify cell group. The SSS is used to more accurately perform frame timing synchronization and to identify the cell. That is, the frame timing synchronization and the cell identification can be performed using the PSS and the SSS.

The downlink reference signal is used by the terminal device 1 to perform channel compensation of the downlink physical channel. The downlink reference signal is used by the terminal device 1 to calculate channel state information of the downlink. The downlink reference signal is used by the terminal device 1 to measure a geographical position of the terminal device.

The downlink reference signal includes a cell-specific reference signal (CRS), a UE-specific reference signal (URS) associated with the PDSCH, a demodulation reference signal (DMRS) associated with the EPDCCH, a non-zero power channel state information-reference signal (NZP CSI-RS), a multimedia broadcast and multicast service over single frequency network reference signal (MBSFN RS), a positioning reference signal (PRS), a new carrier type cell-specific reference signal (NCT CRS), and a discovery reference signal (DRS). The resource of the downlink includes a zero power channel state information-reference signal (ZP CSI-RS), and channel state information-interference measurement (CSI-IM).

The CRS is transmitted in all bands of the subframe. The CRS is used to demodulate the PBCH/PDCCH/PHICH/PCFICH/PDSCH. The CRS may be used by the terminal device 1 to calculate channel state information of the downlink. The PBCH/PDCCH/PHICH/PCFICH is transmitted through an antenna port used to transmit the CRS.

The URS associated with the PDSCH is transmitted in the band and the subframe used to transmit the PDSCH associated with the URS. The URS is used to demodulate the PDSCH with which the URS is associated.

The PDSCH is transmitted through an antenna port used to transmit the CRS or the URS based on a transmission mode and a DCI format. A DCI format 1A is used to schedule the PDSCH transmitted through the antenna port used to transmit the CRS. A DCI format 2D is used to schedule the PDSCH transmitted through the antenna used to transmit the URS.

The DMRS associated with the EPDCCH is transmitted in the band and the subframe used to transmit the EPDCCH with which the DMRS is associated. The DMRS is used to demodulate the EPDCCH with which the DMRS is associated. The EPDCCH is transmitted through an antenna port used to transmit the DMRS.

The NZP CSI-RS is transmitted in the configured subframe. The resource in which the NZP CSI-RS is transmitted is configured by the base station device 3. The NZP CSI-RS is used by the terminal device 1 to calculate channel state information of the downlink. The terminal device 1 performs signal measurement (channel measurement) by using the NZP CSI-RS.

The resource of the ZP CSI-RS is configured by the base station device 3. The base station device 3 transmits the ZP CSI-RS at zero power. That is, the base station device 3 does not transmit the ZP CSI-RS. The base station device 3 does not transmit the PDSCH and the EPDCCH in the configured resource of the ZP CSI-RS.

The resource of the CSI-IM is configured by the base station device 3. The resource of the CSI-IM is configured so as to overlap a part of the resource of the ZP CSI-RS. That is, the resource of the CSI-IM has the same characteristics as those of the ZP CSI-RS, and the base station device 3 transmits the CSI-IM at zero power in the configured resource. That is, the base station device 3 does not transmit the CSI-IM. The base station device 3 does not transmit the PDSCH and the EPDCCH in the configured resource of the CSI-IM. The terminal device 1 may measure resource interference configured as the CSI-IM in the resource corresponding to the NZP CSI-RS in a certain cell.

As the channel state information (CSI), there are a channel quality indicator (CQI), a precoding matrix indicator (PMI), a rank indicator (RI), and a precoding type indicator (PTI). The channel state information is measured using the CSI-RS or the CRS.

The MBSFN RS is transmitted in all the bands of the subframe used to transmit the PMCH. The MBSFN RS is used to demodulate the PMCH. The PMCH is transmitted through an antenna used to transmit the MBSFN RS.

The PRS is used by the terminal device 1 to measure the geographical position of the terminal device.

The NCT CRS may be mapped to a predetermined subframe. For example, the NCT CRS is mapped to the subframes 0 and 5. The NCT CRS may have the same structure as that of a part of the CRS. For example, in each resource block, the positions of the resource elements to which the NCT CRS is mapped may be the same as the positions of the resource elements to which the CRS of the antenna port 0 is mapped. A sequence (value) used for the NCT CRS may be determined based on information configured through the PBCH, PDCCH, EPDCCH or PDSCH (RRC signaling). A sequence (value) used for the NCT CRS may be determined based on a parameter such as a cell ID (for example, a physical layer cell identity) or a slot number. A sequence (value) used for the NCT CRS may be determined by a method (expression) different from a sequence (value) used for the CRS of the antenna port 0. The NCT CRS may be referred to as a tracking reference signal (TRS).

The downlink physical channel and the downlink physical signal are generically referred to as a downlink signal. The uplink physical channel and the uplink physical signal are generically referred to as an uplink signal. The downlink physical channel and the uplink physical channel are generically referred to as a physical channel. The downlink physical signal and the uplink physical signal are generically referred to as a physical signal.

The BCH, MCH, UL-SCH and DL-SCH are transport channels. A channel used in a medium access control (MAC) layer is referred to as a transport channel. A unit of the transport channel used in the MAC layer is also referred to as a transport block (TB) or a MAC protocol data unit (PDU). Hybrid automatic repeat request (HARQ) is controlled for each transport block in the MAC layer. The transport block is a unit of data which is delivered to a physical layer by the MAC layer. In the physical layer, the transport block is mapped to a code word, and a coding process is performed on each code word.

As a method of signaling (notifying and broadcasting) control information to the terminal device 1 from the base station device 3, PDCCH signaling which is signaling through the PDCCH, RRC signaling which is signaling through the RRC layer, and MAC signaling which is signaling through the MAC layer are used. The RRC signaling is dedicated RRC signaling for notifying of control information specific to the terminal device 1 or common RRC signaling for notifying of control information specific to the base station device 3. In the following description, in a case where the RRC signaling is simply described, the RRC signaling is the dedicated RRC signaling and/or the common RRC signaling. The signaling, such as the RRC signaling or MAC CE, used in a layer higher than the physical layer is referred to as higher layer signalling.

Hereinafter, a structure of the radio frame according to the present embodiment will be described.

Figure 2:
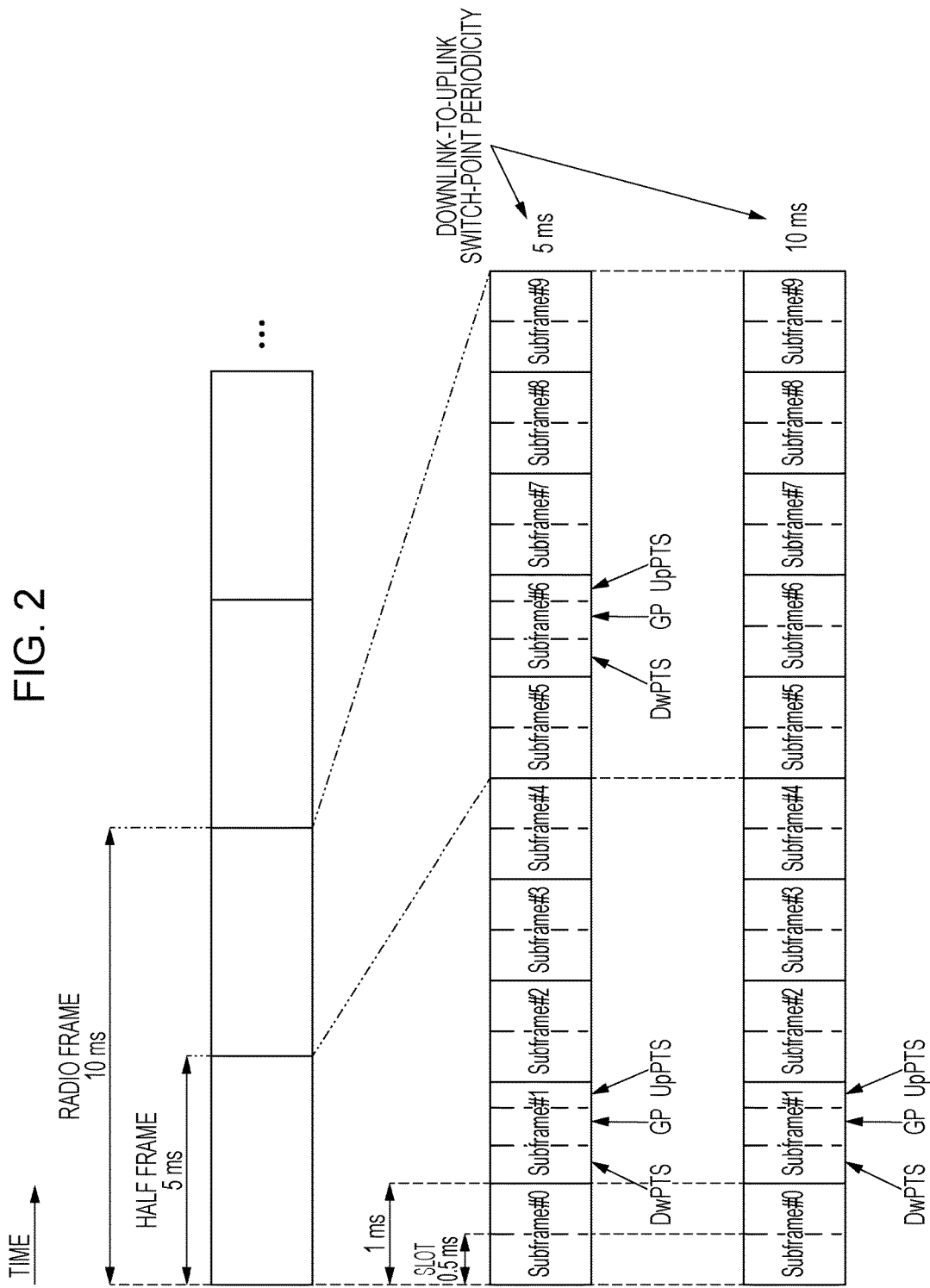
FIG. 2 is a diagram showing a schematic structure of a radio frame according to the present embodiment.

FIG. 2 is a diagram showing a schematic structure of the radio frame according to the present embodiment. Each radio frame has a length of 10 ms. Each radio frame includes two half frames. Each half frame has a length of 5 ms. Each half frame includes 5 subframes. Each subframe has a length of 1 ms, and is defined by two successive slots. Each slot has a length of 0.5 ms. An i-th subframe within the radio frame includes a (2×i)-th slot and a (2×i+1)-th slot. That is, each radio frame is defined by 10 subframes.

The subframe includes a downlink subframe (first subframe), an uplink subframe (second subframe), and a special subframe (third subframe).

The downlink subframe is a subframe reserved for downlink transmission. The uplink subframe is a subframe reserved for uplink transmission. The special subframe includes 3 fields. The three fields are a downlink pilot time slot (DwPTS), a guard period (GP), and an uplink pilot time slot (UpPTS). The total length of the DwPTS, GP and UpPTS is 1 ms. The DwPTS is a field reserved for downlink transmission. The UpPTS is a field reserved for uplink transmission. The GP is a field in which the downlink transmission and the uplink transmission are not performed. The special subframe may include only the DwPTS and the GP, or may include only the GP and the UpPTS. The special subframe is arranged between the downlink subframe and the uplink subframe in the TDD, and is used to switch the subframe from the downlink subframe to the uplink subframe.

A single radio frame includes the downlink subframe, the uplink subframe, and/or the special subframe. That is, the radio frame may include only the downlink subframe. The radio frame may include only the uplink subframe.

The wireless communication system according to the present embodiment supports downlink-to-uplink switch-point periodicities of 5 ms and 10 ms. In a case where the downlink-to-uplink switch-point periodicity is 5 ms, the special subframes are included in both the half frames within the radio frame. In a case where the downlink-to-uplink switch-point periodicity is 10 ms, the special subframe is included only in an initial half frame within the radio frame.

Hereinafter, a structure of the slot according to the present embodiment will be described.

Figure 3:
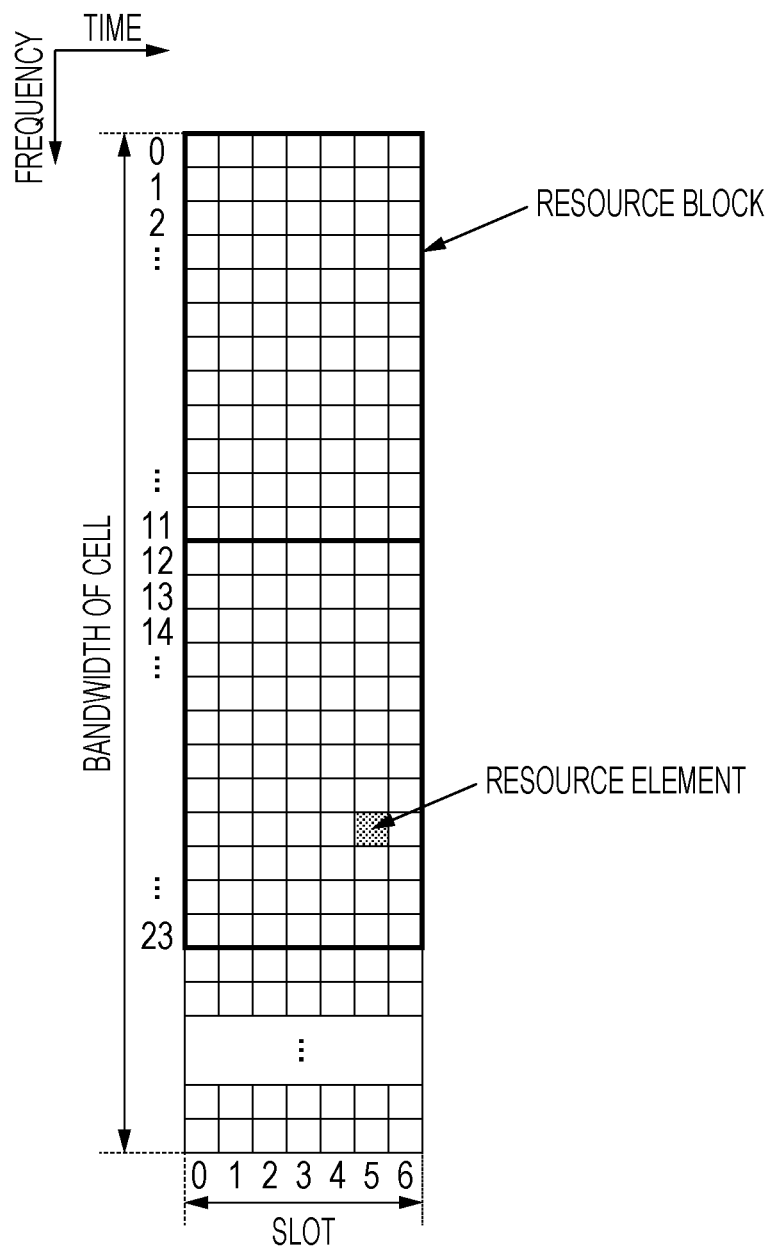
FIG. 3 is a diagram showing a structure of a slot according to the present embodiment.

FIG. 3 is a diagram showing a structure of the slot according to the present embodiment. In the present embodiment, normal cyclic prefix (CP) is applied to an OFDM symbol. Extended cyclic prefix (CP) may be applied to the OFDM symbol. The physical signal or the physical channel transmitted in each slot is represented by a resource grid. In the downlink, the resource grid is defined by a plurality of subcarriers in a frequency direction and a plurality of OFDM symbols in a time direction. In the uplink, the resource grid is defined by a plurality of subcarriers in a frequency direction and a plurality of SC-FDMA symbols in a time direction. The number of subcarriers or resource blocks depends on a bandwidth of the cell. The number of OFDM symbols or SC-FDMA symbols constituting one slot is 7 in the case of the normal CP and is 6 in the case of the enhanced CP. Each element within the resource grid is referred to as a resource element. The resource element is identified using a subcarrier number and an OFDM symbol or SC-FDMA symbol number.

The resource block is used to be mapped to the resource element of a certain physical channel (PDSCH or PUSCH). The resource block is defined by a virtual resource block and a physical resource block. The certain physical channel is initially mapped to by virtual resource block. Thereafter, the virtual resource block is mapped to the physical resource block. One physical resource block is defined by 7 successive OFDM symbols or SC-FDMA symbols in the time domain and 12 successive subcarriers in the frequency domain. In addition, one physical resource block includes (7×12) number of resource elements. One physical resource block corresponds to one slot in the time domain, and corresponds to 180 kHz in the frequency domain. Numbers from 0 are assigned to the physical resource blocks in the frequency domain. Two resource blocks within one subframe which correspond to the same physical resource block number are defined as a physical resource block pair (PRB pair or RB pair).

Hereinafter, the physical channel and the physical signal transmitted in each subframe will be described.

Figure 4:
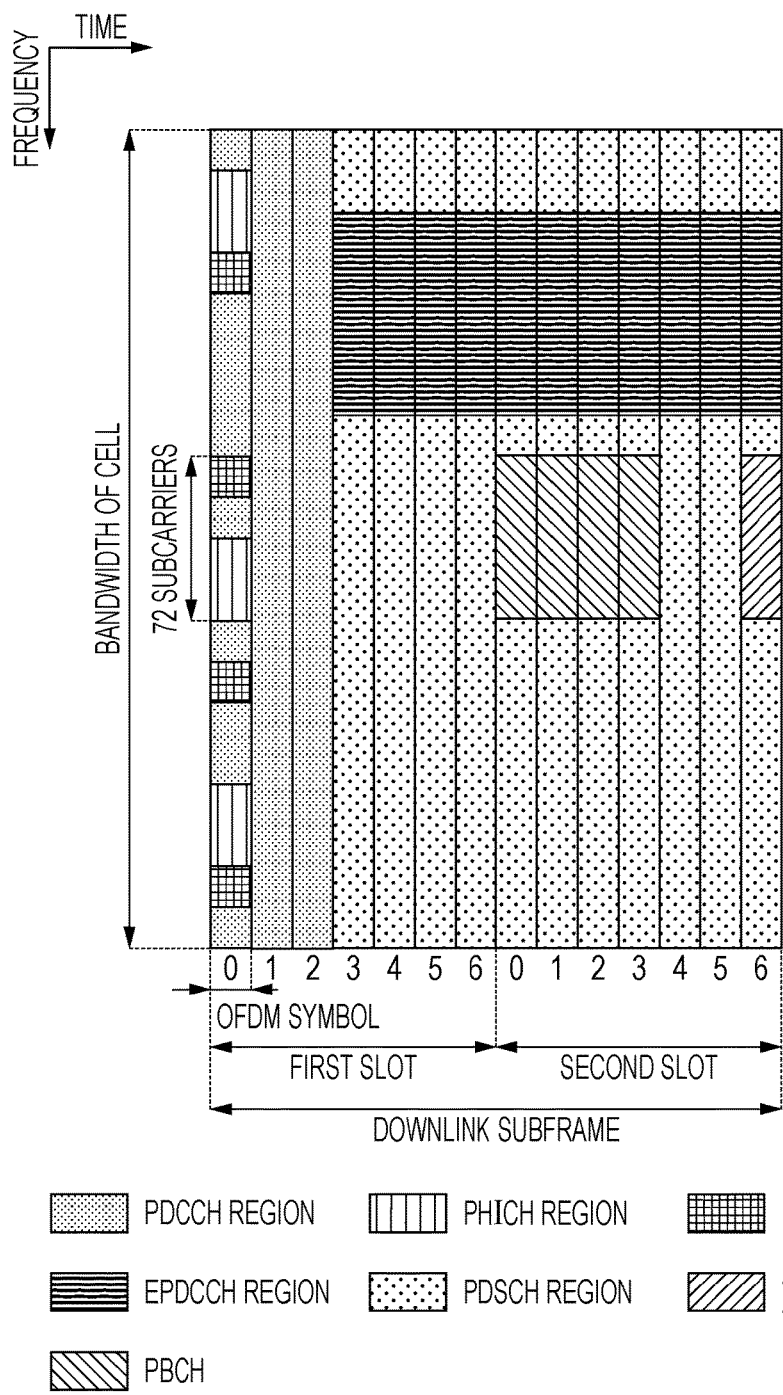
FIG. 4 is a diagram showing an example of the arrangement of physical channels and physical signals in a downlink subframe according to the present embodiment.

FIG. 4 is a diagram showing an example of the arrangement of the physical channels and the physical signals in the downlink subframe according to the present embodiment. The base station device 3 may transmit the downlink physical channel (PBCH, PCFICH, PHICH, PDCCH, EPDCCH, or PDSCH) and/or the downlink physical signal (synchronization signal or downlink reference signal) in the downlink subframe. The PBCH is transmitted only in the subframe 0 within the radio frame. The downlink reference signals are allocated to the resource elements distributed in the frequency domain and the time domain. In order to simplify the description, the downlink reference signals are not shown in FIG. 4.

In PDCCH regions, a plurality of PDCCHs may be frequency-, time- and/or spatial-multiplexed. In EPDCCH regions, a plurality of EPDCCHs may be frequency-, time- and/or spatial-multiplexed. In PDSCH regions, a plurality of PDSCHs may be frequency-, time- and/or spatial-multiplexed. The PDCCHs, PDSCHs and/or EPDCCHs may be frequency-, time- and/or spatial-multiplexed.

Figure 5:
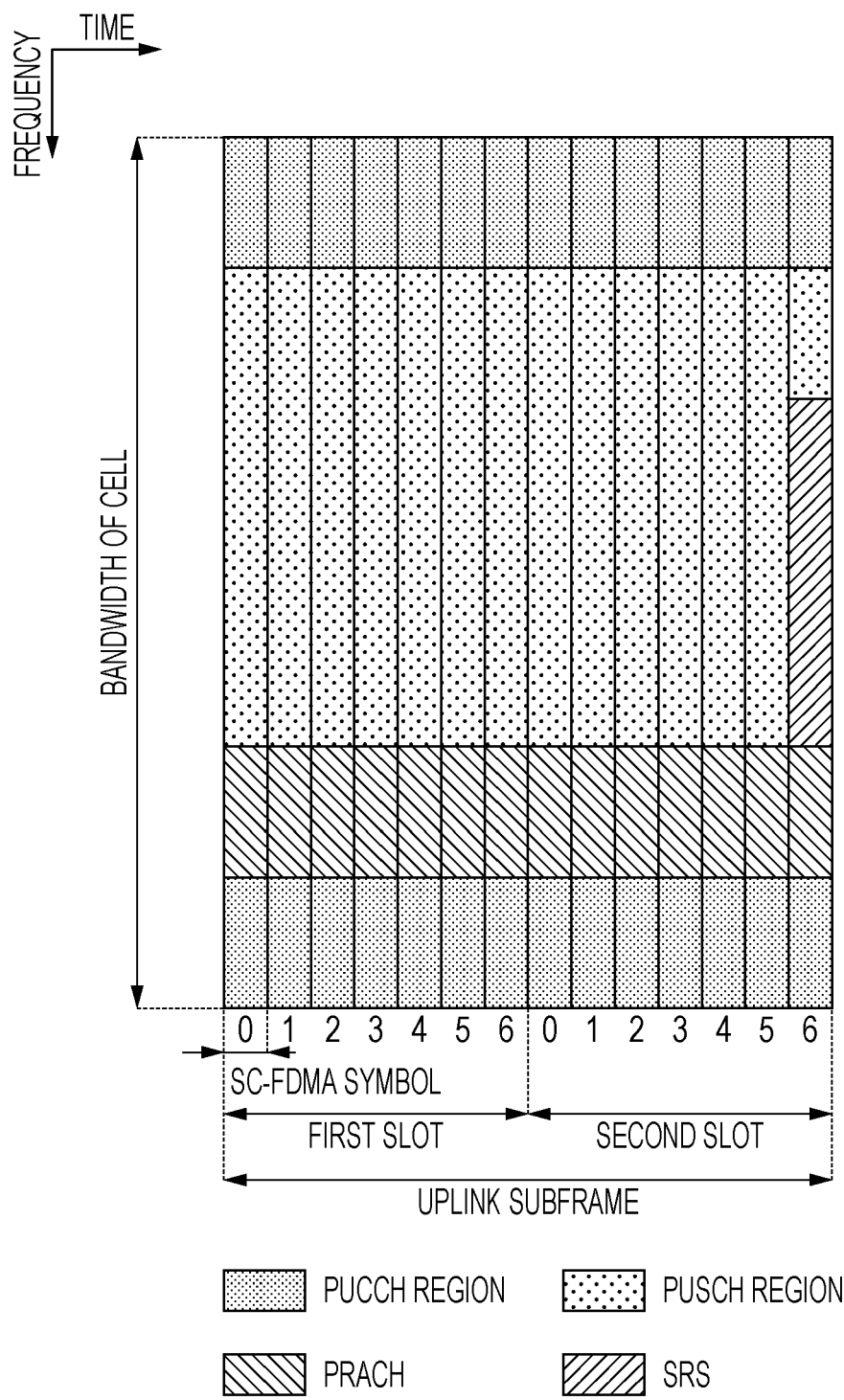
FIG. 5 is a diagram showing an example of the arrangement of physical channels and physical signals in an uplink subframe according to the present embodiment.

FIG. 5 is a diagram showing an example of the arrangement of the physical channels and the physical signals in the uplink subframe according to the present embodiment. The terminal device 1 may transmit the uplink physical channel (PUCCH, PUSCH, or PRACH), and the uplink physical signal (UL-DMRS or SRS) in the uplink subframe. In PUCCH regions, a plurality of PUCCHs is frequency-, time-, spatial- and/or code-multiplexed. In PUSCH regions, a plurality of PUSCHs may be frequency-, time-, spatial- and/or code-multiplexed. The PUCCHs and the PUSCHs may be frequency-, time-, spatial- and/or code-multiplexed. The PRACH may be allocated to a single subframe or over two subframes. A plurality of PRACHs may be code-multiplexed.

The SRS is transmitted using the last SC-FDMA symbol within the uplink subframe. That is, the SRS is allocated to the last SC-FDMA symbol within the uplink subframe. The terminal device 1 may restrict the simultaneous transmission of the SRS and the PUCCH/PUSCH/PRACH in a single SC-FDMA symbol of a single cell. In a single uplink subframe of a single cell, the terminal device 1 may transmit the PUSCH and/or the PUCCH by using the SC-FDMA symbol except for the last SC-FDMA symbol within the uplink subframe, and may transmit the SRS by using the last SC-FDMA symbol within the uplink subframe. That is, the terminal device 1 may transmit the SRS, the PUSCH and the PUCCH in a single uplink subframe of a single cell. The DMRS is time-multiplexed with the PUCCH or the PUSCH. In order to simplify the description, the DMRS is not shown in FIG. 5.

Figure 6:
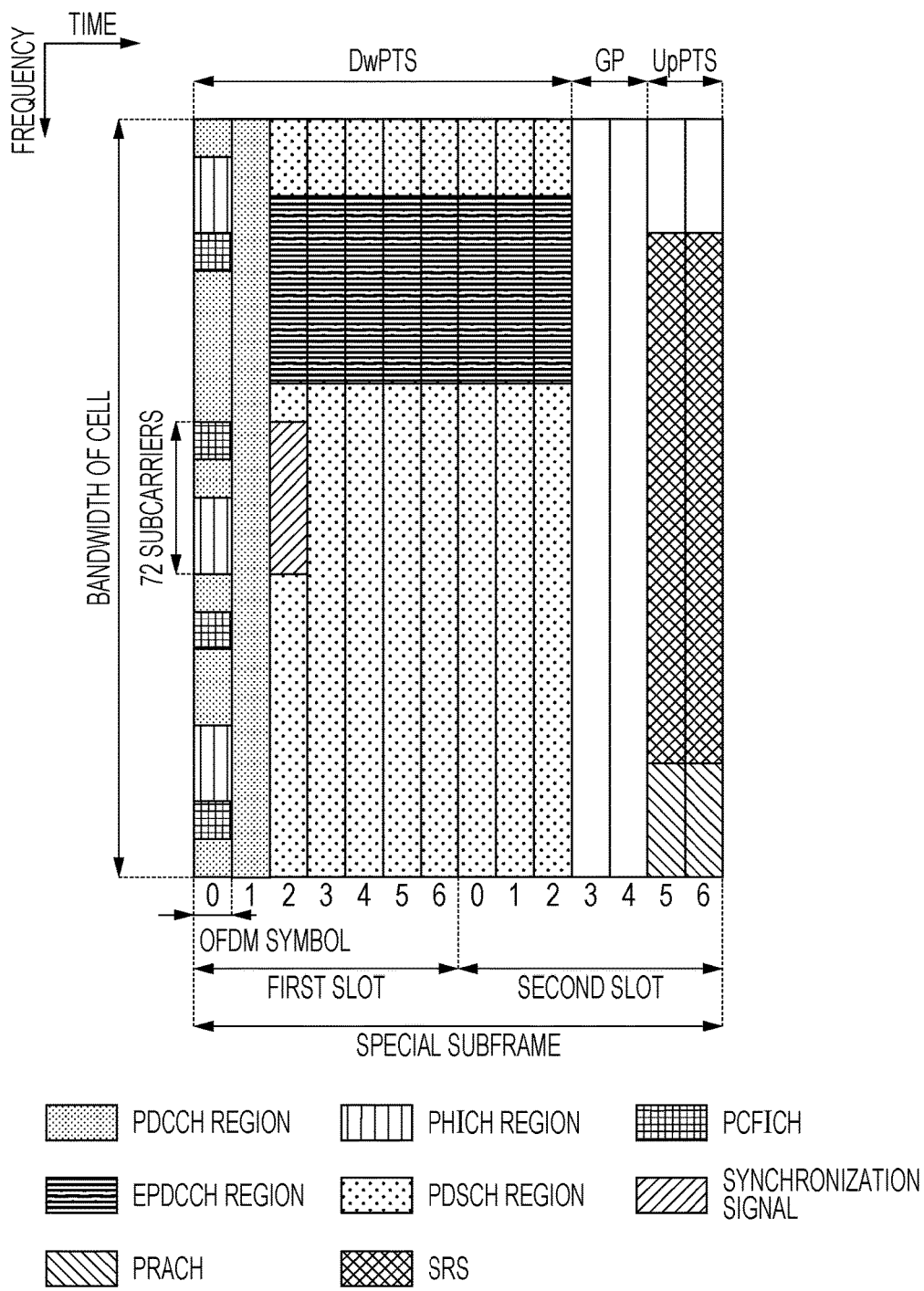
FIG. 6 is a diagram showing an example of the arrangement of physical channels and physical signals in a special subframe according to the present embodiment.

FIG. 6 is a diagram showing an example of the arrangement of the physical channels and the physical signals in the special subframe according to the present embodiment. In FIG. 6, the DwPTS includes first to tenth SC-FDMA symbols within the special subframe, the GP includes eleventh and twelfth SC-FDMA symbols within the special subframe, and the UpPTS includes thirteenth and fourteenth SC-FDMA symbols within the special subframe.

The base station device 3 may transmit the PCFICH, the PHICH, the PDCCH, the EPDCCH, the PDSCH, the synchronization signal, and the downlink reference signal in the DwPTS of the special subframe. The base station device 3 may restrict the transmission of the PBCH in the DwPTS of the special subframe. The terminal device 1 may transmit the PRACH and the SRS in the UpPTS of the special subframe. That is, the terminal device 1 may restrict the transmission of the PUCCH, the PUSCH and the DMRS in the UpPTS of the special subframe.

Figure 7:
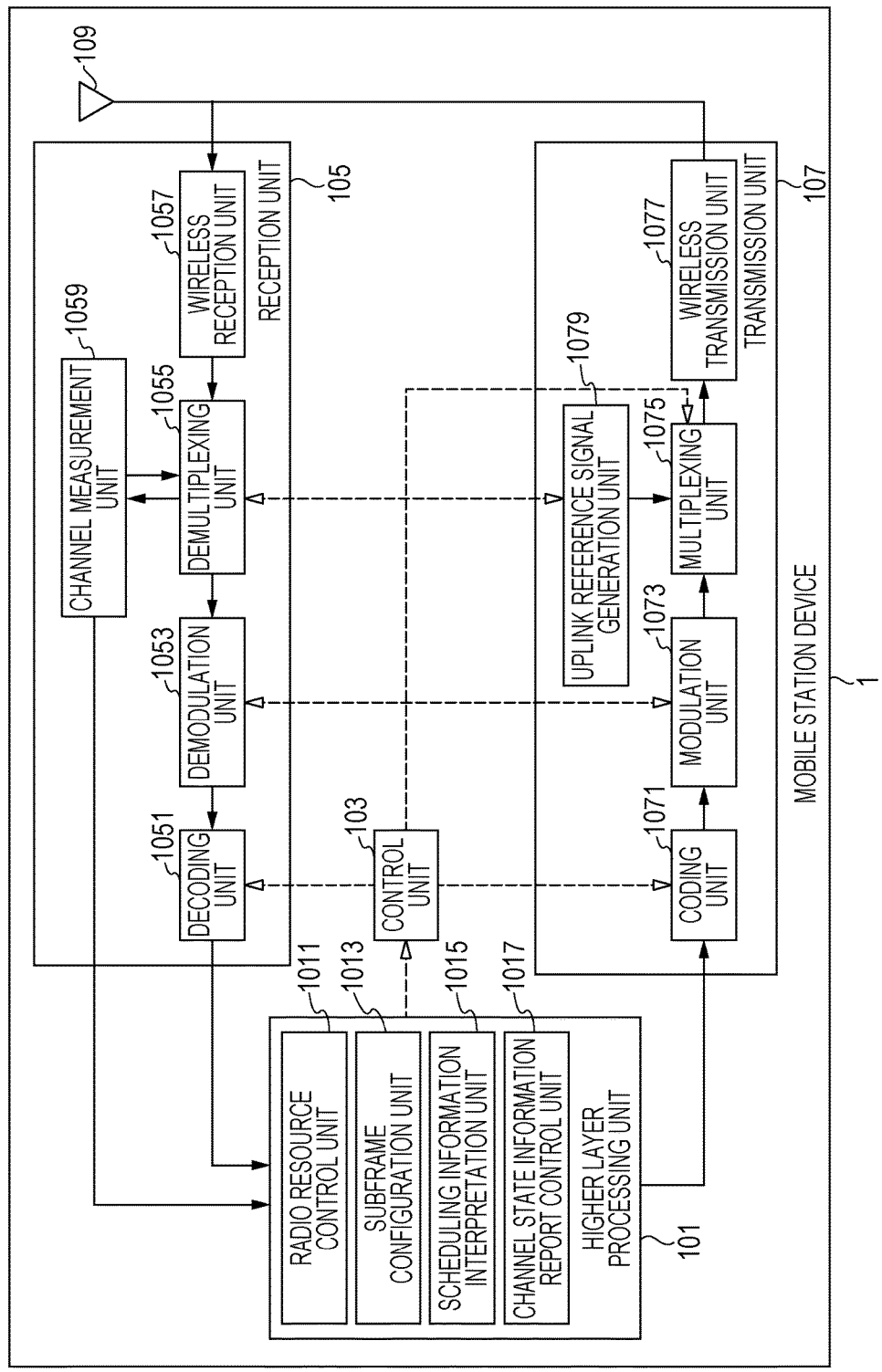
FIG. 7 is a schematic block diagram showing a structure of a terminal device 1 according to the present embodiment.

FIG. 7 is a schematic block diagram showing a structure of the terminal device 1 according to the present embodiment. As shown in the drawing, the terminal device 1 includes a higher layer processing unit 101, a control unit 103, a reception unit 105, a transmission unit 107, and a transmit and receive antenna 109. The higher layer processing unit 101 includes a radio resource control unit 1011, a subframe configuration unit 1013, a scheduling information interpretation unit 1015, and a channel state information (CSI) report control unit 1017. The reception unit 105 includes a decoding unit 1051, a demodulation unit 1053, a demultiplexing unit 1055, a wireless reception unit 1057, and a channel measurement unit 1059. The transmission unit 107 includes a coding unit 1071, a modulation unit 1073, a multiplexing unit 1075, a wireless transmission unit 1077, and an uplink reference signal generation unit 1079.

The higher layer processing unit 101 outputs uplink data (transport block) generated through an operation of a user to the transmission unit 107. The higher layer processing unit 101 performs processes of a medium access control (MAC) layer, a packet data convergence protocol (PDCP) layer, a radio link control (RLC) layer and a radio resource control (RRC) layer. In a case where the carrier aggregation is performed, the higher layer processing unit 101 has a function of controlling the physical layer in order to perform the activation/deactivation of the cell, and a function of controlling the physical layer in order to manage the transmission timing of the uplink. The higher layer processing unit 101 has a function of determining whether or not to instruct the measurement to be calculated in the reception unit 105 and to report the measurement result calculated in the reception unit 105.

The radio resource control unit 1011 included in the higher layer processing unit 101 manages various configuration information items of the terminal device. The radio resource control unit 1011 generates information allocated to each channel of the uplink, and outputs the allocated information to the transmission unit 107.

The subframe configuration unit 1013 included in the higher layer processing unit 101 manages a subframe configuration in the base station device 3 and/or the base station device (for example, the base station device 3A) different from the base station device 3 based on the information configured by the base station device 3. For example, the subframe configuration is a configuration of the uplink or the downlink for the subframe. The subframe configuration includes a subframe pattern configuration, an uplink-downlink configuration, an uplink reference UL-DL configuration (uplink reference configuration), a downlink reference UL-DL configuration (downlink reference configuration), and/or a transmission direction UL-DL configuration (transmission direction configuration). The subframe configuration unit 1013 sets the subframe configuration, the subframe pattern configuration, the uplink-downlink configuration, the uplink reference UL-DL configuration, the downlink reference UL-DL configuration, and/or the transmission direction UL-DL configuration. The subframe configuration unit 1013 may set at least two subframe sets. The subframe pattern configuration includes an EPDCCH subframe configuration. The subframe configuration unit 1013 is also referred to as a terminal subframe configuration unit.

The scheduling information interpretation unit 1015 included in the higher layer processing unit 101 interprets the DCI format (scheduling information) received through the reception unit 105, generates control information in order to control the reception unit 105 and the transmission unit 107 based on the result acquired by interpreting the DCI format, and outputs the generated control information to the control unit 103.

The scheduling information interpretation unit 1015 determines timings when a transmission process and a reception process are performed based on the subframe configuration, the subframe pattern configuration, the uplink-downlink configuration, the uplink reference UL-DL configuration, the downlink reference UL-DL configuration, and/or the transmission direction UL-DL configuration.

The CSI report control unit 1017 identifies a CSI reference resource. The CSI report control unit 1017 instructs the channel measurement unit 1059 to derive a CQI associated with the CSI reference resource. The CSI report control unit 1017 instructs the transmission unit 107 to transmit the CQI. The CSI report control unit 1017 sets the configuration used when the channel measurement unit 1059 calculates the CQI.

The control unit 103 generates control signals for controlling the reception unit 105 and the transmission unit 107 based on the control information from the higher layer processing unit 101. The control unit 103 outputs the generated control signals to the reception unit 105 and the transmission unit 107, and controls the reception unit 105 and the transmission unit 107.

The reception unit 105 separates, demodulates and decodes the reception signal received by the transmit and receive antenna 109 from the base station device 3 based on the control signal input from the control unit 103. The reception unit 105 outputs the decoded information to the higher layer processing unit 101.

The wireless reception unit 1057 converts the downlink signal received by the transmit and receive antenna 109 into an intermediate frequency (performs down conversion), removes an unnecessary frequency components, controls an amplification level such that a signal level is appropriately maintained, performs orthogonal demodulation based on in-phase components and quadrature components of the received signal, and converts an analog signal acquired through the orthogonal demodulation into a digital signal. The wireless reception unit 1057 removes components equivalent to guard intervals (GIs) from the converted digital signal, performs fast Fourier transform (FFT) on the signal acquired by removing the guard intervals, and extracts a signal in the frequency domain.

The demultiplexing unit 1055 separates the extracted signal into the PHICH, the PDCCH, the EPDCCH, the PDSCH, and/or the downlink reference signal. The demultiplexing unit 1055 compensates the channel of the PHICH, the PDCCH, the EPDCCH, and/or the PDSCH from an estimation value of the channel input from the channel measurement unit 1059. The demultiplexing unit 1055 outputs the separated downlink reference signal to the channel measurement unit 1059.

The demodulation unit 1053 multiplies the PHICH by a corresponding code to combine them, performs demodulation of a binary phase shift keying (BPSK) modulation scheme on the combined signal, and outputs the demodulated signal to the decoding unit 1051. The decoding unit 1051 decodes the PHICH addressed to the terminal device, and outputs the decoded HARQ indicator to the higher layer processing unit 101. The demodulation unit 1053 performs modulation of a QPSK modulation scheme on the PDCCH and/or the EPDCCH, and outputs the demodulated PDCCH and/or the EPDCCH to the decoding unit 1051. The decoding unit 1051 tries to decode the PDCCH and/or the EPDCCH, and outputs the decoded downlink control information and the RNTI corresponding to the downlink control information to the higher layer processing unit 101 in a case where the decoding succeeds.

The demodulation unit 1053 performs demodulation of a modulation scheme, such as quadrature phase shift keying (QPSK), 16 quadrature amplitude modulation (QAM), 64-QAM, which is notified through the downlink grant, on the PDSCH, and outputs the demodulated PDSCH to the decoding unit 1051. The decoding unit 1051 performs decoding based on information related to a coding rate notified through the downlink control information, and outputs the decoded downlink data (transport block) to the higher layer processing unit 101.

The channel measurement unit 1059 measures a path loss of the downlink or a state of the channel from the downlink reference signal input from the demultiplexing unit 1055, and outputs the measured path loss and channel state to the higher layer processing unit 101. The channel measurement unit 1059 calculates an estimation value of the channel of the downlink from the downlink reference signal, and outputs the estimation value to the demultiplexing unit 1055. In order to calculate the CQI, the channel measurement unit 1059 performs channel measurement and/or interference measurement. The channel measurement unit 1059 performs measurement for notifying the higher layer from the downlink reference signal input from the demultiplexing unit 1055. The channel measurement unit 1059 calculates the RSRP and the RSRQ, and outputs the calculated RSRP and RSRQ to the higher layer processing unit 101.

According to the control signal input from the control unit 103, the transmission unit 107 generates the uplink reference signal, codes and modulates the uplink data (transport block) input from the higher layer processing unit 101, multiplexes the PUCCH, the PUSCH, and the generated uplink reference signal, and transmits the multiplexed signal to the base station device 3 through the transmit and receive antenna 109.

The coding unit 1071 performs coding such as convolutional coding or block coding on the uplink control information input from the higher layer processing unit 101. The coding unit 1071 performs turbo coding based on information used in scheduling the PUSCH.

The modulation unit 1073 modulates coding bits input from the coding unit 1071 by using a modulation scheme, such as BPSK, QPSK, 16-QAM or 64-QAM, which is notified through the downlink control information, or a modulation scheme previously determined for each channel. The modulation unit 1073 determines the number of sequences of data which is spatial-multiplexed based on the information used in scheduling the PUSCH, maps a plurality of uplink data items transmitted through the same PUSCH by using multiple input multiple output spatial multiplexing (MIMO SM) to a plurality of sequences, and performs precoding on the sequences.

The uplink reference signal generation unit 1079 generates a sequence acquired by a predetermined rule (expression) based on physical layer cell identity (PCI) (referred to as Cell ID) for identifying the base station device 3, a bandwidth to which the uplink reference signal is allocated, a cyclic shift notified through the uplink grant, and a parameter value for generating a DMRS sequence. According to the control signal input from the control unit 103, the multiplexing unit 1075 rearranges the modulation symbols of the PUSCH in parallel, and then performs discrete Fourier transform (DFT). The multiplexing unit 1075 multiplexes the PUCCH and PUSCH signals and the generated uplink reference signal for each transmit antenna port. That is, the multiplexing unit 1075 arranges the PUCCH and PUSCH signals and the generated uplink reference signal in the resource elements for each transmit antenna port.

The wireless transmission unit 1077 performs inverse fast Fourier transform (IFFT) on the multiplexed signal, performs modulation of a SC-FDMA scheme, adds the guard intervals to the SC-FDMA symbols acquired through the SC-FDMA modulation, and generates a baseband digital signal. The wireless transmission unit converts the baseband digital signal into an analog signal, generates in-phase components and quadrature components of the intermediate frequency from the analog signal, removes excessive frequency components in the intermediate frequency band, converts the signal having the intermediate frequency into a signal having a high frequency (performs up conversion), and removes excessive frequency components. The transmission unit amplifies power, and outputs and transmits the amplified signal to the transmit and receive antenna 109.

Figure 8:
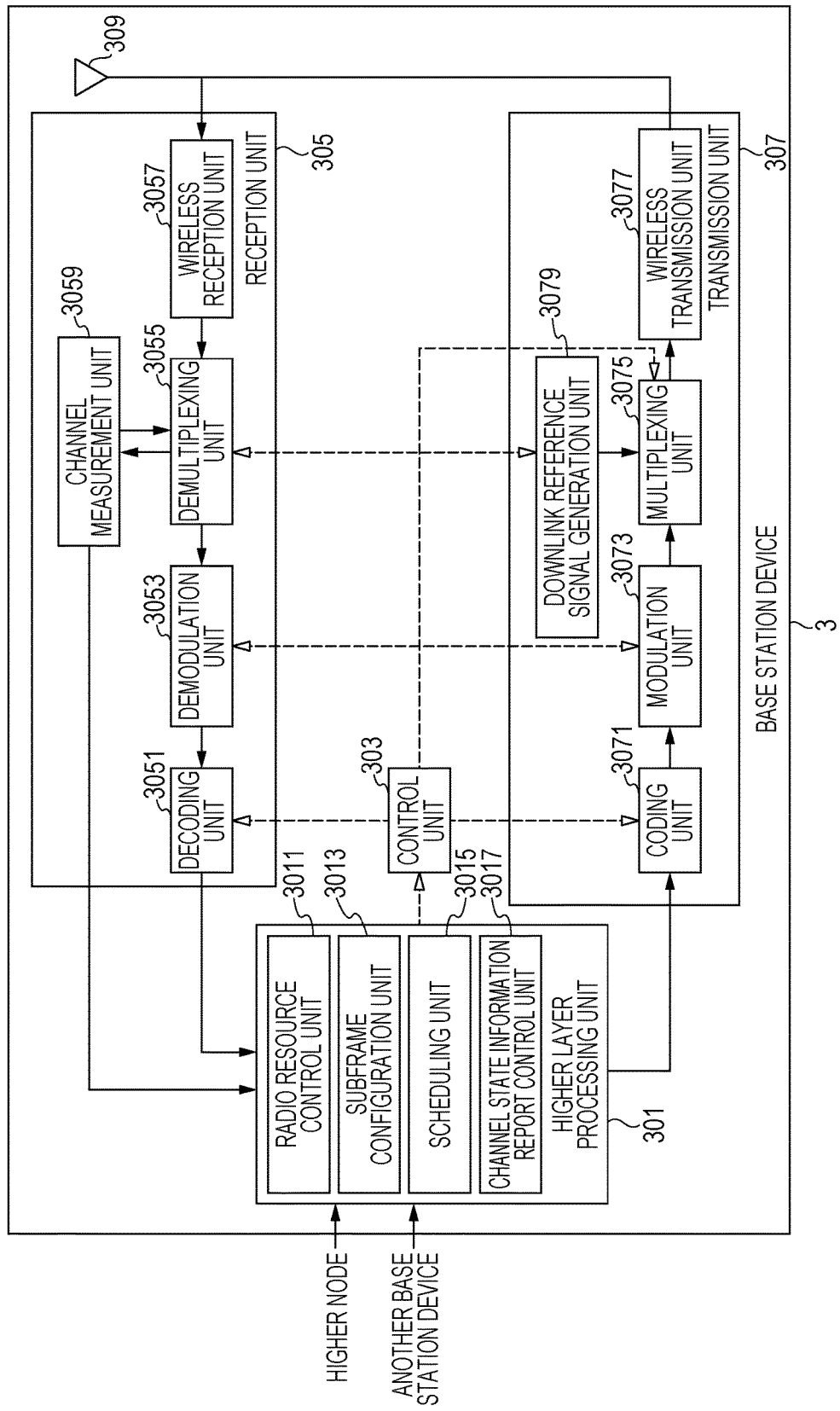
FIG. 8 is a schematic block diagram showing a structure of a base station device 3 according to the present embodiment.

FIG. 8 is a schematic block diagram showing a structure of the base station device 3 according to the present embodiment. As shown in the drawing, the base station device 3 includes a higher layer processing unit 301, a control unit 303, a reception unit 305, a transmission unit 307, and a transmit and receive antenna 309. The higher layer processing unit 301 includes a radio resource control unit 3011, a subframe configuration unit 3013, a scheduling unit 3015, and a CSI report control unit 3017. The reception unit 305 includes a decoding unit 3051, a demodulation unit 3053, a demultiplexing unit 3055, a wireless reception unit 3057, and a channel measurement unit 3059. The transmission unit 307 includes a coding unit 3071, a modulation unit 3073, a multiplexing unit 3075, a wireless transmission unit 3077, and a downlink reference signal generation unit 3079.

The higher layer processing unit 301 performs the processes of the medium access control (MAC) layer, the packet data convergence protocol (PDCP) layer, the radio link control (RLC) layer and the radio resource control (RRC) layer. The higher layer processing unit 301 generates control information in order to control the reception unit 305 and the transmission unit 307, and outputs the generated control information to the control unit 303. The higher layer processing unit 301 having a function of acquiring the reported measurement result.

The radio resource control unit 3011 included in the higher layer processing unit 301 generates downlink data (transport block), system information, RRC message or MAC control element (CE) which is allocated to the PDSCH of the downlink or acquires the information from a higher node, and outputs the generated or acquired information to the transmission unit 307. The radio resource control unit 3011 manages various configuration information items of each terminal device 1.

The subframe configuration unit 3013 included in the higher layer processing unit 301 manages the subframe configuration, the subframe pattern configuration, the uplink-downlink configuration, the uplink reference UL-DL configuration, the downlink reference UL-DL configuration, and/or the transmission direction UL-DL configuration for each terminal device 1. The subframe configuration unit 3013 sets the subframe configuration, the subframe pattern configuration, the uplink-downlink configuration, the uplink reference UL-DL configuration, the downlink reference UL-DL configuration, and/or the transmission direction UL-DL configuration for each terminal device 1. The subframe configuration unit 3013 transmits information related to the subframe configuration to the terminal device 1. The subframe configuration unit 3013 is also referred to as a base station subframe configuration unit.

The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the terminal device 1. The base station device 3 may determine the subframe configuration, the subframe pattern configuration, the uplink-downlink configuration, the uplink reference UL-DL configuration, the downlink reference UL-DL configuration, and/or the transmission direction UL-DL configuration for the terminal device 1 according to the indication from the higher node.

For example, the subframe configuration unit 3013 may determine the subframe configuration, the subframe pattern configuration, the uplink-downlink configuration, the uplink reference UL-DL configuration, the downlink reference UL-DL configuration, and/or the transmission direction UL-DL configuration based on a traffic amount of the uplink and a traffic amount of the downlink.

The subframe configuration unit 3013 may manage at least two subframe sets. The subframe configuration unit 3013 may set at least two subframe sets to each terminal device 1. The subframe configuration unit 3013 may set at least two subframe sets to each serving cell. The subframe configuration unit 3013 may set at least two subframe sets to each CSI process. The subframe configuration unit 3013 may transmit information indicating at least two subframe sets to the terminal device 1 through the transmission unit 307.

The scheduling unit 3015 included in the higher layer processing unit 301 determines subframes and frequencies to which the physical channels (PDSCH and PUSCH) are assigned, coding rates of the physical channels (PDSCH and PUSCH), a modulation scheme, and a transmission power from the received channel state information and the estimation value of the channel or the quality of the channel input from the channel measurement unit 3059. The scheduling unit 3015 determines whether to schedule the downlink physical channel and/or the downlink physical signal or the uplink physical channel and/or the uplink physical signal in the flexible subframe. The scheduling unit 3015 generates control information (for example, DCI format) in order to control the reception unit 305 and the transmission unit 307 based on the scheduling result, and outputs the generated control information to the control unit 303.

The scheduling unit 3015 generates information used in scheduling the physical channels (PDSCH and PUSCH) based on the scheduling result. The scheduling unit 3015 determines timings (subframes) when the transmission process and the reception process are performed based on the UL-DL configuration, the subframe pattern configuration, the uplink-downlink configuration, the uplink reference UL-DL configuration, the downlink reference UL-DL configuration, and/or the transmission direction UL-DL configuration.

The CSI report control unit 3017 included in the higher layer processing unit 301 controls the CSI report of the terminal device 1. The CSI report control unit 3017 transmits information indicating various configurations assumed in order to cause the terminal device 1 to derive the CQI in the CSI reference resource to the terminal device 1 through the transmission unit 307.

The control unit 303 generates control signals for controlling the reception unit 305 and the transmission unit 307 based on the control information from the higher layer processing unit 301. The control unit 303 outputs the generated control signals to the reception unit 305 and the transmission unit 307 to control the reception unit 305 and the transmission unit 307.

The reception unit 305 separates, demodulates, and decodes the reception signal received from the terminal device 1 through the transmit and receive antenna 309 according to the control signal input from the control unit 303, and outputs the decoded information to the higher layer processing unit 301. The wireless reception unit 3057 converts the uplink signal received through the transmit and receive antenna 309 into an intermediate frequency (performs down conversion), removes unnecessary frequency components, controls an amplification level such that a signal level is approximately maintained, performs orthogonal demodulation based on the in-phase components and quadrature components of the received signal, and converts an analog signal acquired through the orthogonal demodulation into a digital signal.

The wireless reception unit 3057 removes components equivalent to guard intervals (GIs) from the converted digital signal. The wireless reception unit 3057 performs fast Fourier transform (FFT) on the signal acquired by removing the guard intervals, extracts the signal in the frequency domain, and outputs the extracted signal to the demultiplexing unit 3055.

The demultiplexing unit 1055 separates the signal input from the wireless reception unit 3057 into signals such as the PUCCH, the PUSCH and the uplink reference signal. The demultiplexing is performed based on assignment information of a radio resource which is previously determined by the radio resource control unit 3011 of the base station device 3 and is included in the uplink grant notified to each terminal device 1. The demultiplexing unit 3055 compensates the channels of the PUCCH and the PUSCH from the estimation value of the channel input from the channel measurement unit 3059. The demultiplexing unit 3055 outputs the separated uplink reference signal to the channel measurement unit 3059.

The demodulation unit 3053 performs inverse discrete Fourier transform (IDFT) on the PUSCH, acquires the modulation symbols, and demodulates the reception signal for the modulation symbols of the PUCCH and the PUSCH by using a modulation scheme, such as binary phase shift keying (BPSK), QPSK, 16-QAM or 64-QAM, which is previously determined or previously notified through the uplink grant to each terminal device 1 from the base station device. The demodulation unit 3053 separates the modulation symbols of a plurality of uplink data items transmitted through the same PUSCH by using the MIMO SM based on the number of sequences which are previously notified through the uplink grant to each terminal device 1 and are spatial-multiplexed, and the information indicating that precoding is performed on the sequences.

The decoding unit 3051 performs decoding on coding bits of the demodulated PUCCH and PUSCH by a predetermined coding scheme at a coding rate which is previously determined or is previously notified to the terminal device 1 from the base station device through the uplink grant, and outputs the decoded uplink data and the uplink control information to the higher layer processing unit 101. In a case whether the PUSCH is retransmitted, the decoding unit 3051 performs decoding by using coding bits which are input from the higher layer processing unit 301 and are retained in a HARQ buffer and the demodulated coding bits. The channel measurement unit 309 measures the estimation value of the channel or the quality of the channel from the uplink reference signal input from the demultiplexing unit 3055, and outputs the measured result to the demultiplexing unit 3055 and the higher layer processing unit 301.

The transmission unit 307 generates the downlink reference signal according to the control signal input from the control unit 303, codes and modulates the HARQ indicator, the downlink control information and the downlink data input from the higher layer processing unit 301, multiplexes the PHICH, the PDCCH, the EPDCCH, the PDSCH, and the downlink reference signal, and transmits the signal to the terminal device 1 through the transmit and receive antenna 309.

The coding unit 3071 performs coding on the HARQ indicator, the downlink control information and the downlink data input from the higher layer processing unit 301 by using a predetermined coding scheme such as block coding, convolutional coding or turbo coding, or performs coding by using a coding scheme determined by the radio resource control unit 3011. The modulation unit 3073 modulates the coding bits input from the coding unit 3071 by using a modulation scheme, such as BPSK, QPSK, 16-QAM or 64-QAM, which is previously determined or is determined by the radio resource control unit 3011.

The downlink reference signal generation unit 3079 generates a sequence which is acquired by a predetermined rule based on the physical layer cell identity (PCI) for identifying the base station device 3 and is known to the terminal device 1, as the downlink reference signal. The multiplexing unit 3075 multiplexes the modulation symbols of each modulated channel and the generated downlink reference signal. That is, the multiplexing unit 3075 arranges the modulation symbols of each modulated channel and the generated downlink reference signal in the resource elements.

The wireless transmission unit 3077 performs inverse fast Fourier transform (IFFT) on the multiplexed modulation symbols, performs modulation of an OFDM scheme, adds the guard intervals to the OFDM symbols acquired through the OFDM modulation, and generates a baseband digital signal. The wireless transmission unit converts the baseband digital signal into an analog signal, generates in-phase components and quadrature components of the intermediate frequency from the analog signal, removes excessive frequency components in the intermediate frequency band, converts the signal having the intermediate frequency into a signal having a high frequency (performs up conversion), and removes excessive frequency components. The transmission unit amplifies power, and outputs and transmits the amplified signal to the transmit and receive antenna 309.

Here, the PDCCH or the EPDCCH is used to notify (designate) the terminal device of the downlink control information (DCI). For example, the downlink control information includes information related to resource assignment of the PDSCH, information related to a modulation and coding scheme (MCS), information related to scheduling identity (also referred to as a scheduling identifier), and information related to a reference signal sequence identity (also referred to as base sequence identity, base sequence identifier, or base sequence index).

Hereinafter, a small cell will be described.

The small cell is the general term for cells which are constituted by the base station device 3 having a transmission power lower than that of a macrocell and have narrow coverage. Since the small cell can be configured to have narrow coverage, the small cells can be operated by being densely arranged. The base station device 3 as the small cell is arranged in a place different from the base station device as the macrocell. The densely arranged small cells may be synchronized with each other, and may be provided as a small cell cluster. The small cells within the small cell cluster may be connected through backhaul (optical fiber, X2 interface or S1 interface), and an interference suppression technique such as enhanced Inter-Cell Interference Coordination (eICIC), Further enhanced Inter-cell Interference Coordination (FeICIC), or Coordinated Multi-point transmission/reception (CoMP) may be applied in the small cells within the small cell cluster. The small cell may be operated in a frequency band different from that of the macrocell, or may be operated in the same frequency band as that of the macrocell. Particularly, in view of channel attenuation (path loss), it is possible to easily allow the small cell to have narrower coverage by operating the small cell in a frequency band higher than that of the macrocell.

The small cell operated in the different frequency band is operated using the macrocell and the carrier aggregation technology or the dual connectivity technology.

The small cell may be operated in the same frequency as that of the macrocell. The small cell may be operated out of the coverage of the macrocell. The base station device 3 as the small cell may be arranged in the same place as that of the base station device as the macrocell.

The base station device 3 recognizes whether a certain cell is the macrocell or the small cell, and terminal device 1 does not need to recognize whether a certain cell is the macrocell or the small cell. For example, the base station device 3 may configure the macrocell as the Pcell may configure the small cell as the Scell or the pSCell for the terminal device 1. In any case, the terminal device 1 may recognize a certain cell as the PCell, the SCell or the pSCell, and does not need to recognize a certain cell as the macrocell or the small cell.

Hereinafter, the details of the carrier aggregation technology and the dual connectivity technology will be described.

The secondary cell may be configured such that the secondary cell and the primary cell constitute a set of serving cells depending on the capability (performance and function) of the terminal device 1. The number of downlink component carriers configured for the terminal device 1 needs to be equal to or greater than the number of uplink component carriers configured for the terminal device 1, and only the uplink component carriers are not able to be configured as the secondary cells.

The terminal device 1 uses constantly the primary cell and the primary secondary cell for transmitting the PUCCHs. In other words, the terminal device 1 does not expect to transmit the PUCCH in the secondary cell other than the primary cell and the primary secondary cell.

The reconfiguration/addition/removal of the secondary cell is performed by the RRC. When a new secondary cell is added, all system information items required by the new secondary cell are transmitted through the dedicated RRC signaling. That is, it is not necessary to directly acquire the system information from the secondary cell through the broadcasting in an RRC connected mode.

When the carrier aggregation is configured, the mechanism of the activation/deactivation of the secondary cell is supported. The activation/deactivation is not applied to the primary cell. When the secondary cell is deactivated, the terminal device 1 does not need to receive the associated PDCCH or PDSCH, is not able to perform the transmission in the associated uplink, and does not need to perform CQI measurement. In contrast, when the secondary cell is activated, since the terminal device 1 receives the PDSCH and the PDCCH, it is expected that the CQI measurement can be performed.

The mechanism of the activation/deactivation is based on the combination of the MAC CE and a deactivation timer. The MAC CE notifies of information of the activation and the deactivation of the secondary cell as a bitmap. A bit set to be 1 indicates the activation of the associated secondary cell, and a bit set to be 0 indicates the deactivation of the associated secondary cell.

The deactivation as an initial state is configured for the secondary cell configured for the terminal device 1. That is, even though various parameters for the secondary cell are configured for the terminal device 1, the communication may or may not be immediately performed using the secondary cell.

Hereinafter, an example of the MAC CE will be described.

An example of a structure of the activation/deactivation MAC CE will be described. The MAC CE has a fixed size, and includes seven Ci fields and one R field. The MAC CE is defined as follows. As for the Ci, in a case where there is the secondary cell for which a secondary cell index (SCellIndex) i is configured, the Ci field indicates a state of the activation/deactivation of the secondary cell accompanying by the secondary cell index i. In a case where there is no secondary cell for which the secondary cell index i is configured, the terminal device 1 ignores the Ci field. A case where the Ci field is set to be "1" means that the secondary cell accompanying by the secondary cell index i is activated. A case where the Ci field is set to be "0" means that the secondary cell accompanying by the secondary cell index i is deactivated. The R is a reserved bit, and is set to be "0".

Hereinafter, an example of the deactivation timer for the secondary cell will be described.

In a case where the deactivation timer is configured for the secondary cell, the deactivation timer is a timer associated with a maintaining time of the secondary cell. The terminal device 1 retains the deactivation timer for each secondary cell, and deactivates the secondary cell associated with the expired deactivation timer if the deactivation timer expires.

An initial value of the deactivation timer for the secondary cell is configured using a parameter sCellDeactivationTimer-r10 from the higher layer (RRC layer). For example, one of rf2, rf4, rf8, rf16, rf32, rf64 and rf128 which are values associated with the number of radio frames is configured for the initial value of the deactivation timer for the secondary cell. Here, the rf2 corresponds to 2 radio frames, the rf4 corresponds to 4 radio frames, the rf8 corresponds to 8 radio frames, the rf16 corresponds to 16 radio frames, the rf32 corresponds to 32 radio frames, the rf64 corresponds to 64 radio frames, and the rf128 corresponds to 128 radio frames.

The field (parameter sCellDeactivationTimer-r10) associated with the deactivation timer for the secondary cell is configured for only the terminal device 1 for which one or more secondary cells are configured.

In a case where there is no field associated with the deactivation timer, it is assumed that the terminal device 1 removes an existing value of the field associated with the deactivation timer and an infinity value is configured.

In a case where only one field associated with the deactivation timer for the secondary cell is configured for the terminal device 1, the same initial value of the deactivation timer is adapted to each secondary cell (a function associated with the deactivation timer is independently performed in each secondary cell).

An example of the mechanism of the activation/deactivation will be described.

In a case where the MAC CE indicating the activation of the secondary cell is received, the terminal device 1 configures the secondary cell for which the activation is configured by the MAC CE as activation. Here, the terminal device 1 may perform the following operation on the secondary cell for which the activation is configured by the MAC CE. This operation includes the transmission of the SRS in the secondary cell, the reporting of the channel quality indicator (CQI)/precoding matrix indicator (PMI)/rank indicator (RI)/precoding type indicator (PTI) for the secondary cell, the transmission of the uplink data (UL-SCH) in the secondary cell, the transmission of the RACH in the secondary cell, the monitoring of the PDCCH in the secondary cell, and the monitoring of the PDCCH for the secondary cell.

In a case where the MAC CE indicating the activation of the secondary cell is received, the terminal device 1 starts or restarts the deactivation timer associated with the secondary cell for which the activation is configured by the MAC CE. The starting means that the timer which retains the value starts to count. The restarting means that the value is configured as the initial value and the timer restarts to count.

In a case where the MAC CE indicating the activation of the secondary cell is received, the terminal device 1 triggers the transmission of a remaining power of the transmission power (power head room (PHR)).

In a case where the MAC CE indicating the deactivation of the secondary cell is received, or in a case where the deactivation timer associated with the secondary cell expires, the terminal device 1 configures the secondary cell for which the deactivation is configured by the MAC CE, as the deactivation.

In a case where the MAC CE indicating the deactivation of the secondary cell is received, or in a case where the deactivation timer associated with the secondary cell expires, the terminal device 1 stops the deactivation timer associated with the secondary cell for which the deactivation is configured by the MAC CE.

In a case where the MAC CE indicating the deactivation of the secondary cell is received, or in a case where the deactivation timer associated with the secondary cell expires, the terminal device 1 flashes all the HARQ buffers associated with the secondary cell for which the deactivation is configured by the MAC CE.

In a case where the PDCCH in the activated secondary cell indicates the downlink grant or the uplink grant, or in a case where the PDCCH in the serving cell in which the activated secondary cell is scheduled indicates the downlink grant for the activated secondary cell or the uplink grant for the activated secondary cell, the terminal device 1 restarts the deactivation timer associated with the activated secondary cell.

In a case where the secondary cell is deactivated, the terminal device 1 does not perform the following operation on the deactivated secondary cell. This operation includes the transmission of the SRS in the secondary cell, the reporting of the CQI/PMI/RI/PTI for the secondary cell, the transmission of the uplink data (UL-SCH) in the secondary cell, the transmission of the RACH in the secondary cell, the monitoring of the PDCCH in the secondary cell, and the monitoring of the PDCCH for the secondary cell.

In a case where the deactivation is configured for the secondary cell on which the random access procedure is being performed, the terminal device 1 stops the random access procedure being performed.

Even in a case where the transmission and reception of data to and from the terminal device 1 are not performed, the base station device 3 transmits the synchronization signal, the reference signal and the broadcasting information such as the PSS/SSS, the CRS, the PBCH, and the SIB in order for the terminal device 1 in an idle state to be connected to the base station device 3. Thus, these signals cause inter-cell interference. These signals are constantly transmitted, and thus, the power of the base station device 3 is wasted.

Thus, the base station device 3 performs transmission to an ON state (an operating state or an activated state) or an OFF state (a deactivated state). In a case where the base station device 3 does not transmit and receive data to and from the terminal device 1, the base station device 3 may perform transition to the OFF state. In a case where the base station device 3 transmits and receives data to and from the terminal device 1, the base station device 3 may perform transition to the ON state.

For example, the deactivated state of the base station device 3 is a state in which at least one of the PSS/SSS, the CRS, the PBCH, the PDCCH and the PDSCH is not transmitted. For example, the deactivated state is a state in which the PSS/SSS is not transmitted over one or more half frames (5 or more subframes). For example, the deactivated state of the base station device 3 is a state in which only the DRS is transmitted. The base station device 3 may perform the reception process in the reception unit of the base station device even in the deactivated state.

The activated state of the base station device 3 is a state in which at least one of at least PSS/SSS and the CRS is transmitted. For example, the activated state is a state in which the PSS/SSS is transmitted in one half frame.

The terminal device 1 may associate the ON state and the OFF state of the base station device 3 with a process (assumption or operation) on a predetermined channel or a predetermined signal. Here, the process is monitoring, a reception process or a transmission process. That is, the terminal device 1 may not recognize that the base station device 3 is in the ON state or the OFF state, and the terminal device 1 may switch to the process on the predetermined channel or the predetermined signal. In the description of the present embodiment, the transition to the activated state and the deactivated state in the base station device 3 includes the switching of the processes between the predetermined channel and the predetermined signal in the terminal device 1. The activated state in the base station device 3 corresponds to a first process on the predetermined channel or the predetermined signal in the terminal device 1. The deactivated state in the base station device 3 corresponds to a second process on the predetermined channel or the predetermined signal in the terminal device 1.

For example, the ON state of the base station device 3 is a state in which the terminal device 1 can perform the same process as that of the terminal device of the related art. A specific example in the ON state of the base station device 3 is as follows. The terminal device 1 expects to receive the PSS, the SSS and the PBCH. The terminal device 1 monitors that the PDCCH and/or the EPDCCH in a predetermined subframe. The terminal device 1 performs the CSI reporting based on the configured CSI reporting mode. The terminal device 1 expects that there are the reference signal (for example, the CRS or the CSI-RS) and the CSI reference resource for reporting the CSI.

For example, the OFF state of the base station device 3 is a state in which the terminal device 1 performs a process different from that of the terminal device of the related art. A specific example of the OFF state of the base station device 3 is as follows. The terminal device 1 does not expect to receive the PSS, the SSS and the PBCH. The terminal device 1 does not monitor the PDCCH and/or the EPDCCH in all the subframes. The terminal device 1 does not perform the CSI reporting irrespective of the configured CSI reporting mode. The terminal device 1 does not expect that there are the reference signal (for example, the CRS or the CSI-RS) and the CSI reference resource for reporting the CSI.

For example, the transition to the activated state and the deactivated state of the base station device 3 is determined based on the connection state of the terminal device 1, a data request status of the terminal device 1 connected to the base station device 3, and information of the CSI measurement and/or the RRM measurement from the terminal device 1.

The base station device 3 may explicitly or implicitly configure or notify the terminal device 1 of information (cell state information) related to the transition to the activated state and the deactivated state of the base station device 3. For example, the base station device 3 notifies explicitly the terminal device 1 of the cell state information by using the RRC, the MAC, the PDCCH and/or the EPDCCH. The base station device 3 notifies implicitly the terminal device 1 of the cell state information depending on whether or not there is the predetermined channel or signal.

An example of a procedure in which the base station device 3 in the activated state performs transition to the deactivated state (the cell state information is notified) will be described.

The base station device 3 (serving cell) connected to the terminal device 1 determines whether or not to perform the transition to the deactivated state from the activated state based on the connection state of the terminal device 1, the data status of the terminal device 1, and the measurement information of the terminal device 1. The base station device 3 which determines to perform the transition to the deactivated state transmits information indicating the transition to the deactivated state to the base station device 3 as the surrounding cell, and prepares to stop the cell. The determination of whether or not to perform the transition to the deactivated state from the activated state and the transmission the information indicating the transition to the deactivated state may not be performed in the serving cell, or such determination and transmission may be performed in, for example, the Mobility Management Entity (MME) or the Serving Gateway (S-GW). In the preparing to stop the cell, in a case where the terminal device 1 is connected to the base station device 3, the transmission of an indication indicating a handover to the surrounding cell or the transmission of an indication indicating the deactivation of the terminal device to the terminal device 1 are performed. The serving cell in which there is no the connected terminal device 1 through the preparing to stop the cell performs transition to the deactivated state from the activated state.

In a case where the terminal device 1 communicates with the base station device 3 in the deactivated state, the base station device 3 performs transition to the activated state to the deactivated state. A time during which the transition to the activated state from the deactivated state is performed and a time during which the transition to the deactivated state from the activated state is performed are referred to as a transition time. The transition time is shortened, and thus, it is possible to reduce various interferences or power consumption of the base station device 3.

For example, whether or not to perform the transition of the base station device 3 in the deactivated state to the activated state is determined based on an uplink reference signal from the terminal device 1, cell detection information from the terminal device 1, and measurement information of the physical layer from the terminal device 1.

An example of a procedure in which the transition of the base station device 3 in the deactivated state to the activated state is performed based on the measurement information of the physical layer will be described.

The base station device 3 (serving cell) to which the terminal device 1 is connected and the base station device 3 (neighbour cell) in the deactivated state share the configuration of the DRS through the backhaul. The serving cell notifies the terminal device 1 of the configuration of the DRS. The neighbour cell transmits the DRS. The terminal device 1 detects the DRS transmitted from the neighbour cell based on the configuration of the DRS notified from the serving cell. The terminal device 1 measures the physical layer by using the DRS transmitted from the neighbour cell. The terminal device 1 reports the measurement of the serving cell. The serving cell determines whether or not to perform the transition of the base station device 3 in the deactivated state to the activated state based on the reporting of the measurement from the terminal device 1, and notifies the base station device 3 in the deactivated state of information indicating the activation through the backhaul in a case where it is determined that the transition to the activated state is performed. The determination of whether or not to perform the transition to the activated state from the deactivated state and the transmission of the information indicating the activation may not be performed in the serving cell, or such determination and transmission may be performed in, for example, the Mobility Management Entity (MME) or the Serving Gateway (S-GW). The neighbour cell that receives the information indicating the activation performs the transition to the activated state from the deactivated state.

An example of a procedure in which the transition of the base station device 3 in the deactivated state to the activated state is performed based on the measurement information of the physical layer will be described.

The base station device 3 (serving cell) to which the terminal device is connected and the base station device 3 (neighbour cell) in the deactivated state share the configuration of the SRS of the terminal device 1 through the backhaul. The serving cell notifies the terminal device 1 of the configuration of the SRS. The terminal device 1 transmits the SRS based on the configuration of the SRS or the indication of the SRS request. The neighbour cell detects the SRS transmitted from the terminal device 1. The neighbour cell measures the physical layer by using the SRS transmitted from the terminal device 1. Based on the measurement result through the SRS, the neighbour cell determines whether or not to perform the transition of the base station device 3 to the activated state, and performs the transition to the activated state from the deactivated state. The determination of whether or not to perform the transition to the activated state from the deactivated state may not be performed in the neighbour cell, or such determination and transmission may be performed in, for example, the serving cell, the Mobility Management Entity (MME), or the Serving Gateway (S-GW). In this case, after the measurement of the physical layer is performed using the SRS, the neighbour cell transmits the measurement result to the serving cell, the MME or the S-GW, and receives the information indicating the activation.

The serving cell may notify the terminal device 1 of the information indicating the activated/deactivated state of the surrounding cell. The terminal device 1 switches the action of the terminal device 1 by recognizing the activated state or the deactivated state of the cell. The action of the terminal device 1 is, for example, an interference measurement method.

An example of a method of notifying of the cell state information (information indicating the activated/deactivated state of the cell) will be described.

The information indicating the activated/deactivated state of a target cell is notified through Layer 1 signalling (L1 signalling). In other words, the information indicating the activated/deactivated state of the target cell is notified through the PDCCH or the EPDCCH. One corresponding bit is assigned to the target cell. 0 (false or disable) indicates the deactivated state, and 1 (true or enable) indicates the activated state. The bit corresponding to the target cell is included in a bitmap to be collected, and may simultaneously notify the plurality of cells of the activated/deactivated state. The association of the bit with the target cell is notified through the dedicated RRC signaling.

The information indicating the activated/deactivated state is notified through the downlink control information (DCI) format 1C. The information indicating the activated/deactivated state may be notified through the DCI format 3/3A. The information indicating the activated/deactivated state may be notified through a format having the same payload size (bit number) as that of the DCI format 1C.

Hereinafter, the DCI format will be described.

As the DCI format, there are a DCI format associated with the uplink scheduling and a DCI format associated with the downlink scheduling. The DCI format associated with the uplink scheduling is referred to as an uplink grant, and the DCI format associated with the downlink scheduling is referred to as a downlink grant (downlink assignment). One DCI format may be transmitted to the plurality of terminal devices 1. For example, in a case where only a transmission power control command (TPC command) is transmitted, the command may be transmitted to the plurality of terminal devices 1 at once. Such scheduling (or triggering) is referred to as group scheduling (group triggering). The terminal device 1 is individually assigned an index, and detects a bit based on the index.

The DCI format 0 is used to schedule the PUSCH in one uplink cell.

The DCI format 1 is used to schedule one PDSCH code word in one cell.

The DCI format 1A is used in the random access process started by a PDCCH order and compact scheduling of one PDSCH code word in one cell. The DCI equivalent to the PDCCH order may be transmitted through the PDCCH or the EPDCCH. The DCI format 0 and the DCI format 1A may be transmitted using the same bit information field, and the terminal device 1 determines whether the DCI format mapped to the received bit information field is the DCI format 0 or the DCI format 1A based on a value represented in a certain bit field.

The DCI format 1B is used in the compact scheduling of one PDSCH code word in one cell accompanying by the precoding information.

The DCI format 1C is used to notify of the change (alternation) of the multicast control channel (MCCH) and to perform the compact scheduling of one PDSCH code word. The DCI format 1C may be used to notify of a random access response by being scheduled using the random access-radio network temporary identifier (RA-RNTI). Here, for example, the compact scheduling means that the PDSCH having a narrow bandwidth is scheduled. A DCI format size is determined depending on a bandwidth used by the PDSCH in which the scheduling is performed. As the bandwidth is narrow, a required DCI format size may also be decreased. The DCI format 1C is scheduled using the RNTI (for example, eIMTA-RNTI) related to dynamic TDD (a first type (mode) of TDD), and thus, information indicating TDD UL-DL may be set to the DCI format 1C. If the dynamic TDD is the first type (mode) of TDD, the TDD of the related art is referred to as a second type (mode) of TDD.

The dynamic TDD is TDD of switching the TDD UL-DL configuration by using the L1 signalling depending on a communication status of the uplink/downlink. The dynamic TDD is used to extend interference management and traffic adaptation control. The dynamic TDD is referred to as enhanced interference management and traffic adaptation (eIMTA) or TDD-ModeA in some cases.

The DCI format 1D is used in the compact scheduling of one PDSCH code word in one cell accompanying by information related to power offset and precoding.

The DCI format 2/2A/2B/2C/2D is used to schedule two (or a plurality of) PDSCH code words as well as one PDSCH code word.

The DCI format 3/3A indicates a value of the transmission power control command for adjusting the transmission power of the PUSCH or the PUCCH for the plurality of terminal devices 1. The terminal device 1 may detect the value of the transmission power control command corresponding to the PUSCH or the PUCCH by detecting bit information corresponding to the index (TPC-index) assigned to the terminal device. It is determined whether the DCI format 3/3A indicates the transmission power control command corresponding to the PUSCH or the transmission power control command corresponding to the PUCCH depending on the type of the scrambled RNTI.

The DCI format 4 is used to schedule the PUSCH in one uplink cell accompanying by a multi-antenna-port transmission mode.

A cyclic redundancy check (CRC) is used to detect a DCI transmission error. The CRC is scrambled with each RNTI.

A CRC parity bit is scrambled with a cell-radio network temporary identifier (C-RNTI), a semi persistent scheduling cell-radio network temporary identifier (SPS C-RNTI), a system information-radio network temporary identifier (SI-RNTI), a paging-radio network temporary identifier (P-RNTI), a random access-radio network temporary identifier (RA-RNTI), a transmission power control-physical uplink control channel-radio network temporary identifier (TPC-PUCCH-RNTI), a transmission power control-physical uplink shared channel-radio network temporary identifier (TPC-PUSCH-RNTI), a temporary C-RNTI, a multimedia broadcast multicast services (MBMS)-radio network temporary identifier (M-RNTI), or a TDD-ModeA-RNTI.

The C-RNTI and the SPS C-RNTI are identifiers for identifying the terminal devices 1 within the cell. The C-RNTI is used to control the PDSCH or the PUSCH in a single subframe.

The SPS C-RNTI is used to periodically assign the PDSCH or PUSCH resource. The control channel having the CRC scrambled with the SI-RNTI is used to control a system information block (SIB).

The control channel having the CRC scrambled with the P-RNTI is used to control paging.

The control channel having the CRC scrambled with the RA-RNTI is used to control a response to the RACH.

The control channel having the CRC scrambled with the TPC-PUCCH-RNTI is used to control the power of the PUCCH. The control channel having the CRC scrambled with the TPC-PUSCH-RNTI is used to control the power of the PUSCH.

The control channel having the CRC scrambled with the temporary C-RNTI is used for the terminal device that is not identified by the C-RNTI.

The control channel having the CRC scrambled with the M-RNTI is used to control MBMS.

The control channel having the CRC scrambled with the TDD-ModeA-RNTI is used to notify the terminal device 1 of the information of the TDD UL/DL configuration of each TDD serving cell in the dynamic TDD.

The DCI format may be scrambled using a new RNTI in addition to the above-described RNTI.

Hereinafter, the details of the PDCCH or the EPDCCH will be described.

A control region of each serving cell includes a set of CCEs. The CCEs are assigned numbers from 0 to $N_{CCE,k}-1$. Here, the $N_{CCE,k}$ is the total number of CCEs within the control region of the subframe k.

The terminal device 1 monitors a set of PDCCH candidates of one or a plurality of activated serving cells configured through the higher layer signalling for the control information. Here, the monitoring means that decoding is tried to be performed on the respective PDCCHs within the set corresponding to all the monitored DCI formats.

The set of monitored PDCCH candidates is referred to as a search space. As the search space, a common search space (CSS) and a UE-specific search space (USS) are defined.

The common search space (CSS) is a search space configured using a parameter specific to the base station device 3 (cell or transmission point) and/or a predefined parameter. For example, the CSS is a search space capable of being commonly used in the plurality of terminal devices. Thus, the base station device 3 can reduce the resources for transmitting the control channel by mapping the common control channel to the CSS in the plurality of terminal devices.

The UE-specific search space (USS) is a search space configured using a parameter specific to at least the terminal device 1. Thus, since the control channel specific to the terminal device 1 can be individually transmitted in the USS, the base station device 3 can efficiently control the terminal device 1.

The CSS may be configured for the terminal device 1 by further using the unique parameter. In this case, it is preferable that the parameter specific to the terminal device 1 is configured such that the values are equal between the plurality of terminal devices. Even in a case where the CSS is configured by further using the parameter specific to the terminal device 1, the CSS is common to the plurality of terminal devices for which the same parameter is configured. For example, a unit for which the same parameter is configured between the plurality of terminal devices is the cell, the transmission point or the UE group. Since the plurality of terminal devices for which the same parameter is configured can receive the common control channel mapped to the CSS, it is possible to reduce the resources for transmitting the control channel. Such a search space may be referred to as the USS instead of the CSS. That is, the USS which is the search space common to the plurality of terminal devices may be configured. The USS specific to one terminal device is referred to as a first USS, and the USS common to the plurality of terminal devices is referred to as a second USS.

A search space $S^{(L)}_k$ for each aggregation level is defined by a set of PDCCH candidates. The number of CCEs used by one PDCCH is also referred to as an aggregation level. The number of CCEs used by one PDCCH is 1, 2, 4 or 8. In each serving cell in which the PDCCH is monitored, the CCEs corresponding to the PDCCH candidates of the search space $S^{(L)}_k$ is represented by Expression (1) of FIG. 14. Here, $Y_k$ represents a value in the subframe k. In the CSS, m'=m. In the USS of the PDCCH, in a case where the CIF is configured for the terminal device 1 to be monitored in the serving cell in which the PDCCH is monitored, m'=m+$M^{(L)} \cdot n_{CI}$, and otherwise, m'=m. Here, m is a value from 0 to $M^{(L)}-1$, and $M^{(L)}$ is the number of PDCCH candidates to be monitored in a predetermined search space.

In the CSS, $Y_k$ is a predefined value, or a value determined based on the parameter specific to the base station device 3. For example, 0 is configured for $Y_k$ in a case where an aggregation level L=4 and L=8. In the UE-specific search space $S^{(L)}_k$ of the aggregation level L, $Y_k$ is a value specific to the terminal device 1, and is given by, for example, $Y_k=(A \cdot Y_{k-1}) \bmod D$. Here, as an initial value $Y_{-1}$ of the $Y_k$, a value of the RNTI (for example, C-RNTI) is used.

The aggregation level is defined for each search space. For example, in the CSS, the aggregation levels 4 and 8 are defined. For example, in the USS, the aggregation levels 1, 2, 4 and 8 are defined.

The number of PDCCH candidates is defined by each aggregation level of each search space. For example, in the CSS, the number of PDCCH candidates is 4 for the aggregation level 4, and the number of PDCCH candidates is 2 for the aggregation level 8. For example, in the USS, the number of PDCCH candidates is 6 for the aggregation 1, the number of PDCCH candidates is 6 for the aggregation level 2, the number of PDCCH candidates is 2 for the aggregation level 4, and the number of PDCCH candidates is 2 for the aggregation level 8.

The EPDCCH is transmitted using an aggregation of one or more enhanced control channel elements (ECCEs). Each ECCE includes a plurality of enhanced resource element groups (EREGs). The EREG is used to define the mapping of the EPDCCH to the resource element. In each RB pair, 16EREGs numbered from 0 to 15 are defined. That is, in each RB pair, EREG 0 to EREG 15 are defined. In each RB pair, the EREG 0 to EREG 15 are periodically defined for the resource elements other than the resource elements to which the predetermined signal and/or channel are mapped by prioritizing a frequency direction. For example, the resource elements to which demodulation reference signals associated with the EPDCCH transmitted through antenna ports 107 to 110 are mapped do not define the EREG.

The number of ECCEs used by one EPDCCH depends on the EPDCCH format and is determined based on another parameter. The number of ECCEs used by one EPDCCH is also referred to as an aggregation level. For example, the number of ECCEs used by one EPDCCH is determined by the number of resource elements capable of being used to transmit the EPDCCH in one RB pair, or the transmission method of the EPDCCH. For example, the number of ECCEs used by one EPDCCH is 1, 2, 4, 8, 16, or 32. The number of EREGs used by one ECCE is determined based on the type of subframe and the type of cyclic prefix, and is 4 or 8. As the transmission method of the EPDCCH, distributed transmission and localized transmission are supported.

The EPDCCH may be transmitted using the distributed transmission or the localized transmission. The mapping of the ECCE to the EREG and the RB pair is different between the distributed transmission or the localized transmission. For example, in the distributed transmission, one ECCE includes EREGs of a plurality of RB pairs. In the localized transmission, one ECCE includes an EREG of one RB pair.

The base station device 3 performs the configuration related to the EPDCCH for the terminal device 1. The terminal device 1 monitors the plurality of EPDCCHs based on the configuration from the base station device 3. The set of RB pairs in which the terminal device 1 monitors the EPDCCH may be configured. The set of RB pairs is also referred to as an EPDCCH set or an EPDCCH-PRB set. One or more EPDCCH sets may be configured for one terminal device 1. Each EPDCCH set includes one or more RB pairs. The configuration related to the EPDCCH may be individually performed for each EPDCCH set.

The base station device 3 may configure a predetermined number of EPDCCH sets for the terminal device 1. For example, the first and second EPDCCH sets may be configured as the EPDCCH set 0 and/or the EPDCCH set 1. Each EPDCCH set may include a predetermined number of RB pairs. Each EPDCCH set includes one set of the plurality of ECCEs. The number of ECCEs constituting one EPDCCH set is determined by the number of RB pairs configured as the EPDCCH set and the number of EREGs used by one ECCE. In a case where the number of ECCEs constituting one EPDCCH set is N, each EPDCCH set includes ECCEs numbered from 0 to N−1. For example, in a case where the number of EREGs used by one ECCE is 4, the EPDCCH set constituted by 4 RB pairs includes 16 ECCEs.

The EPDCCH candidates monitored by the terminal device 1 are defined based on the ECCE constituting the EPDCCH set. The set of EPDCCH candidates is defined as a search space (search region). The UE-specific search space which is the search space specific to the terminal device 1 and the common search space which is the search space specific to the base station device 3 (cell, transmission point, or UE group) are defined. The monitoring of the EPDCCH includes a case where the terminal device 1 tries to decode each of the EPDCCH candidates within the search space according to the DCI format to be monitored.

A UE-specific search space $ES^{(L)}_k$ of the EPDCCH in the aggregation level L ∈ {1, 2, 4, 8, 16, 32} is defined by the set of the EPDCCH candidates.

In the EPDCCH set, the ECCE corresponding to the EPDCCH candidate m of the search space $ES^{(L)}_k$ is given by Expression (2) of FIG. 14.

Here, $Y_{p,k}$ represents a value in an EPDCCH set p and the subframe k. The $Y_{p,k}$ may be independently configured by the search space. In the case of the common search space, the $Y_{p,k}$ is a value specific to the base station device 3 (cell). For example, in the case of the common search space, the $Y_{p,k}$ is a predefined value or a value determined based on the parameter specific to the base station device 3. In the case of the UE-specific search space, the $Y_{p,k}$ is a value specific to the terminal device 1, and is given by $Y_{p,k}=(A \cdot Y_{p,k-1}) \bmod D$. For example, the $Y_{p,k}$ is determined based on the predetermined value, the subframe k and the RNTI (for example, C-RNTI) of the terminal device 1. A plurality of common search spaces and/or a plurality of UE-specific search spaces may be configured for one EPDCCH set.

Here, in a case where the CIF corresponding to the serving cell in which the EPDCCH is monitored is configured for the terminal device 1, b satisfies b=$n_{CI}$, and otherwise, b=0.

The DCI format monitored by the terminal device 1 depends on a transmission mode configured for each serving cell. In other words, the DCI format monitored by the terminal device 1 is different depending on the transmission mode. For example, the terminal device 1 for which Downlink Transmission Mode 1 is configured monitors the DCI format 1A and the DCI format 1. For example, the terminal device 1 for which Downlink Transmission Mode 4 is configured monitors the DCI format 1A and the DCI format 2. For example, the terminal device 1 for which Downlink Transmission Mode 10 is configured monitors the DCI format 1A and the DCI format 2D. For example, the terminal device 1 for which Uplink Transmission Mode 1 is configured monitors the DCI format 0. For example, the terminal device 1 for which Uplink Transmission Mode 2 is configured monitors the DCI format 0 and the DCI format 4.

A control region to which the PDCCHs for the terminal device 1 are allocated is not notified, and the terminal device 1 tries to decode all the DCI formats corresponding to all the PDCCH candidates and the transmission modes for all the aggregation levels defined in each search space. In other words, the terminal device 1 tries to decode all the aggregation levels, the PDCCH candidates and the DCI formats that are likely to be transmitted to the terminal device 1. The terminal device 1 recognizes the PDCCH on which the decoding succeeds as the control information addressed to the terminal device 1. Such decoding is referred to as blind decoding.

Even though the DCI formats are different, if the different DCI formats have the same bit size, the number of times the decoding is performed is not increased. For example, since the DCI format 0 and the DCI format 1A have the same bit size, two types of DCI formats can be decoded by performing the decoding once.

For example, in the CSS, the terminal device 1 for which Uplink Transmission Mode 1 is configured tries to decode the DCI formats having two types of bit sizes and 6PDCCH candidates in the aggregation 4, and tries to decode two PDCCH candidates and the DCI formats having two types of bit sizes in the aggregation 8. In the USS, the terminal device 1 tries to decode 6 PDCCH candidates and the DCI formats having two types of bit sizes in the aggregation 1, tries to decode 6 PDCCH candidates and the DCI formats having two types of bit sizes in the aggregation 2, tries to decode 2 PDCCH candidates and the DCI formats having two types of bit sizes in the aggregation 4, and tries to decode 2 PDCCH candidates and the DCI formats having two types of bit sizes in the aggregation 8. That is, the terminal device 1 tries to decode the PDCCH in one subframe forty-four times.

For example, in the CSS, the terminal device 1 for which Uplink Transmission Mode 2 is configured tries to decode 6 PDCCH candidates and the DCI format having two types of bit sizes in the aggregation 4, and tries to decode 2 PDCCH candidates and the DCI format having two types of bit sizes in the aggregation 8. In the USS, the terminal device 1 tries to decode 6 PDCCH candidates and the DCI format having three types of bit sizes in the aggregation 1, tries to decode 6 PDCCH candidates and the DCI format having three types of bit sizes in the aggregation 2, tries to decode 2 PDCCH candidates and the DCI format having three types of bit sizes in the aggregation 4, and tries to decode 2 PDCCH candidates and the DCI format having three types of bit sizes in the aggregation 8. That is, the terminal device 1 tries to decode the PDCCH in one subframe 60 times.

Through the blind decoding, the terminal device 1 can decode the PDCCHs of which the coding rates are different without using preliminary information, and it is possible to efficiently transmit the control information between the base station device 3 and the terminal device 1.

The information indicating the activated/deactivated state is notified by the common search space. The common search space is the common search space in the cell. The information indicating the activated/deactivated state is notified by a UE-specific common search space. Here, the UE-specific common search space is a search space where starting points of the CCEs to which the PDCCH candidates are allocated using the RNTI (UE-group C-RNTI, TP specific-RNTI or SCE-RNTI) commonly assigned to the terminal group are determined. The plurality of terminal devices 1 for which the UE-group RNTI is configured detects the DCI format by using the PDCCHs allocated to the same search space.

The notification of the information indicating the activated/deactivated state is performed at a predefined timing or a configured timing. For example, this notification timing is one radio frame unit.

The notification of the information indicating the activated/deactivated state indicates information of the next radio frame in which the L1 signalling is received. In a case where the L1 signalling is received in an initial subframe (subframe 0) within the radio frame, the notification may indicate information of the received radio frame.

An example of a method of notifying of the information indicating the activated/deactivated state of the cell will be described.

The activated/deactivated state of the target cell may be implicitly represented by changing (altering) the structure of the DRS. The information indicating the activated/deactivated state of the target cell may be implicitly represented by allowing the DRSs to have different structures between the activated state and the deactivated state. The DRS may be transmitted from the target cell such that the DRS has different structures between the activated state and the deactivated state. The terminal device 1 may receive information related to the structure of the DRS transmitted in the activated state and information related to the structure of the DRS transmitted in the deactivated state from the base station device 3.

The activated/deactivated state of the target cell may be represented by changing (altering) the parameter (or the value of the parameter) of a certain structure of the DRS. In other words, a certain parameter included in the configuration of the DRS may be different between the activated state and the deactivated state (or may be individually configured). For example, the arrangement of the resource elements may be different between the DRS transmitted in the activated state and the DRS transmitted in the deactivated state. An antenna port may be different between the DRS transmitted in the activated state and the DRS transmitted in the deactivated state. A scramble sequence may be different between the DRS transmitted in the activated state and the DRS transmitted in the deactivated state. An initial value of the scramble sequence or a method (expression) for generating the initial value may be different between the DRS transmitted in the activated state and the DRS transmitted in the deactivated state. A transmission power may be different between the DRS transmitted in the activated state and the DRS transmitted in the deactivated state. A subframe interval at which the DRS is transmitted may be different between the DRS transmitted in the activated state and the DRS transmitted in the deactivated state. A transmission bandwidth or the number of resource blocks may be different between the DRS transmitted in the activated state and the DRS transmitted in the deactivated state. That is, the information related to the configuration of the DRS transmitted in the activated state and the information related to the configuration of the DRS transmitted in the deactivated state may be individually set. These information items may be transmitted to the terminal device 1 from the base station device 3 by using the higher layer signalling. That is, the information indicating the activated/deactivated state of the target cell may be configuration information of the parameter related to the structure of the DRS. In other words, certain parameters are respectively configured in the activated state and the deactivated state.

The terminal device 1 may monitor two structures, that is, the structure of the DRS indicating the activated state and the structure of the DRS indicating the deactivated state. The terminal device 1 may monitor two structures by using a monitoring pattern of the structure of the DRS indicating the activated state and a monitoring pattern of the structure of the DRS indicating the deactivated state. In this case, information related to two monitoring patterns of the structures of the DRS is notified to the terminal device 1. That is, in a case where information related to one monitoring pattern of the structure of the DRS is not notified, the terminal device may monitor the DRSs having two structures based on one monitoring pattern.

In a case where the DRS in the activated state is measured in the measurement subframe of the DRS in the deactivated state, the terminal device 1 recognizes that the small cell in the deactivated state is the activated state.

The terminal device 1 may implicitly acquire the information of the activated/deactivated state of the target cell by the monitoring pattern in which the DRS is detected. The monitoring pattern of the structure of the DRS indicating the activated state and the monitoring pattern of the structure of the DRS indicating the deactivated state may be previously defined. The monitoring pattern of the structure of the DRS indicating the activated state and the monitoring pattern of the structure of the DRS indicating the deactivated state may be notified through the dedicated RRC signaling (higher layer signalling) from the base station device 3.

Another example of the method of notifying of the information indicating the activated/deactivated state of the cell will be described.

The state of the activated/deactivated state of the target cell may be implicitly represented by allowing the CRS to have different structures (configurations of the CRS) between the activated state and the deactivated state of the target cell. In this case, the CRS transmitted from the target cell is transmitted such that the CRS has different structures between the activated state and the deactivated state. In this case, configuration information of the CRSs having different structures is notified to the terminal device 1.

The activated/deactivated state of the target cell may be represented by changing a certain parameter (or a value of the parameter) related to the structure of the CRS. For example, the arrangement of the resource elements may be different between the CRS transmitted in the activated state and the CRS transmitted in the deactivated state. An antenna port may be different between the CRS transmitted in the activated state and the CRS transmitted in the deactivated state. A scramble sequence may be different between the CRS transmitted in the activated state and the CRS transmitted in the deactivated state. An initial value of the scramble sequence may be different between the CRS transmitted in the activated state and the CRS transmitted in the deactivated state. A transmission power may be different between the CRS transmitted in the activated state and the CRS transmitted in the deactivated state. A subframe interval at which the CRS is transmitted may be different between the CRS transmitted in the activated state and the CRS transmitted in the deactivated state. A transmission bandwidth or the number of resource blocks may be different between the CRS transmitted in the activated state and the CRS transmitted in the deactivated state. That is, the information indicating the activated/deactivated state of the target cell may be configuration information of the parameter related to the structure of the CRS. In this case, certain parameters are individually configured between the activated state and the deactivated state. Here, the CRS has been described, but the same is true of the PSS/SSS, the CSI-RS, and the PRS.

The terminal device 1 monitors two structures, that is, the structure of the CRS indicating the activated state and the structure of the CRS indicating the deactivated state. The terminal device 1 monitors two structures by using a monitoring pattern of the structure of the CRS indicating the activated state and a monitoring pattern of the structure of the CRS indicating the deactivated state. The terminal device 1 implicitly acquires the information of the activated/deactivated state of the target cell by the monitoring pattern in which the CRS is detected. The monitoring pattern of the structure of the CRS indicating the deactivated state may be previously defined. The monitoring pattern of the structure of the CRS indicating the deactivated state may be notified from the base station device 3 through the dedicated RRC signaling.

Another example of the method of notifying of the information indicating the activated/deactivated state of the cell will be described.

The information indicating the activated/deactivated state of the cell may be notified through the dedicated RRC signaling. The information indicating the activated/deactivated state of the cell may be listed in association with a center frequency (carrier frequency) and a cell ID, and may be notified.

The terminal device 1 can recognize the activated/deactivated state of the target cell by the above-described notification method. Hereinafter, any one of the above-described methods is applied when the terminal device 1 switches an action by the activated/deactivated state of the target cell.

Hereinafter, the detection of the cell (base station device 3) will be described.

The detection of the cell means that the terminal device 1 detects the synchronization signal (PSS or SSS) transmitted from the base station device 3 constituting the cell or/and the reference signal (CRS or CSI-RS). The synchronization signal or/and the reference signal used to detect the cell includes information of the cell ID. The terminal device 1 detects the cell by the cell ID of the cell and a detection criterion of the synchronization signal or/and the reference signal.

The detection of the cell may include the detection of the base station device 3. The detection of the primary cell may include the detection of the master base station device. The detection of the primary secondary cell may include the detection of the secondary base station device.

An example of the detection criterion of the synchronization signal or/and the reference signal will be described.

The terminal device 1 determines the detection based on reception power strength or/and reception power quality of the synchronization signal or/and the reference signal from the cell. The terminal device 1 compares the reception power strength or/and the reception power quality of the synchronization signal or/and the reference signal with a threshold, and determines that the cell is detected in a case where the reception strength or/and the reception quality is greater than the threshold. The reception power strength is, for example, RSRP. The reception quality is, for example, interference amount, RSRQ, or SINR. The detection of the cell may be determined by a measurement event to be described below.

An example of the detection criterion of the synchronization signal or/and the reference signal will be described.

The terminal device 1 determines the detection based on whether or not the decoding of the information of the synchronization signal or/and the reference signal from the cell succeeds. For example, the cell (the base station device 3 constituting the cell) transmits the synchronization signal or/and the reference signal by adding a parity code such as CRC to the synchronization signal or/and the reference signal. The terminal device 1 performs the decoding by using the parity code included in the synchronization signal or/and the reference signal, and determines that the cell is detected in a case where it is determined that the decoding correctly succeeds through parity check.

After the cell is detected in the terminal device 1, the terminal device 1 selects the cell to be connected/activated and selects the cell to be disconnected/deactivated.

After the cell is detected in the terminal device 1, the terminal device 1 reports information of the detected cell to the connected base station device 3. The information of the detected cell includes the cell ID and the measurement information.

Hereinafter, the CRSs for describing the details of the CRS are transmitted through the antenna ports 0 to 3. The CRSs are allocated to all the downlink subframes which are non-MBSFN subframes. In other words, the CRSs are allocated to all the downlink subframes except for the MBSFN subframes. The resource element and the signal sequence of the CRS are determined based on the physical cell identity (PCI).

Figure 10:
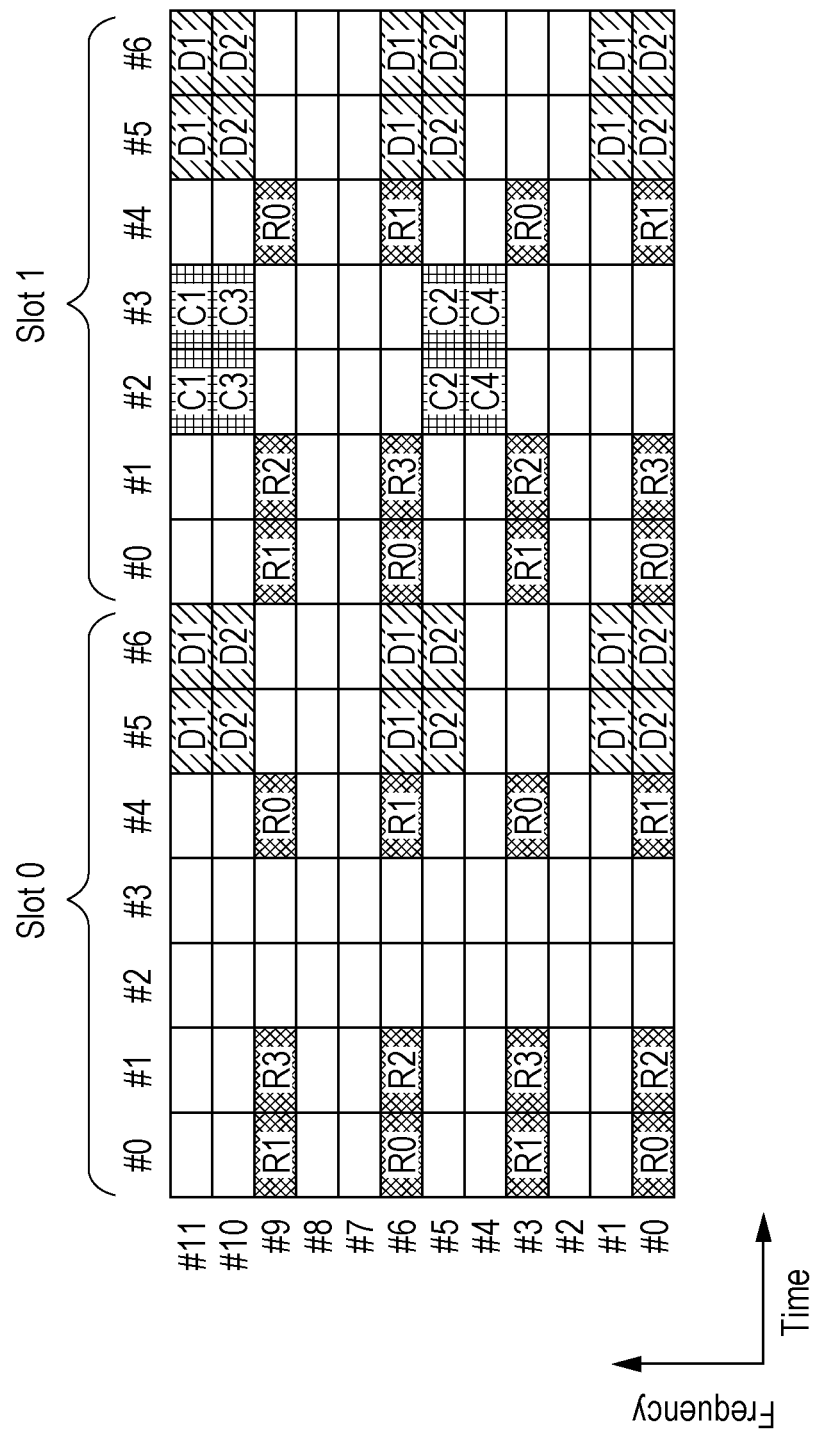
FIG. 10 is a diagram showing an example of a structure of CRS and/or a structure of DRS.

FIG. 10 is a diagram showing an example of the structure of the CRS. The signal of the CRS is generated using a pseudo-random sequence. The pseudo-random sequence is, for example, a Gold sequence. The pseudo-random sequence is calculated based on the physical cell identity (PCI). The pseudo-random sequence is calculated based on the type of the CP. The pseudo-random sequence is calculated based on the slot number and the OFDM symbol number within the slot. The resource element of the CRS in the case of the normal CP uses R0 to R3 of FIG. 10. R0 corresponds to the arrangement of CRSs at the antenna port 0, R1 corresponds to the arrangement of CRSs at the antenna port 1, R2 corresponds to the arrangement of CRSs at the antenna port 2, and R3 corresponds to the arrangement of CRSs at the antenna port 3. The resource elements of the CRSs transmitted through one antenna port are allocated to the frequency axis at a cycle of 6 subcarriers. The resource elements of the CRSs transmitted through the antenna port 0 and the CRSs transmitted through the antenna port 1 are allocated at intervals of 3 subcarriers. The CRS is shifted on the frequency so as to be specific to the cell based on the cell ID. The resource elements of the CRSs transmitted through the antenna port 0 and the CRSs transmitted through the antenna ports 1 are allocated to the OFDM symbols 0 and 4 in the case of the normal CP, and are allocated to the OFDM symbols 0 and 3 in the case of the enhanced CP. The resource elements of the CRSs transmitted through the antenna port 2 and the CRSs transmitted through the antenna port 3 are allocated to the OFDM symbols 1. The CRSs are transmitted in a broadband with a bandwidth configured for the downlink. The DRS may have the same structure as that of the CRS.

Hereinafter, the details of the discovery reference signal (DRS) will be described. The DRS is transmitted from the base station device 3 for various purposes such as synchronization (time synchronization) in the time domain of the downlink, synchronization (frequency synchronization) of the frequency of the downlink, cell/transmission point identification, RSRP measurement, RSRQ measurement, the measurement (UE positioning) of the geographic position of the terminal device 1, and CSI measurement. The DRS may be used as the reference signal used to support the ON state and the OFF state of the base station device 3. The DRS may be used as the reference signal used by the terminal device 1 to detect the base station device 3 in the ON state and/or the OFF state.

The DRS includes a plurality of signals. As an example, the DRS includes the PSS, the SSS and the CRS. The PSS and the SSS included in the DRS may be used for the time synchronization, the frequency synchronization, the cell identification and the transmission point identification. The CRS included in the DRS may be used to perform the RSRP measurement, the RSRQ measurement and the CSI measurement. As another example, the DRS includes the PSS, the SSS and the CSI-RS. The PSS and the SSS included in the DRS may be used for the time synchronization, the frequency synchronization, the cell identification and the transmission point identification. The CSI-RS included in the DRS may be used for the transmission point identification, the RSRP measurement, the RSRQ measurement and the CSI measurement. The DRS including the plurality of signals may be referred to a discovery burst. The reference signal used to perform the RSRP measurement and/or the RSRQ measurement may be referred to as the DRS.

The base station device 3 may transmit a first DRS including the PSS, the SSS and the CRS, and a second DRS including the PSS, the SSS and the CSI-RS by switching between the first and second DRSs. In this case, the base station device 3 configures the first DRS or the second DRS for the terminal device 1.

The DRS is transmitted in the downlink subframe. The DRS is transmitted by the downlink component carrier.

The DRS is transmitted in the deactivated state (off state, dormant mode, or deactivation) of the base station device 3. The DRS may be transmitted even in the activated state (on state, active mode, or activation) of the base station device 3.

The DRS may be independently configured in each base station device (cell or transmission point). For example, in the plurality of small cells, the DRSs having different configurations from each other are transmitted using different resources from each other.

The base station device 3 configures a list related to the DRS and a measurement (detection, monitoring, or transmission) timing of the DRS for the terminal device 1. The list related to the DRS is a list of information associated with the base station device that transmits the DRS which is likely to be received by the terminal device 1. For example, the list related to the DRS is a list of transmission points ID of the transmission points that transmit the DRSs. The plurality of transmission points transmits the DRSs specific to the respective transmission points based on the measurement timing of the DRS configured for the terminal device 1. The terminal device 1 measures the DRS measurement based on the list related to the DRS configured for the base station device 3 and the measurement timing of the DRS. For example, the terminal device 1 measures the DRS determined based on the list related to the DRS in the subframe or the resource determined based on the measurement timing of the DRS. The terminal device 1 reports the measurement result through the measurement of the DRS to the base station device 3.

The respective transmission points transmit the DRSs in one subframe. That is, the respective transmission points transmit the PSS, the SSS, the CRS and/or the CSI-RS associated with one DRS in one subframe. The terminal device 1 expects to transmit the DRS corresponding to one transmission point in one subframe. One DRS may be transmitted in the plurality of subframes.

The transmission of the DRS or the measurement timing of the DRS is periodically configured on the time axis. The transmission of the DRS or the measurement timing of the DRS may be configured in successive subframes. In other words, the DRS may be transmitted through burst transmission. For example, the transmission of the DRS or the measurement timing of the DRS is configured in N successive subframes at a cycle of M subframes. The subframe L to which the DRSs are allocated within the cycle may be configured. The value of the M, N and/or L is configured in the higher layer. The number of subframes N successively transmitted within the cycle may be previously defined. If the subframe cycle M is configured as a long period, the number of times the DRS is transmitted from the base station device 3 in the deactivated state can be reduced, and thus, the inter-cell interference can be reduced. A different configuration may be applied to the value of the M, N and/or L between the deactivated state and the activated state. The parameter corresponding to the value of the M, N and/or L may be notified by the higher layer signalling.

The parameter corresponding to M may represent a subframe offset (or a starting subframe) in addition to the cycle. That is, the parameter corresponding to M may be an index correlated with the cycle and/or the subframe offset.

The parameter corresponding to N may be managed as a table. A value of the parameter corresponding to N may not directly represent the number of subframes. The parameter corresponding to N may be represented by including the starting subframe in addition to the number of subframes.

The parameter corresponding to L may be managed as a table. The parameter corresponding to L may be correlated with the cycle. A value of the parameter corresponding to L may not directly represent the offset of the subframe.

In the subframe in which it is likely to transmit the DRS or a measurement subframe of the DRS, the terminal device 1 may monitor the PDCCH in addition to the measurement of the DRS. For example, the terminal device 1 may monitor the PDCCH in the parameter corresponding to the N. In this case, there is a condition in which the terminal device 1 supports a function of monitoring the PDCCH for the small cell in the deactivated state.

The DRS may be transmitted by including the information of the transmission point ID. Here, the information of the transmission point ID is information for identifying the transmission point (cell) which transmits the DRS. For example, the transmission point ID is a physical cell identity (physical cell ID, physCellID, or physical layer cell ID), a Cell Global Identity (CGI), a new cell identity (small cell ID), a discovery ID, or an extended cell ID. The transmission point ID may be an ID different from the physical cell identity identified by the PSS and the SSS included in the DRS. The transmission point ID may be an ID associated with the physical cell identity identified by the PSS and the SSS included in the DRS. For example, a certain transmission point ID may be associated with any one of the physical cell identities identified by the PSS and the SSS included in the DRS. A plurality of IDs related to the cell may be transmitted by the DRS. For example, in an environment in which cells of an insufficient number are arranged with the physical cell identity, the combination of the physical cell identity and the new cell identity is transmitted by the DRS, and thus, the physical cell identity may be practically extended.

The DRS is transmitted through antenna ports p, . . . , and p+n−1. Here, n represents the total number of antenna ports through which the DRS is transmitted. As the values of p, . . . , and p+n−1, values other than 0 to 22, and 107 to 110 may be applied. That is, the DRS may be transmitted using antenna ports different from the antenna ports used for other reference signals.

Hereinafter, an example of the structure (or configuration) of the DRS will be described.

A plurality of structures and/or configurations may be applied to the DRS. Here, the plurality of structures may be structures or configurations of a plurality of signals. The plurality of structures may be signals having the plurality of structures. In other words, the DRS may include a plurality of signals. For example, the same structure (or configuration) as that of the PSS may be applied to the DRS. The same structure (or configuration) as that of the SSS may be applied to the DRS. The same structure (or configuration) as that of the CRS may be applied to the DRS. The same structure (or configuration) as that of the CSI-RS may be applied to the DRS. That is, the DRS may be based on the structures (or configurations) of a first signal to an n-th signal (n is a natural number). In other words, the DRS may be based on a signal having a first structure to a signal having an n-th structure. The structure of the signal may include a radio resource arrangement (resource configuration) and a subframe configuration.

The DRS may use the signals (radio resources) having the respective structures according to the any purposes. For example, the synchronization in the time domain and/or the frequency domain, the cell identification and the RSRP/RSRQ/RSSI measurement (RRM measurement) may be performed by using signals having the different structures. That is, the terminal device 1 may perform the synchronization in the time domain and/or the frequency domain by using a first signal, may perform the cell identification by using a second signal, and may perform the RSRP/RSRQ measurement by using a third signal. The terminal device may perform the synchronization in the time domain or the frequency domain and the cell identification by using the first signal and the second signal, and may perform the RSRP/RSRQ/RSSI measurement (RRM measurement) by using the third signal.

In a case where the DRS is generated from the signals based on the plurality of structures, a signal having a specific structure is transmitted, and thus, the activated/deactivated state of the small cell may be represented. For example, in a case where a fourth signal (a signal having a fourth structure) is transmitted, the terminal device 1 may recognize that the small cell is in the activated state, and may perform the process. That is, the terminal device 1 may recognize that the small cell is in the activated state by detecting the fourth signal (the signal having the fourth structure).

The CSI measurement may be performed using a fifth signal (a signal having a fifth structure). In a case where the CSI measurement is performed, the terminal device 1 may perform the CSI reporting in a first uplink subframe which is positioned after a predetermined subframe from a subframe on which the CSI measurement is performed. The CSI measurement may be performed using another signal instead of the fifth signal. In a case where the CSI measurement is performed in the deactivated state, configuration information for performing the CSI measurement/CSI reporting in the deactivated state is notified to the terminal device 1 from the base station device 3 using the higher layer signalling.

The structure of the DRS transmitted from the small cell (base station device 3 constituting the small cell) may be different between the activated state and the deactivated state of the small cell. For example, the signals having the first structure to the third structure may be transmitted in the deactivated state, and the signals having the first structure to the fourth structure may be transmitted in the activated state. In the activated state, the signal having the fourth structure instead of the signal having the third structure may be transmitted. In a case where the plurality of signals having the same structure as that of the SSS are configured, the plurality of signals may be transmitted in the deactivated state of the small cell, but only one signal may be transmitted in the activated state of the small cell. That is, the structure of the DRS may be switched depending on the state of the small cell.

In order to transmit an extended physical layer cell identity (PCI), the DRS may include a plurality of signals. The physical layer cell identity and the transmission point identity (TPID) may be transmitted using the plurality of signals. Here, the plurality of signals may be a plurality of SSSs or signals having the same structure as that of the SSS. Here, the plurality of signals may be signals having the same structure as that of the PSS and the SSS. The plurality of signals may be signals having the same structure as that of the PSS and the plurality of SSSs. The TPID may be a virtual cell identity (VCID). The TPID may be a transmission point, that is, an ID for identifying the base station device 3. The VCID may be identity used for a signal sequence. In other words, due to the use of the DRS, the cell ID group is identified by the signal having the first structure, the cell ID is identified by the signal having the first structure and the signal having the second structure, and the TPID is identified by the signal having the first structure, the signal having the second structure and the signal having the third structure. The TPID may be extended by the signal having the fourth structure.

The DRS may be individually configured from the PSS, the SSS, the CRS, and the CSI-RS. That is, the subframe configuration or resource configuration of the DRS, the antenna port index, the number of antenna ports, and the ID for sequence generation may be independently (individually) configured from the PSS, the SSS, the CRS, and the CSI-RS.

Figure 9:
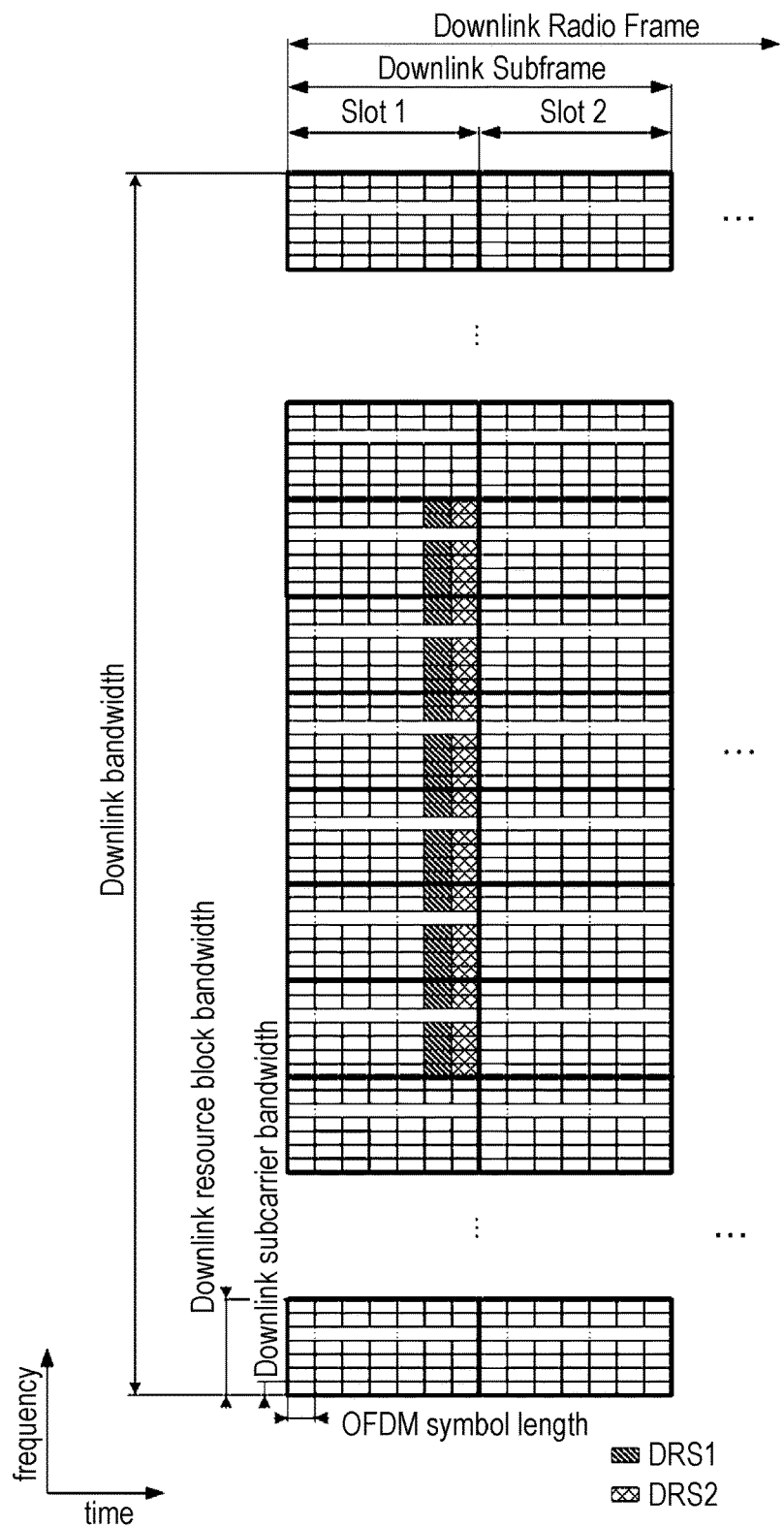
FIG. 9 is a diagram showing an example of a structure of DRS.

FIG. 9 is a diagram showing an example of the structure of the DRS. Here, the sequence (signal sequence or reference signal sequence) used for the DRS may be generated by a Zadoff-Chu sequence on the frequency axis. The DRSs may be successively allocated to the frequency axis. The DRSs may be transmitted using 6 resource blocks and using 62 subcarriers of these resource blocks. The DRSs may be transmitted at zero power by using 10 subcarriers of the 6 resource blocks. In other words, the DRSs may reserve 10 subcarriers of the 6 resource blocks, and the signal may not be transmitted. The DRSs are allocated to the last OFDM symbols of the slot number 0 and the slot number 10 in the case of the FDD (frame structure type 1), and are mapped to the third OFDM symbols of the subframe 1 and the subframe 6 in the case of the TDD (frame structure type 2). The DRSs may be transmitted by including a part of information for identifying the cell ID.

The DRSs may be allocated to resource blocks (different frequency positions) different from that of the PSS. The DRSs may be transmitted using the number of resource blocks different from that of the PSS. The DRSs may be transmitted using the number of carriers different from that of the PSS. The DRSs may be allocated to OFDM symbols different from those of the PSS. The DRSs may be transmitted by including information different from the cell ID (PCI or VCID).

Another example of the structure of the DRS will be described.

FIG. 9 shows another example of the structure of the DRS. The sequence (signal sequence or reference signal sequence) used for the DRS may be interleaved by connecting two binary sequences having a length of 31. The sequence of the DRS may be generated based on an M sequence. The DRSs are different from the signals allocated to the subframe 0 and the signals allocated to the subframe 5. The DRSs are allocated to the sixth OFDM symbols of the slot number 0 and the slot number 10 in the case of the FDD, and are allocated to the seventh OFDM symbols of the slot number 1 and the slot number 11 in the case of the TDD. In other words, the DRSs are allocated to the second OFDM symbols from the last of the slot number 0 and the slot number 10 in the case of the FDD, and are allocated to the last OFDM symbols of the slot number 1 and the slot number 11 in the case of the TDD. In this case, the DRSs may be transmitted by including a part of the information for identifying the cell ID.

The DRSs may be allocated to the resource blocks (frequency positions) different from that of the SSS. The DRSs may be transmitted using the number of resource blocks different from that of the SSS. The DRSs may be transmitted using the number of subcarriers different from that of the SSS. The DRSs may be allocated to the OFDM symbols different from that of the SSS. The DRSs may be transmitted by including the information different form the cell ID.

The number of subframes in which the DRS is transmitted is not limited. For example, the DRS may be transmitted in the subframes 0, 1, 5, and 6. That is, a plurality of DRSs based on the structure of the SSS may be transmitted. In this case, many information items may be transmitted by adding the information items to the DRS. In this case, since the number of orthogonal sequences is increased, an effect of suppressing the inter-cell interference is obtained.

FIG. 10 shows another example of the structure of the DRS. The signal of the DRS is generated using a pseudo-random sequence. The pseudo-random sequence is, for example, a Gold sequence. The pseudo-random sequence is calculated based on the cell ID (PCI, VCID, scramble identity (ID), scrambling identity, or scrambling initialization identity (ID)). The pseudo-random sequence is calculated based on the type of the CP. The pseudo-random sequence is calculated based on the slot number and the OFDM symbol number within the slot. The resource elements of the DRSs transmitted through one antenna port are allocated to the frequency axis at intervals of 6 subcarriers. The resource elements of the DRSs transmitted through the antenna port p and the DRSs transmitted through the antenna port p+1 are allocated at intervals of 3 subcarriers. The DRS is shifted on the frequency so as to be specific to the cell based on the cell ID. The resource elements of the DRSs transmitted through the antenna port p and the DRSs transmitted through the antenna port p+1 are allocated to the OFDM symbols 0 and 4 in the case of the normal CP, and are allocated to the OFDM symbols 0 and 3 in the case of the extended CP. The resource elements of the DRSs transmitted through the antenna port p+2 and the DRSs transmitted through the antenna port p+3 are allocated to the OFDM symbols 1. The DRSs are transmitted in a broadband with a bandwidth configured for the downlink. The transmission bandwidth of the DRS may be configured using the higher layer signalling. The transmission bandwidth of the DRS may be regarded as being the same as the measurement bandwidth.

The DRSs may be transmitted using a pseudo-random sequence different from that of the CRS. The DRSs may use a sequence calculation method different form that of the CRS. The DRSs may be allocated to the frequency at a cycle of subcarriers different from that of the CRS. The arrangement relationship of the resource elements between the antenna port p through which the DRS is transmitted and the antenna port p+1 through which the DRS is transmitted may be different from the arrangement relationship between the antenna port 0 and the antenna port 1. The arrangement of the DRSs may be shifted on the frequency based on information different from that of the CRS. The DRSs may be allocated to OFDM symbols different from those of the CRS. The DRSs may be allocated to a bandwidth different from that of the CRS, or may be allocated to the bandwidth configured in the higher layer, and may be transmitted in a narrowband.

FIG. 10 shows another example of the structure of the DRS. The sequences (signal sequence and reference signal sequence) of the DRSs (D1 and D2 of FIG. 10) are generated using the pseudo-random sequence. The pseudo-random sequence is, for example, a Gold sequence. The pseudo-random sequence is calculated based on the information from the higher layer. The pseudo-random sequence is calculated based on the cell ID in a case where the information from the higher layer is not configured. The pseudo-random sequence is calculated based on the type of the CP. The pseudo-random sequence is calculated based on the slot number and the OFDM symbol number within the slot. The resource elements to which the DRSs are allocated may be determined by resource configuration numbers (DRS resource configuration index), and may be calculated using the table of FIG. 12. Here, k' represents a subcarrier number, l' represents an OFDM symbol number, $n_s$ represents a slot number, and $n_s$mod2 represents a slot number within a subframe. For example, in the case of configuration number 0, the DRSs are allocated to the resource elements of the slot number 0, the subcarrier number 9, and the OFDM symbol numbers 5 and 6. The DRSs are transmitted in a broadband with a bandwidth configured for the downlink.

The sequence of the DRS may use a pseudo-random sequence different from that of the CSI-RS. The sequence of the DRS may be generated based on a sequence calculation method different from that of the CSI-RS. The DRSs are not limited to the table of FIG. 12, and may be resource elements different from those of the CSI-RS. The DRSs may be allocated to a bandwidth different from that of the CSI-RS, or may be allocated to the bandwidth configured in the higher layer and may be transmitted in a narrowband.

FIG. 10 shows another example of the structure of the DRS. The resource elements to which the DRSs are allocated are determined by resource configuration numbers (DRS resource configuration index), and are calculated using the table of FIG. 12. Here, k' represents a subcarrier number, l' represents an OFDM symbol number, $n_s$ represents a slot number, and $n_s$mod2 represents a slot number within a subframe. For example, in the case of the configuration number 0, the DRSs are allocated to the resource elements of the slot number 0, the subcarrier number 9, and the OFDM symbol numbers 5 and 6. The DRSs are transmitted to a broadband with a bandwidth configured for the downlink. The DRSs may be transmitted in the configured resource elements at zero power. In other words, the base station device 3 may not transmit the DRSs in the configured resource elements. From a viewpoint of the terminal device 1, the resource elements in which the DRSs are not transmitted from the base station device 3 may be used for interference measurement from the neighbour cell (or neighbour base station device). The DRSs may have the same structure as that of R6 of FIG. 11.

Figure 11:
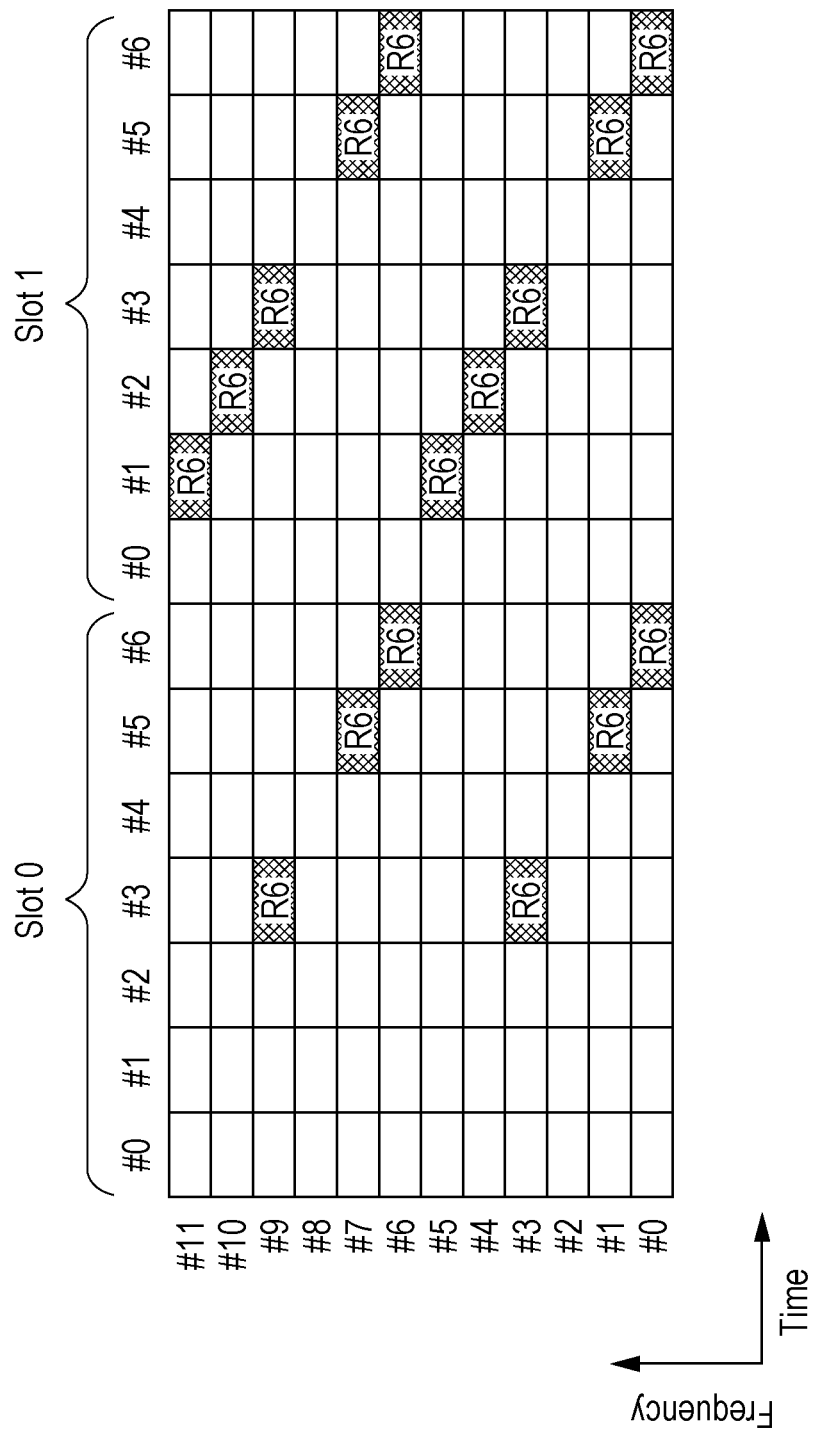
FIG. 11 is a diagram showing another example of a structure of DRS.

FIG. 11 shows an example of the structure of the DRS. The sequence of the DRS is generated using a pseudo-random sequence. The pseudo-random sequence is, for example, a Gold sequence. The pseudo-random sequence is calculated based on the cell ID. The pseudo-random sequence is calculated based on the type of the CP. The pseudo-random sequence is calculated based on the slot number and the OFDM symbol number within the slot. The DRSs transmitted through one antenna port are allocated to the frequency axis at a cycle of 6 subcarriers. The DRS is shifted on the frequency based on the cell ID so as to be specific to the cell. The DRSs are allocated to the OFDM symbols 3, 5 and 6 of the slot 0 and the OFD symbols 1, 2, 3, 5 and 6 of the slot 1 in the case of the normal CP, and are allocated to the OFDM symbols 4 and 5 of the slot 0 and the OFDM symbols 1, 2, 4 and 5 of the slot 1 in the case of the extended CP. The resource elements of the DRSs are allocated to a first OFDM symbols and a (1+L)-th OFDM symbols so as to be shifted on the frequency by L. The DRSs are transmitted in a broadband with a bandwidth configured for the downlink.

The sequence of the DRS may use a pseudo-random sequence different from that of PRS. The sequence of the DRS may use a sequence calculation method different from that of the PRS. The DRSs may be allocated to the frequency at a cycle of subcarriers different from that of the PRS. The DRSs may be allocated to OFDM symbols different from those of the PRS. The DRSs may be allocated to a bandwidth different from that of the PRS, and may be allocated to the bandwidth configured in the higher layer and may be transmitted in a narrowband. That is, the transmission bandwidth or the measurement bandwidth of the DRS may be configured in the higher layer.

The DRS may include a CSI-IM resource. The CSI-IM resource is a resource used by the terminal device 1 to measure interference. For example, the terminal device 1 uses the CSI-IM resource as a resource for measuring interference in the CSI measurement or a resource for measuring interference in the RSRQ measurement. The CSI-IM resource is configured using the same method as the CSI-RS configuration method. The CSI-IM resource may be a resource configured as a zero power CSI-RS.

The structure of the DRS has been described above, but is not limited to only the above-described examples, and the structure of the DRS may be achieved by combining the plurality of above-described examples.

A specific example of a preferred combination will be described. The DRS may generated by combining the signal generated based on the Zadoff-Chu sequence, the signal generated based on the M sequence and the signal generated based on the Gold sequence. The signal generated based on the Gold sequence may be generated in a band broader than that of the signal generated based on the Zadoff-Chu sequence, and the signal generated based on the Zadoff-Chu sequence may be transmitted using 6 resource blocks, and the signal generated based on the Gold sequence may be transmitted in the entire band of the subframe. That is, the bandwidth in which the DRS is transmitted may be configurable by the higher layer. That is, it is preferable that the DRS includes signals having different structures in different sequences.

The DRS may include combinations of the signal generated based on the Zadoff-Chu sequence, the signal generated based on the M sequence, the signal generated based on the Gold sequence and the signal transmitted at zero power. The signal generated based on the Gold sequence and the signal transmitted at zero power may be designated the resource elements by the configuration information of the DRS. The signal generated based on the Gold sequence may be generated in a band broader than that of the signal generated based on the Zadoff-Chu sequence, the signal generated based on the Zadoff-Chu sequence may be transmitted using 6 resource blocks, and the signal based on the Gold sequence may be transmitted in the entire band of the subframe.

The DRS configuration is notified to the terminal device 1 through the dedicated RRC signaling. The configuration of the DRS includes information common to the cells that transmit the RS and information of individual information that transmits the DRS. The configuration of the DRS may be notified by being added to configuration information of a measurement object to be described below.

The information common to the cells that transmit the DRS includes information of a center frequency of a band, information of a bandwidth, and information of a subframe.

The information of the individual cell that transmits the DRS includes information of a center frequency of a band, information of a bandwidth, information of a subframe, information for designating the resource element, information (cell ID, PCI, or VCID) for identifying the cell.

Since the terminal device 1 can recognize the subframe that includes the DRS by the configuration of the DRS, a DRS detection process may not be performed in the subframe that does not include the DRS. Accordingly, the power consumption of the terminal device 1 can be reduced.

The configuration of the DRS may include a configuration of a signal having a first structure to a configuration of a signal having an n-th structure. For example, the resource configurations of the signals having the respective structures may be individually set. The subframe configurations or transmission powers of the signals having the respective structures may be common (or may have a common value). The cell ID, the antenna port index, or the number of antenna ports may be set to only a signal having a certain structure. As the configuration of the DRS, a plurality of resource configurations or subframe configurations may be set to a signal having a certain structure.

The configuration of the DRS may include information (parameter) indicating the frequency in which the DRS is transmitted.

The configuration of the DRS may include information indicating an offset (offset value) of a subframe in which the DRS is likely to be transmitted.

The configuration of the DRS may include information indicating a subframe cycle at which the DRS is likely to be transmitted.

The configuration of the DRS may include an identifier for generating the sequence of the DRS.

The configuration of the DRS may include information indicating an antenna port through which the DRS is transmitted.

The configuration of the DRS may include information indicating a burst transmission period of the DRS.

The configuration of the DRS may include information indicating a subframe cycle during which the DRS is measured once during the subframe cycle.

That is, the configuration of the DRS may include information required to transmit the DRS, and/or information required to receive the DRS, and/or information required to measure the DRS.

The information included in the configuration of the DRS may be set for each signal having each structure. That is, the above-described information may be set to the signals having different structures.

The configuration of the DRS may be notified using the higher layer signalling. The configuration of the DRS may be notified using the system information. Partial information of the configuration of the DRS may be notified using the L1 signalling (DCI format) or L2 signalling (MAC CE).

The DRS may be used for a reference signal (listening RS) for inter-base-station-device synchronization (network listening) through the wireless interface in the same frequency.

Hereinafter, the inter-base-station-device synchronization through the wireless interface using the DRS will be described.

The transmission timing is synchronized between the base station devices, and thus, the application of the TDD system, the application of an inter-cell interference suppression technology such as eICIC or CoMP, and the application of carrier aggregation between the base station devices of which the transmission points are different are possible. However, in a case where the small cells are arranged in a building and an environment in which the delay of the backhaul is large, it is difficult to perform the time synchronization by the backhaul or a global navigation satellite system (GSNN). Thus, a wireless interface is used to perform the synchronization of the transmission timing of the downlink.

A procedure of the inter-base-station-device synchronization through the wireless interface will be described. Initially, the determination of the base station device 3 as a reference of the transmission timing and the designation of the transmission timing of the listening RS are performed through the backhaul. The determination of the base station device 3 that performs the synchronization of the transmission timing and the designation of the reception timing of the listening RS are performed through the backhaul. The determination of the base station device 3 as the reference of the transmission timing, the base station device 3 that performs the synchronization of the transmission timing, and the transmission/reception timing of the listening RS may be performed by the base station device, the MME or the S-GW. The base station device 3 as the reference of the transmission timing transmits the listening RS in the downlink component carrier or the downlink subframe based on the transmission timing notified through the backhaul. The base station device 3 that performs the synchronization of the transmission timing receives the listening RS at the notified reception timing, and performs the synchronization of the transmission timing. The listening RS may be transmitted even in the deactivated state of the base station device 3 as the reference of the transmission timing. The listening RS may be received even in the activated/deactivated state of the base station device 3 that performs the synchronization of the transmission timing.

In the TDD, the base station device 3 that performs the synchronization of the transmission timing stops transmitting the downlink signal during which the listening RS is received, and performs the reception process of the radio signal. In other words, the base station device 3 that performs the synchronization of the transmission timing is configured in the uplink subframe during which the listening RS is received. Here, the terminal device 1 connected to the base station device 3 that performs the synchronization of the transmission timing recognizes that the base station device 3 that performs the synchronization of the transmission timing is in the deactivated state during which the listening RS is received. That is, the terminal device 1 recognizes that the PSS/SSS, the PBCH, the CRS, the PCFICH, the PHICH and the PDCCH are not transmitted from the base station device 3 that performs the synchronization of the transmission timing. The terminal device 1 is notified of a timing when the listening RS is received from the base station device 3. In other words, the terminal device 1 is notified of the deactivated state from the base station device 3. The terminal device 1 does not perform the measurement on the base station device 3 at the timing when the listening RS is received. The terminal device 1 connected to the base station device 3 that performs the synchronization of the transmission timing may recognize that a period during which the base station device 3 that performs the synchronization of the transmission timing receives the listening RS is the uplink subframe.

In the FDD, the base station device 3 that performs the synchronization of the transmission timing stops transmitting the downlink signal during which the listening RS is received, and performs the reception process using the downlink component carrier. Here, the terminal device 1 connected to the base station device 3 that performs the synchronization of the transmission timing recognizes that the base station device 3 that performs the synchronization of the transmission timing is in the deactivated state during which the listening RS is received. That is, the terminal device 1 recognizes that the PSS/SSS, the PBCH, the CRS, the PCFICH, the PHICH and the PDCCH are not transmitted from the base station device 3 that performs the synchronization of the transmission timing. The terminal device 1 is notified of the timing when the listening RS is received from the base station device 3. In other words, the terminal device 1 is notified of the deactivated state from the base station device 3. The terminal device 1 does not perform the measurement on the base station device 3 at the timing when the listening RS is received.

The terminal device 1 may detect the cell by using the listening RS transmitted from the base station device 3 as the reference of the transmission timing.

Hereinafter, the details of the measurement of the physical layer will be described. The terminal device 1 performs the measurement of the physical layer to be reported to the higher layer. As the measurement of the physical layer, there are reference signal received power (RSRP), received signal strength indicator (RSSI), and reference signal received quality (RSRQ).

Hereinafter, the details of the RSRP will be described. The RSRP is defined as the reception power of the reference signal. The RSRQ is defined as the reception quality of the reference signal.

An example of the RSRP will be described.

The RSRP is defined as a value acquired by performing linear mean on power of the resource element to which the CRS included in a measurement frequency bandwidth to be considered is transmitted. In the determination of the RSRP, the resource element to which the CRS of the antenna port 0 is mapped is used. If the terminal device can detect the CRS of the antenna port 1, it is possible to use the resource element (the radio resource mapped to the resource element assigned to the antenna port 1) to which the CRS of the antenna port 1 is mapped in addition to the resource element (the radio resource mapped to the resource element assigned to the antenna port 0) to which the CRS of the antenna port 0 is mapped in order to determine the RSRP. Hereinafter, the RSRP calculated using the resource element to which the CRS of the antenna port 0 is mapped is referred to as a CRS base RSRP or a first RSRP.

The terminal device 1 measures the RSRP of the cell having an intra-frequency and/or the cell having an inter-frequency in an RRC idle (RRC_IDLE). Here, the cell having the inter-frequency in the RRC idle state is a cell having the same frequency band as that of the cell from which the terminal device receives the system information through the broadcasting. Here, the cell having the inter-frequency in the RRC idle state is a cell having a frequency band different from that of the cell from which the terminal device 1 receives the system information through the broadcasting. The terminal device 1 measures the RSRP of the cell having the intra-frequency and/or the cell having the inter-frequency in the RRC connected (RRC_CONNECTED) state. Here, the cell having the intra-frequency in the RRC connected state is a cell having the same frequency band as that of the cell from which the terminal device 1 receives the system information through the RRC signaling or the broadcasting. Here, the cell having the inter-frequency in the RRC connected state is a cell having a frequency band different from that of the cell from which the terminal device 1 receives the system information through the RRC signaling or the broadcasting.

An example of the RSRP will be described.

The RSRP is defined as a value acquired by performing linear mean on power of the resource element to which the DRS included in a measurement frequency bandwidth to be considered is transmitted. In the measurement of the RSRP, the resource element to which the DRS is mapped is used. The resource element and the antenna port to which the DRS is transmitted is notified in the higher layer are used.

The terminal device 1 measures the RSRP of the cell having the intra-frequency and/or the cell having the inter-frequency in the RRC connected (RRC_CONNECTED) state.

The details of the RSSI will be described. The RSSI is defined by total reception power observed using a receive antenna.

An example of the RSSI will be described.

The RSSI (E-UTRA carrier RSSI) includes a value acquired by performing linear mean on total reception power acquired by observing only the OFDM symbol including the reference signal of the antenna port 0. In other words, the RSSI includes a value acquired by performing linear mean on the total reception power acquired by observing only the OFDM symbol including the CRS of the antenna port 0. The RSSI is observed in a bandwidth of the number of resource blocks N. The total reception power of the RSSI includes power from the serving cell or the non-serving cell on the same channel, interference power from the neighbour channel, and thermal noise power.

An example of the RSSI will be described.

The RSSI (E-UTRA carrier RSSI) includes a value acquired by performing linear mean on total reception power acquired by observing all the OFDM symbols. The total reception power of the RSSI includes power from the serving cell or the non-serving cell on the same channel, interference power from the neighbour channel, and thermal noise power.

An example of the RSSI will be described.

The RSSI (E-UTRA carrier RSSI) includes a value acquired by performing linear mean on total reception power acquired by observing the OFDM symbols that do not include the DRS. The RSSI is observed in a bandwidth of the number of resource blocks N. The total reception power of the RSSI includes power from the serving cell or the non-serving cell on the same channel, interference power from the neighbour channel, and thermal noise power. The resource element and/or the antenna port to which the DRS is transmitted are notified in the higher layer.

An example of the RSSI will be described.

The RSSI (E-UTRA carrier RSSI) includes a value acquired by performing linear mean on total reception power acquired by observing only the OFDM symbols that do not include the DRS (CRS and/or CSI-RS). In other words, the RSSI includes a value acquired by performing linear mean on total reception power acquired by observing the OFDM symbols that do not include the DRS (CRS and/or CSI-RS). The RSSI is observed in a bandwidth of the number of resource blocks N. The total reception power of the RSSI includes power from the serving cell or the non-serving cell on the same channel, interference power from the neighbour channel, and thermal noise power.

An example of the RSSI will be described.

The RSSI (E-UTRA carrier RSSI) includes a total value of a value acquired by performing total reception power acquired by observing only the OFDM symbols that do not include the DRS (CRS and/or CSI-RS) and a value of the RSRP. In other words, the RSSI includes a total value of a value acquired by performing linear mean on total reception power acquired by observing only the OFDM symbols that do not include the DRS (CRS and/or CSI-RS) and a value of the RSRP. The RSSI is observed in a bandwidth of the number of resource blocks N. The total reception power of the RSSI includes power from the serving cell or the non-serving cell on the same channel, interference power from the neighbour channel, and thermal noise power.

Hereinafter, the details of the RSRQ will be described. The RSRQ is defined as a ratio between the RSRP and the RSSI, and is used for the same purpose as that of a signal-to-interference-plus-noise ratio (SINR) of a measuring target cell which is an index of communication quality. The combination of the RSRP and the RSSI in the RSRQ is not limited to the following combination. However, in the present embodiment, a preferred combination of the RSRP and the RSSI in the RSRQ is described.

An example of the RSRQ will be described.

The RSRQ is defined as a ratio calculated by the expression of N×RSRP/RSSI. Here, N is the number of resource blocks equivalent to the measurement bandwidth of the RSSI, and the numerator and denominator of the RSRQ include the set of the same resource block. Here, the RSRP is a first RSRP. Hereinafter, the RSRQ calculated using the RSRQ calculated using the first RSRP is referred to as a CRS base RSRQ or a first RSRQ.

The RSSI (E-UTRA carrier RSSI) includes a value acquired by performing linear mean on total reception power acquired by observing only the OFDM symbols that include the reference signal of the antenna port 0. In other words, the RSSI includes a value acquired by performing linear mean on total reception power acquired by observing only the OFDM symbols that include the CRS (the radio resource mapped to the antenna port 0) of the antenna port 0. The RSSI is observed in a bandwidth of the number of resource blocks N. The total reception power of the RSSI includes power from the serving cell or the non-serving cell on the same channel, interference power from the neighbour channel, and thermal noise power. In a case where a predetermined subframe for measuring the RSRQ is designated from the signalling of the higher layer, the RSSI is measured from all the OFDM symbols in the designated subframe.

The terminal device 1 measures the RSRQ of the cell having the intra-frequency and/or the cell having the inter-frequency in the RRC idle state. The terminal device 1 measures the RSRQ of the cell having the intra-frequency and/or the cell having the inter-frequency in the RRC connected state.

An example of the RSRQ will be described.

The RSRQ is defined as a ratio calculated by the expression of N×RSRP/RSSI. Here, N is the number of resource blocks of the measurement bandwidth of the RSSI, and the numerator and denominator of the RSRQ need to include the set of the same resource block. Here, the RSRP is a second RSRP. Hereinafter, the RSRQ calculated using the RSRQ calculated using the second RSRP is referred to as a second RSRQ.

The RSSI (E-UTRA carrier RSSI) includes a value acquired by performing linear mean on total reception power acquired by observing only the OFDM symbols including the reference signal of the antenna port 0. In other words, the RSSI includes a value acquired by performing linear mean on total reception power acquired by observing only the OFDM symbols that include the CRS of the antenna port 0. The RSSI is observed in a bandwidth of the number of resource blocks N. The total reception power of the RSSI includes power from the serving cell or the non-serving cell on the same channel, interference power from the neighbour channel, and thermal noise power. In a case where a predetermined subframe for measuring the RSRQ is designated from the signalling of the higher layer, the RSSI is measured from all the OFDM symbols in the designated subframe.

An example of the RSRQ will be described.

The RSRQ is defined as a ratio calculated by the expression of N×RSRP/RSSI. Here, N is the number of resource blocks equivalent to the measurement bandwidth of the RSSI, and the numerator and denominator of the RSRQ are constituted by a set of same resource blocks. Here, the RSRP is measured based on the DRS (CRS and/or CSI-RS).

The RSSI (E-UTRA carrier RSSI) includes a total value of a value acquired by performing linear mean on total reception power acquired by observing only the OFDM symbols that do not include the DRS (CRS and/or CSI-RS) and a value of the RSRP. In other words, the RSSI includes a total value of a value acquired by performing linear mean on total reception power acquired by observing only the OFDM symbols that do not include the DRS (CRS and/or CSI-RS) and a value of the RSRP. The RSSI is observed in a bandwidth of the number of resource blocks N. The total reception power of the RSSI includes power from the serving cell or the non-serving cell on the same channel, interference power from the neighbour channel, and thermal noise power.

The RSSI used for the RSRQ may be acquired based on the RSRP and the linear mean value of the total reception power acquired by the OFDM symbols that do not include the DRS within the measurement bandwidth.

The RSSI used for the RSRQ may be acquired from the linear mean value of the total reception power acquired by all the OFDM symbols of the measurement bandwidth.

The RSSI used for the RSRQ may be acquired from the linear mean value of the total reception power acquired by the OFDM symbols that do not include the DRS within the measurement bandwidth.

The RSSI used for the RSRQ may be acquired from the RSSI measurement on the CRS constituting the DRS.

In a case where the DRS has the same structure as that of the CSI-RS, 5 MHz or more may be configured as the measurement bandwidth.

In a case where the DRS has the same structure as that of the CSI-RS, 6 RBs and/or 15 RBs may be configured for the measurement bandwidth.

The measurement bandwidth of the DRS may be configured using the higher layer signalling.

The terminal device 1 measures the RSRQ of the cell having the intra-frequency and/or the cell having the inter-frequency in the RRC connected state.

A first measurement procedure will be described. First measurement is to measure the first RSRP or the first RSRQ. The first measurement may be the measurement (RRM measurement, RSRP measurement, RSRQ measurement or RSSI measurement) of the first signal (the signal having the first structure).

The terminal device 1 recognizes the resource elements to which the CRSs transmitted though the antenna port 0 from the physical cell identity (PCI) are allocated. The terminal device measures the first RSRP from the resource elements to which the CRSs transmitted through the antenna port 0 are allocated. The number of subframes used in the measurement is not limited, and the measurement may be performed over a plurality of subframes, and the average value may be reported. Subsequently, the terminal device recognizes the OFDM symbols including the antenna port 0, and measures the RSSI. The first RSRQ is calculated from the first RSRP and RSSI. The measurement subframes of the first RSRP and RSSI may be different.

The result (the first RSRP or the first RSRQ) acquired based on the first measurement procedure is referred to as a first measurement result.

A second measurement procedure will be described. Second measurement is to measure the second RSRP or the second RSRQ.

The terminal device 1 recognizes the resource elements to which the DRSs are allocated from the configuration information of the DRS. The terminal device measures the second RSRP from the resource elements to which the DRSs are allocated. The number of subframes used in the measurement is not limited, and the measurement may be performed on the plurality of subframes, and the average value thereof may be reported. Subsequently, the RSSI is measured. The second RSRQ is calculated from the second RSRP and RSSI.

The result (the second RSRP, the second RSRQ, the second RSSI or the second RRM) acquired based on the second measurement procedure is referred to a second measurement result. The second measurement may be the measurement (the RRM measurement, the RSRP measurement, the RSRQ measurement or the RSSI measurement) of the second signal (the signal having the second structure).

Hereinafter, the mechanism for reporting the measurement value measured by the terminal device 1 to the higher layer will be described.

Figure 13:
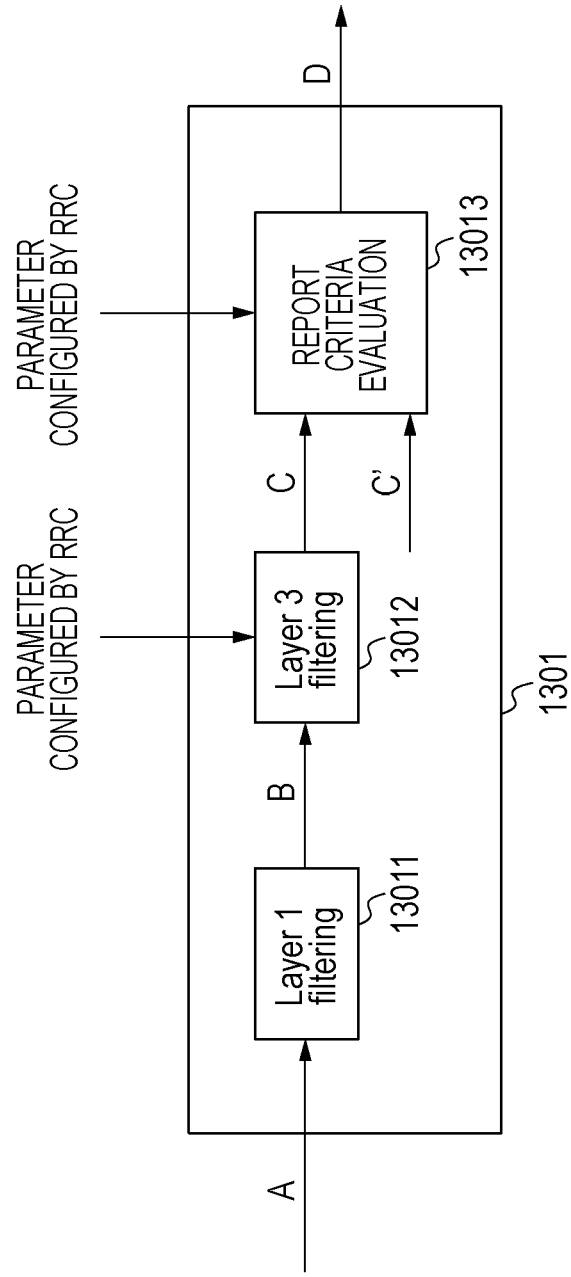
FIG. 13 is a diagram showing a measurement model.

A measurement model will be described. FIG. 13 is a diagram showing an example of the measurement model.

A measurement unit 1301 may include a Layer 1 filtering unit 13011, a Layer 3 filtering unit 13012, and a report criteria evaluation unit 13013. The measurement unit 1301 may have a partial function of the reception unit 105 and the higher layer processing unit 101. Specifically, the Layer 1 filtering unit 13011 may be included in the reception unit 105, and the Layer 3 filtering unit 13012 and the report criteria evaluation 13013 may be included in the higher layer processing unit 101.

A filter is applied to the measurement value (sample) input from the physical layer by the Layer 1 filtering unit 13011. For example, the Layer 1 filtering unit 13011 may apply the mean of a plurality of input values, the weighted mean, the mean according to the channel characteristics, or may apply other filtering methods. Measurement value reported from the first layer is input to the third layer after the Layer 1 filtering unit 13011. The filter is applied to the measurement value input to the Layer 3 filtering unit 13012. The configuration of the Layer 3 filtering is provided from the RRC signaling. An interval at which the measurement value is filtered by the Layer 3 filtering unit 13012 and is reported is the same as that of the input measurement gap. The report criteria evaluation unit 13013 checks whether or not the reporting of the measurement value is actually required. The evaluation is based on one or more measurement flows. For example, the evaluation is the comparison of different measurement values. The terminal device 1 evaluates the report criteria at least whenever a new measurement result is reported. The configuration of the report criteria is provided through the RRC signaling. After it is determined that the reporting of the measurement value is required in the evaluation of the report criteria, the terminal device 1 sends measurement report information (measurement report message) through the wireless interface.

Hereinafter, the measurement will be described. The base station device 3 transmits a measurement configuration message to the terminal device 1 by using a RRC connection reconfiguration message of the RRC signaling (radio resource control signal). The terminal device 1 configures the system information included in the measurement configuration message, and performs measurement, event evaluation and measurement reporting on the serving cell and the neighbour cell (including a listed cell and/or a detected cell) according to the notified system information. The listed cell is a cell (a cell notified as a neighbour cell list of the terminal device 1 from the base station device 3) listed as a measurement object, and the detected cell is a cell (a cell which is not notified as the neighbour cell list and is detected by the terminal device 1) which is detected by the terminal device 1 in the frequency indicated by the measurement object but is not listed as the measurement object.

As the measurement, there are three types (intra-frequency measurements, inter-frequency measurements, and inter-RAT measurements). The intra-frequency measurements are measurements in the downlink frequency of the serving cell. The inter-frequency measurements are measurements in a frequency different from the downlink frequency of the serving cell. The inter-RAT measurements are measurements in the radio technology (for example, UTRA, GERAN or CDMA2000) different from the radio technology (for example, EUTRA) of the serving cell.

The measurement configuration message includes a measurement identity (measId), measurement objects, and the addition and/or the modification and/or the removing of the configurations of the reporting configurations, physical quantity configuration (quantityConfig), measurement gap configuration (measGapConfig), and serving cell quality threshold (s-Measure).

The physical quantity configuration (quantityConfig) designates a L3 filtering coefficient in a case where the measurement objects are EUTRA. The L3 filtering coefficient defines a ratio between the latest measurement result and the past filtering measurement result. The filtering result is used in the event evaluation by the terminal device 1.

The measurement gap configuration (measGapConfig) is used for the configuration of a measurement gap pattern or the activation/deactivation of a measurement gap. In the measurement cap configuration (measGapConfig), a gap pattern, a start system frame number (startSFN), or a start subframe number (startSubframeNumber) is notified as information in a case where the measurement gap is activated. The gap pattern defines a pattern to be used as the measurement gap. The start system frame number (startSFN) defines a system frame number (SFN) in which the measurement gap is started. The start subframe number (startSubframeNumber) defines a subframe number in which the measurement gap is started.

In a case where the uplink/downlink transmission is not scheduled, the measurement gap is a period (time or subframe) that is likely to be used by the terminal device 1 to perform the measurement.

In a case where the measurement gap is configured for the terminal device 1 (or to which the DRS configuration is set) that supports the measurement of the DRS, the measurement of the DRS may be performed in the subframe (that is, on the measurement gap) defined based on the measurement gap configuration.

In a case where the measurement gap is configured for the terminal device 1 (or to which the DRS configuration is set) that supports the measurement of the DRS, the DRS may be measured on the measurement gap if the DRS transmission subframe based on the subframe configuration included in the DRS configuration overlaps with the subframe defined based on the measurement gap configuration. If the DRS transmission subframe is present on the measurement gap, the terminal device 1 may measure the DRS on the measurement gap.

In a case where the measurement gap is configured for the terminal device 1 (or to which the DRS configuration is set) that supports the measurement of the DRS, the DRS may be measured for only the cell in the deactivated state on the measurement gap in the DCI format or the MAC CE. That is, the terminal device 1 may not perform the measurement of the DRS on the cell in the activated state on the measurement gap. The base station device 3 may not transmit the DRS in the cell in the activated state.

The measurement gap may be configured for each DRS or each cell in the activated/deactivated state.

The serving cell quality threshold (s-Measure) represents a threshold related to the quality of the serving cell, and is used by the terminal device 1 to control whether or not it is necessary to perform the measurement. The serving cell quality threshold (s-Measure) is configured as a value of the RSRP.

Here, the measurement identity (measId) is used to link the measurement objects and the reporting configurations, and specifically, to link the measurement object identity (measObjectId) and the reporting configuration identity (reportConfigId). One measurement object identity (measObjectId) and one reporting configuration identity (reportConfigId) are correlated with the measurement identity (measId). The measurement configuration message may be added, modified and removed for the relationship between the measurement identity (measId), the measurement objects and the reporting configurations.

measObjectToRemoveList is a command for removing the measurement objects corresponding to the designated measurement object identity (measObjectId) and the designated measurement object identity (measObjectId). In this case, all the measurement identity (measId) correlated with the designated measurement object identity (measObjectId) are removed. This command can simultaneously designate a plurality of measurement object identities (measObjectIds).

measObjectToAddModifyList is a command for modifying the designated measurement object identities (measObjectIds) to the designated measurement objects or adding the designated measurement object identities (measObjectIds) and the designated measurement objects (measurement objects). This command can simultaneously designate a plurality of measurement object identities (measObjectIds).

reportConfigToRemoveList is a command for removing the reporting configurations corresponding to the designated reporting configuration identity (reportConfigId) and the designated reporting configuration identity (reportConfigId). In this case, all the measurement identities (measIds) correlated with the designated reporting configuration identity (reportConfigId) are removed. This command can simultaneously designate a plurality of reporting configuration identities (reportConfigIds).

measIdToRemoveList is a command for removing the designated measurement identity (measId). In this case, the measurement object identity (measObjectId) and the reporting configuration identity (reportConfigId) correlated with the designated measurement identity (measId) are maintained without being removed. This command can simultaneously designate a plurality of measurement identities (measIds).

measIdToAddModifyList is a command for modifying the designated measurement identity (measId) such that the measurement identity is correlated with the designated measurement object identity (measObjectId) and the designated reporting configuration identity (reportConfigId) or adding the designated measurement identity (measId) by correlating the designated measurement object identity (measObjectId) and the designated reporting configuration identity (reportConfigId) with the designated measurement identity (measId). This command can simultaneously designate a plurality of measurement identities (measIds).

The measurement objects are defined for each radio access technology (RAT) and frequency. As the reporting configurations, there are the definition of the EUTRA and the definition of the RAT other than the EUTRA.

The measurement object includes measurement object EUTRA (measObjectEUTRA) correlated with the measurement object identity (measObjectId).

The measurement object identity (measObjectId) is identity used to identify the configuration of the measurement object. As described above, the configuration of the measurement object is defined for each radio access technology (RAT) and frequency. The measurement object is separately specified for the EUTRA, the UTRA, the GERAN or the CDMA2000. The measurement object EUTRA (measObjectEUTRA) which is the measurement object of the EUTRA defines information applied to the neighbour cell of the EUTRA. The measurement object EUTRA (measObjectEUTRA) having a different frequency is treated as a different measurement object, and is separately assigned the measurement object identity (measObjectId).

An example of the information of the measurement object will be described.

The measurement object EUTRA (measObjectEUTRA) includes EUTRA carrier frequency information (eutra-CarrierInfo), a measurement bandwidth (measurementBandwidth), antenna port 1 presence information (presenceAntennaPort1), an offset frequency (offsetFreq), information related to a neighbour cell list, and information related to a blacklist.

Hereinafter, information included in the measurement object EUTRA (measObjectEUTRA) will be described. The EUTRA carrier frequency information (eutra-CarrierInfo) designates a carrier frequency as the measurement object. The measurement bandwidth (measurementBandwidth) indicates a measurement bandwidth common to all the neighbour cells operated in the carrier frequency as the measurement object. The antenna port 1 presence information (presenceAntennaPort1) indicates whether or not the antenna port 1 is used in the cell as the measurement object. The offset frequency (offsetFreq) indicates a measurement offset value applied in the frequency as the measurement object.

An example of the information of the measurement object will be described.

The base station device 3 performs a configuration different from that in the first measurement for the terminal device 1 in order to perform the second measurement. For example, a signal (or the structure of the signal, or the configuration of the signal) as the measurement object may be different between the first measurement and the second measurement. A cell ID set to the signal as the measurement object may be different between the first measurement and the second measurement. An antenna port of the signal as the measurement object may be different between the first measurement and the second measurement. A measurement cycle (or measurement subframe pattern) of the signal as the measurement object may be different between the first measurement and the second measurement. That is, the first measurement and the second measurement may be individually configured.

The measurement object EUTRA (measObjectEUTRA) includes EUTRA carrier frequency information (eutra-CarrierInfo), a measurement bandwidth (measurementBandwidth), DRS configuration information, an offset frequency (offsetFreq), information related to a neighbour cell list, and information related to a blacklist.

Hereinafter, information included in the measurement object EUTRA (measObjectEUTRA) will be described. The EUTRA carrier frequency information (eutra-CarrierInfo) designates a carrier frequency as the measurement object. The measurement bandwidth (measurementBandwidth) indicates a measurement bandwidth common to all the neighbour cells operated in the carrier frequency as the measurement object. The DRS configuration information is used to notify the terminal device 1 of the common configuration information in the frequency band required to detect the DRS configuration, and indicates, for example, a subframe number or a subframe cycle transmitted in the cell as the measurement target. The offset frequency (offsetFreq) indicates a measurement offset value applied in the frequency as the measurement target.

An example of the information related to the neighbour cell list and the blacklist will be described.

The information related to the neighbour cell list includes information related to the neighbour cell as an object of the event evaluation or the measurement reporting. The information related to the neighbour cell list includes a physical cell identity (physical cell ID), and a cell specific offset (cellIndividualOffset) (indicating the measurement offset value applied to the neighbour cell). In the case of the EUTRA, this information is used as information for performing the adding, modifying or removing of the neighbour cell list already acquired from broadcast information (broadcasted system information) by the terminal device 1.

The information related to the blacklist includes information related to the neighbour cell which is not the object of the event evaluation or the measurement reporting. The information related to the blacklist includes the physical cell identity (physical cell ID). In the case of the EUTRA, this information is used as information for performing the adding, modifying or removing of the blacklisted cell list already acquired from the broadcast information by the terminal device 1.

An example of the information related to the neighbour cell list and the blacklist will be described.

In a case where the second measurement is performed, it is assumed that a case where it is insufficient with the physical cell identity (PCI) is used. Thus, a new neighbour cell list and a new blacklist acquired by extending the physical cell identity are required.

Information related to the new neighbour cell list neighbour small cell list may include information related to the neighbour cell as the object of the event evaluation or the measurement report. The information related to the new neighbour cell list may include a cell ID, a cell-specific offset (cellIndividualOffset) (indicating the measurement offset applied to the neighbour cell), and cell-specific DRS configuration information. Here, the cell-specific DRS configuration information is information of the DRS configured so as to be specific to the cell, and is, for example, information indicating the resource element of the used DRS. In the case of the EUTRA, this information is used as information for performing the adding, modifying or removing of the new neighbour cell list already acquired from the broadcast information (broadcasted system information) by the terminal device 1.

The information related to the new blacklist may include information related to the neighbour cell that is not the object of the event evaluation or the measurement report. The information related to the new blacklist may include the cell ID. In the case of the EUTRA, this information is used as information for performing the adding, modifying or removing of a new blacklisted cell list (blacklisted small cell list) already acquired from the broadcast information by the terminal device 1.

Here, the cell ID is, for example, a physical cell ID (physical layer cell ID), a cell global identity/identifier (CGI), an E-UTRAN cell global identifier/identity (ECGI), a discovery ID, a virtual cell ID, or a transmission point ID, and is constituted based on information of the cell (transmission point) ID transmitted by the DRS. A parameter related to a sequence generator (a scrambling sequence generator or a pseudo-random sequence generator) may be used instead of the cell ID.

In a case where the cell ID (or the parameter (for example, the scrambling ID) related to the pseudo-random sequence generator) is included in the configuration of the DRS, the neighbour cell list may indicate the list of the DRS. That is, the terminal device 1 may perform the measurement of the DRS of the cell ID set to the neighbour cell list.

In the cell ID is included in the configuration of the DRS, the blacklist may indicate the blacklist of the DRS. That is, the terminal device 1 may not perform the measurement of the DRS of the cell ID set to the blacklist.

Hereinafter, the details of the reporting configurations will be described.

The reporting configurations include reporting configuration EUTRA (reportConfigEUTRA) correlated with the reporting configuration identity (reportConfigId).

The reporting configuration identity (reportConfigId) is identity used to identify the reporting configurations related to the measurement. As stated above, as the reporting configurations related to the measurement, there are the definition for the EUTRA and the definition for the RAT (UTRA, GERAN, or CDMA2000) other than the EUTRA. The reporting configuration EUTRA (reportConfigEUTRA) which is the reporting configurations for the EUTRA defines triggering criteria of the event used to report the measurement in the EUTRA.

The reporting configuration EUTRA (reportConfigEUTRA) includes an event identity (eventId), triggering quantity (triggerQuantity), hysteresis, trigger time (timeToTrigger), reporting quantity (reportQuantity), the maximum number of reported cells (maxReportCells), reporting interval (reportInterval) and reporting amount (reportAmount).

The event identity (eventId) is used to select criteria related to the event triggered reporting. Here, in a case where the triggering criteria are satisfied, the event triggered reporting is a method of reporting the measurement. In addition, in a case where the triggering criteria are satisfied, there is event triggered periodic reporting for reporting the measurement a certain number of times at regular intervals.

In a case where the event triggered criteria designated by the event identity (eventId) are satisfied, the terminal device 1 reports the measurement to the base station device 3. The triggering quantity (triggerQuantity) is a quantity used to evaluate the event triggered criteria. That is, the RSRP or the RSRQ is designated. That is, the terminal device 1 measures the downlink reference signal by using the quantity designated by the triggering quantity (triggerQuantity), and determines whether or not the event triggered criteria designated by the event identity (eventId) are satisfied.

The hysteresis is a parameter used in the event triggered criteria. The triggering time (timeToTrigger) indicates a period during which the event triggered criteria are satisfied. The reporting quantity (reportQuantity) indicates a quantity reported by the measurement report. Here, the quantity designated by the triggering quantity (triggerQuantity), or the RSRP and RSRQ is designated.

The maximum number of reported cells (maxReportCells) indicates the maximum number of cells included in the measurement report. The reporting interval (reportInterval) is used in periodic reporting or event triggered periodic reporting, and the periodical reporting is performed every interval indicated by the reporting interval (reportInterval). The reporting amount (reportAmount) is defined by the number of times the periodical reporting is performed if necessary.

A threshold parameter or an offset parameter used in the event triggered criteria to be described below together with the event identity (eventId) is notified to the terminal device 1 in the reporting configurations.

The base station device 3 may or may not notify of a serving cell quality threshold (s-Measure) in some cases. In a case where the base station device 3 notifies the serving cell quality threshold (s-Measure), when the RSRP of the serving cell is lower than the serving cell quality threshold (s-Measure), the terminal device 1 performs the event evaluation (referred to as evaluation of reporting criteria of whether or not the event triggered criteria are satisfied). Meanwhile, in a case where the base station device 3 does not notify of the serving cell quality threshold (s-Measure), the terminal device 1 performs the measurement of the neighbour cell and the event evaluation irrespective of the RSRP of the serving cell.

Hereinafter, the details of the event and the event triggered criteria will be described.

The terminal device 1 that satisfies the event triggered criteria transmits the measurement report to the base station device 3. The measurement report includes a measurement result.

A plurality of event triggered criteria for perform the measurement report is defined, and there are a subscription criterion and a separation criterion. That is, the terminal device 1 that satisfies the subscription criterion to the event designated from the base station device 3 transmits the measurement report to the base station device 3. In a case where the event separation criterion is satisfied, the terminal device 1 which satisfies the event subscription criterion and transmits the measurement report stops transmitting the measurement report.

An example of the event and the event triggered criterion to be described below is used by any one of a first measurement result or a second measurement result.

Hereinafter, an example of a method of designating the type of measurement result used to evaluate the event triggered criteria will be described.

The type of measurement result used to evaluate the event triggered criteria is designated by the reporting configurations. The event triggered criteria is evaluated using any one of the first measurement result or the second measurement result by the parameter.

As a specific example, whether the first measurement result or the second measurement result is used is designated by the triggering physical quantity (triggerQuantity). As the triggering physical quantity, four selection fields of {first RSRP, first RSRQ, second RSRP and second RSRQ} may be designated. The terminal device 1 measures the downlink reference signal by using the physical layer designated by the triggering quantity (triggerQuantity), and determines whether or not the event triggered criteria designated by the event identity (eventId) are satisfied.

As a specific example, whether the first measurement result or the second measurement result is used may be defined by a new parameter (triggerMeasType) for designating the type of measurement result used to evaluate the event triggered criteria in addition to the triggering physical quantity. Information indicating that the event triggered criteria are evaluated using the first measurement result or information indicating that the event triggered criteria are evaluated using the second measurement result is set to the new parameter. For example, in a case where the information indicating that the event triggered criteria are evaluated using the second measurement result is set to the new parameter, the terminal device 1 performs the second measurement, and evaluates the event triggered criteria by using the second measurement result. The parameter may be shared with a parameter (reportMeasType) for designating the type of reported measurement result.

In the event triggered criteria in which two or more measurement results are used in one conditional expression such as comparison of the measurement result of the serving cell and the measurement result of the surrounding cell, the type of measurement result used to evaluate the event triggered criteria may be designated. For example, a new parameter (triggerMeasTypeServ) for the measurement result of the serving cell and a new parameter (triggerMeasTypeNeigh) for the measurement result of the surrounding cell may be defined.

Hereinafter, an example of the method of designating the type of the measurement result used to evaluate the event triggered criteria will be described.

The type of measurement result used to evaluate the event triggered criteria is determined depending on criteria for designating the measurement by the reporting configurations.

As a specific example, the type of measurement result used to evaluate the event triggered criteria is determined depending on the activated/deactivated state of the target cell. For example, if the target cell is in the activated state, the event triggered criteria are evaluated using the first measurement result, and if the target cell is in the deactivated state, the event triggered criteria are evaluated using the second measurement result.

As a specific example, the type of measurement result used to evaluate the event triggered criteria is determined depending on the detection of the reference signal. For example, in a case where the CRS is detected and the DRS is not detected, the event triggered criteria may be evaluated using the first measurement result, and in a case where the CRS is not detected and the DRS is detected, the event triggered criteria may be evaluated using the second measurement result. In a case where both the CRS and the DRS are detected, the event triggered criteria may be evaluated using the measurement result of which the reception power is higher. In a case where both the CRS and the DRS area detected, the event triggered criteria may be evaluated using the measurement result acquired by averaging both the reception powers. In a case where both the CRS and the DRS are not detected, the event triggered criteria may not be evaluated.

Hereinafter, the details of the measurement result will be described.

The measurement result includes a measurement identity (measId), a serving cell measurement result (measResultServing), and a EUTRA measurement result list (measResultListEUTRA). Here, the EUTRA measurement result list (measResultListEUTRA) includes a physical cell identity (physicalCellIdentity) and a EUTRA cell measurement result (measResultEUTRA). Here, as mentioned above, the measurement identity (measId) is identity used to link measurement object identity (measObjectId) and reporting configuration identity (reportConfigId). The physical cell identity (physicalCellIdentity) is used to identify the cell. EUTRA cell measurement result (measResultEUTRA) is a measurement result for the EUTRA cell. The measurement result of the neighbour cell is included only when the associated event occurs.

An example of the measurement result will be described.

The terminal device 1 may report the measurement result by adding the results of the RSRP and the RSRQ for the target cell to the measurement result. The RSRP and the RSRQ reported once may be one of the first measurement result and the second measurement result. The first measurement result may be a measurement result acquired from the first measurement. The second measurement result may be a measurement result acquired from the second measurement. In other words, the first measurement result is a measurement result acquired based on configuration information related to the first measurement, and the second measurement result is a measurement result acquired based on configuration information related to the second measurement.

As a specific example, the measurement result is reported based on the parameter for determining the first measurement result or the second measurement result. A reference for determining the first measurement result or the second measurement result is, for example, a new parameter (reportMeasType). Information indicating that the first measurement result is reported or information indicating that the second measurement result is reported may be set to the new parameter. For example, in a case where the information indicating that the second measurement result is reported is set to the new parameter, the terminal device 1 recognizes the new parameter, performs the second measurement, transmits the second measurement result by adding the second measurement result to the measurement reporting message, and does not transmit the first measurement result. Information indicating that the first measurement result and the second measurement result are reported may be set to the new parameter.

The new parameter may be shared with a parameter (triggerMeasType) for designating the type of measurement result used to evaluate the event triggered criteria. The parameter may be shared with a higher layer parameter for designating the measurement method.

The parameter (reportQuantity) indicating the reporting physical quantity may be configured as a parameter (reportQuantityRSRP) for the RSRP and a parameter (reportQuantityRSRQ) for the RSRQ for each measured type. For example, the reportQuantityRSRP is configured as the first RSRP and the reportQuantityRSRQ is configured as the second RSRQ, the terminal device 1 transmits the first RSRP and the second RSRQ, and does not transmit the second RSRP and the first RSRQ.

As a specific example, the measurement result may be reported depending on the criteria for designating the measurement.

For example, the type of reported measurement result may be determined depending on the activated/deactivated state of the target cell.

For example, the type of reported measurement result is determined depending on the detection of the reference signal. For example, in a case where the CRS is detected and the DRS is not detected, the first measurement result is reported, and if the CRS is not detected and the DRS is detected, the second measurement result is reported. In a case where both the CRS and the DRS are detected, the measurement result of which the reception power is higher is reported. In a case where both the CRS and the DRS are not detected, the measurement result is not reported, or the lowest value is reported.

In order for the base station device 3 to recognize whether the reported measurement result is the result calculated by the first measurement or the measurement calculated by the second measurement, the terminal device 1 may add a parameter indicating the type of measurement to which the measurement result is set.

The example of the event triggered criteria and the reporting of the measurement result has been described. The terminal device 1 reports the first measurement result and/or the second measurement result to the base station device 3 by the combination thereof. In the present embodiment, the combination of the event, the event triggered criteria and the reporting of the measurement result is not limited, and an example of a preferred combination will be described below.

An example of the combination of the event, the event triggered criteria and the reporting of the measurement result will be described.

In a case where the first measurement is performed, the measurement object (measObject) including the neighbour cell list or the blacklist for the physical cell identity is configured is configured, the reporting configuration (reportConfig) for which the event and the event triggered criteria triggered by the first measurement are configured is configured, and the measurement reporting message including the first measurement result (measResults) is transmitted in association with these parameters by the ID. In a case where the second measurement is performed, the measurement object (measObject) including the new neighbour cell list or the new blacklist for which the extended cell ID is configured is configured, the reporting configuration (reportConfig) for which the event and the event triggered criteria triggered by the second measurement are configured is configured, and the measurement reporting message including the second measurement result (measResults) is transmitted in association with these parameters by the ID.

That is, the measurement object, reporting configuration and measurement result for the first measurement and the measurement object, measurement configuration and measurement result for the second measurement are configured for the terminal device 1. That is, the reporting configuration for the first measurement result and the reporting configuration for the second measurement result are respectively configured.

An example of the combination of the event, the event triggered criteria and the reporting of the measurement result will be described.

In a case where the first measurement is performed, the measurement object (measObject) including the neighbour cell list or the blacklist for which the physical cell identity is configured is configured, the reporting configuration (reportConfig) for which the event and the event triggered criteria triggered by the first measurement are configured is configured, and these parameters are associated with the measurement results (measResults) by the ID. In a case where the second measurement is performed, the measurement object (measObject) including the new neighbour cell list or the new blacklist for which the extended cell ID is configured is configured, the reporting configuration (reportConfig) for which the event and the event triggered criteria triggered by the second measurement are configured is configured, and these parameters are associated with the measurement results (measResults) by the ID. In a case where the event triggered by the first measurement occurs, the first measurement result is substituted for the measurement result, and is transmitted by the measurement reporting message. In a case where the event triggered by the second measurement occurs, the second measurement result is substituted for the measurement result, and is transmitted by the measurement reporting message.

That is, the measurement object and reporting configuration for the first measurement and the measurement object and reporting configuration for the second measurement are configured, and the field of the measurement result is shared between the first measurement and the second measurement. The first measurement result or the second measurement result is transmitted by the event.

Accordingly, the terminal device 1 may report the first measurement result and the second measurement result to the base station device 3.

The terminal device 1 according to the present embodiment is the terminal device 1 that communicates with the base station device 3, and includes a reception unit 105 which performs first measurement based on a first RS (CRS), and performs second measurement based on a second RS (DRS), and a higher layer processing unit 101 that reports the first measurement result and the second measurement result to the base station device 3. The terminal device reports the first measurement result to the base station device 3 in a first state, and reports the first measurement result or the second measurement result to the base station device 3 in a second state.

As an example, in the second state, an event in which the first measurement result is reported an event in which the second measurement result is reported are configured by the base station device 3. As an example, in the second state, only the event in which the second measurement is reported is configured by the base station device 3. An event triggered criteria in which the second measurement result is reported is defined using the second measurement result.

As an example, the first state is a state in which configuration information of the second RS is not notified, and the second state is a state in which configuration information of the second RS is notified from the base station device 3. As an example, the first state is a state in which the second measurement information is not configured, and the second state is a state in which the second measurement information is configured from the base station device 3. As an example, the second state is a state in which the first RS is not transmitted.

Reporting configuration for the DRS may be individually set from reporting configuration for the CRS or CSI-RS.

A value is determined depending on a path loss in transmission power or power headroom (PHR). Hereinafter, an example of a method of estimating the path loss (channel attenuation value) will be described.

A downlink path loss estimation value of a serving cell c is calculated by the terminal device 1 using the expression of PLc=referenceSignalPower−higher layer filtered RSRP. Here, the referenceSignalPower is given in the higher layer. The referenceSignalPower is information based on the transmission power of the CRS. Here, the higher layer filtered RSRP is a first RSRP of a reference serving cell filtered in the higher layer.

In a case where the serving cell c belongs to TAG (pTAG) including the primary cell, the primary cell is used as the reference serving cell of the referenceSignalPower and the higher layer filtered RSRP for the uplink primary cell. The serving cell configured by a parameter of pathlossReference linking of the higher layer is used as the reference serving cell of the referenceSignalPower and the higher layer filtered RSRP for the uplink secondary cell. In a case where the serving cell c belongs to TAG (for example, sTAG) that does not include the primary cell, the serving cell c is used as the reference serving cell of the referenceSignalPower and the higher layer filtered RSRP.

An example of the method of estimating the path loss will be described.

The downlink path loss estimation value of the serving cell c is calculated by the terminal device 1 by using the expression of PLc=discoveryReferenceSignalPower−higher layer filtered RSRP2 in a case where the parameter is configured by the higher layer or by using the expression of PLc=referenceSignalPower−higher layer filtered RSRP in a case where the parameter is not configured by the higher layer. Here, the referenceSignalPower is given in the higher layer. The referenceSignalPower is information based on the transmission power of the CRS. Here, the higher layer filtered RSRP is a first RSRP of the reference serving cell filtered in the higher layer. Here, the discoveryReferenceSignalPower is a parameter related to the transmission power of the DRS, and is given in the higher layer. The higher layer filtered RSRP2 is a second RSRP of the reference serving cell filtered in the higher layer.

Here, the case where the parameter is configured by the higher layer may be, for example, a case where the parameter is based on the configuration of the DRS notified using the higher layer signalling. The case where the parameter is configured by the higher layer may be, for example, a case where the parameter is based on the configuration of the measurement notified using the higher layer signalling. The case where the parameter is configured by the higher layer may be, for example, a case where the parameter is based on the configuration of the uplink transmission power control notified using the higher layer signalling. That is, the case where the parameter is configured by the higher layer may include a case where the parameter or the information is notified using the higher layer signalling and is configured for the terminal device 1.

In a case where the serving cell c belongs to the TAG including the primary cell, the primary cell is used as the reference serving cell of the discoveryReferenceSignal-Power and the higher layer filtered RSRP2 for the uplink primary cell. The serving cell configured by a parameter of pathlossReferenceLinking of the higher layer is used as the reference serving cell of the discoveryReferenceSignal-Power and the higher layer filtered RSRP2 for the uplink secondary cell. In a case where the serving cell c belongs to the TAG that does not include the primary cell, the serving cell c is used as the reference serving cell of the discoveryReferenceSignalPower and the higher layer filtered RSRP2.

In a case where the secondary cell is in the deactivated state, the terminal device 1 may not perform the following process. The process includes the transmission of the SRS in the secondary cell, the reporting of the channel quality indicator (CQI)/precoding matrix indicator (PMI)/rank indicator (RI)/precoding type indicator (PTI) for the secondary cell, the transmission of the uplink data (UL-SCH) in the secondary cell, the transmission of the RACH in the secondary cell, the monitoring of the PDCCH in the secondary cell, and the monitoring of the PDCCH for the secondary cell.

In a case where the secondary cell is the small cell, even in a case where the secondary cell is in the deactivated state, the terminal device 1 may perform the following process. The process includes the transmission of the SRS in the secondary cell, the reporting of the CQI/PMI/RI/PTI for the secondary cell, (the transmission of the uplink data (UL-SCH) in the secondary cell), the transmission of the RACH in the secondary cell, the monitoring of the PDCCH in the secondary cell, and the monitoring of the PDCCH for the secondary cell.

In a case where the secondary cell in the deactivated state is the small cell, if there is a request for the SRS transmission to the secondary cell from the primary cell (PDCCH/EPDCCH (DCI format) transmitted in the primary cell) (a SRS request is transmitted) through cross-carrier scheduling, the terminal device 1 may transmit the SRS in the secondary cell. That is, in this case, the base station device 3 expects to receive the SRS.

In a case where the secondary cell in the deactivated state is the small cell, if there is a request for the CSI reporting to the secondary cell from the primary cell (PDCCH/EPDCCH (DCI format) transmitted in the primary cell) (a CSI request is transmitted) through cross-carrier scheduling, the terminal device 1 may transmit the CQI/PMI/RI/PTI for the secondary cell by using the PUSCH of the primary cell. That is, in this case, the base station device 3 expects to receive the CQI/PMI/RI/PTI for the secondary cell by using the PUSCH of the primary cell.

In a case where the secondary cell in the deactivated state is the small cell, if a random access response grant (RAR grant) through a PDCCH order is transmitted from the primary cell (PDCCH/EPDCCH (DCI format) transmitted in the primary cell) through cross-carrier scheduling, the terminal device 1 may perform the RACH transmission in the secondary cell. That is, in this case, the base station device 3 expects to receive the RACH in the secondary cell.

In a case where the secondary cell in the deactivated state is the small cell, if the DCI format accompanying by the CRC scrambled with the RA-RNTI can be detected for the secondary cell from the primary cell (PDCCH/EPDCCH (DCI format) transmitted in the primary cell) through cross-carrier scheduling, the terminal device 1 may perform the RACH transmission in the secondary cell. That is, in this case, the base station device 3 expects to receive the RACH in the secondary cell.

In a case where the secondary cell in the deactivated state is the small cell, if the configuration (or EPDCCH configuration) of the EPDCCH set is not set to the secondary cell, the terminal device 1 may monitor the PDCCH in the secondary cell. That is, in this case, the base station device 3 may transmit the PDCCH in the small cell in the deactivated state.

In a case where the secondary cell in the deactivated state is the small cell, if the downlink grant or the uplink grant, the CSI request or the SRS request, or the random access response grant are transmitted to the secondary cell from the primary cell (PDCCH/EPDCCH (DCI format) transmitted in the primary cell) through cross-carrier scheduling, the terminal device 1 may monitor the PDCCH for the secondary cell. In this case, only in a case where the EPDCCH set (or EPDCCH configuration) is not configured for the terminal device 1 or the terminal device 1 does not support a function of receiving the DCI by using the EPDCCH, the terminal device 1 may monitor the PDCCH for the secondary cell. That is, in this case, the base station device 3 may transmit the PDCCH in the small cell in the deactivated state.

In a case where the secondary cell in the deactivated state is the small cell, even though information related to the uplink scheduling is transmitted to the secondary cell, the terminal device 1 may not perform the uplink transmission based on the information related to the uplink scheduling. That is, in this case, the base station device 3 does not expect that the uplink transmission is performed in the small cell in the deactivated state.

In a case where the secondary cell in the deactivated state is the primary secondary cell (special secondary cell), if there is a request for the SRS transmission to the secondary cell (a SRS request is transmitted) through self-scheduling, the terminal device 1 may transmit the SRS in the secondary cell. That is, in this case, the base station device 3 expects to receive the SRS.

In a case where the secondary cell in the deactivated state is the primary secondary cell, if there is a request for the CSI reporting for the secondary cell (a CSI request is transmitted) through self-scheduling, the terminal device 1 may transmit the CQI/PMI/RI/PTI for the secondary cell by using the PUSCH of the secondary cell.

In a case where the secondary cell in the deactivated state is the primary secondary cell, if the random access response grant (RAR grant) through the PDCCH order is transmitted through self-scheduling, the terminal device 1 may perform the RACH transmission in the secondary cell.

In a case where the secondary cell in the deactivated state is the primary secondary cell, if the DCI format accompanying by the CRC scrambled with the RA-RNTI can be detected for the secondary cell through self-scheduling, the terminal device 1 may perform the RACH transmission in the secondary cell.

In a case where the secondary cell in the deactivated state is the primary secondary cell, if the EPDCCH is not configured for the secondary cell, the terminal device 1 may monitor the PDCCH in the secondary cell. That is, if the configuration of the EPDCCH set is not received for the primary secondary cell, the terminal device 1 may monitor the PDCCH in the secondary cell. If the configuration of the EPDCCH set is not set to the primary secondary cell, the base station device 3 may transmit the PDCCH for the terminal device 1 in the secondary cell.

In a case where the secondary cell in the deactivated state is the primary secondary cell, if the downlink grant or the uplink grant, the CSI request or the SRS request, or the random access response grant is transmitted for the secondary cell through self-scheduling, the terminal device 1 may monitor the PDCCH for the secondary cell. In this case, only in a case where the EPDCCH set is not configured for the terminal device 1 or the terminal device 1 does not support a function of receiving the DCI by using the EPDCCH, the terminal device 1 may monitor the PDCCH for the secondary cell.

In a case where the secondary cell in the deactivated state is the primary secondary cell, if information (PUSCH grant, CSI request or SRS request) related to the uplink scheduling is transmitted for the secondary cell through self-scheduling, the terminal device 1 may perform the uplink transmission based on the information related to the uplink scheduling in the secondary cell. For example, in a case where the DCI format 0 is detected for the secondary cell, the terminal device 1 may perform the PUSCH transmission in the secondary cell.

In a case where the secondary cell in the deactivated state is the primary secondary cell (special secondary cell), if there is a request for the SRS transmission to the secondary cell from the primary cell (PDCCH/EPDCCH (DCI format) transmitted in the primary cell) (a SRS request is transmitted) through cross-carrier scheduling, the terminal device 1 may transmit the SRS in the secondary cell. In this case, the terminal device 1 may support a function of performing the cross-carrier scheduling of the primary cell and the primary secondary cell.

In a case where the secondary cell in the deactivated state is the primary secondary cell, if there is a request for the CSI reporting for the secondary cell from the primary cell (PDCCH/EPDCCH (DCI format) transmitted in the primary cell) (a CSI request is transmitted) through cross-carrier scheduling, the terminal device 1 may transmit the CQI/PMI/RI/PTI for the secondary cell by using the PUSCH of the primary cell. In this case, the terminal device 1 may support a function of performing cross-carrier scheduling of the primary cell and the primary secondary cell.

In a case where the secondary cell in the deactivated state is the primary secondary cell, if the random access response grant (RAR grant) through a PDCCH order is transmitted from the primary cell (PDCCH/EPDCCH (DCI format) transmitted in the primary cell) through cross-carrier scheduling, the terminal device 1 may perform the RACH transmission in the secondary cell. In this case, the terminal device 1 may support a function of performing cross-carrier scheduling of the primary cell and the primary secondary cell. In this case, the base station device 3 may transmit the random access response grant (RAR grant) through the PDCCH order to the secondary cell in the deactivated state through cross-carrier scheduling.

In a case where the secondary cell in the deactivated state is the primary secondary cell, if the DCI format accompanying by the CRC scrambled with RA-RNTI can be detected for the secondary cell from the primary cell (PDCCH/EPDCCH (DCI format) transmitted in the primary cell), the terminal device 1 may perform the RACH transmission in the secondary cell. In this case, the terminal device 1 may support a function of performing cross-carrier scheduling of the primary cell and the primary secondary cell.

In a case where the secondary cell in the deactivated state is the primary secondary cell, if the EPDCCH set is not configured for the secondary cell, the terminal device 1 may monitor the PDCCH in the secondary cell.

In a case where the secondary cell in the deactivated state is the primary secondary cell, if the downlink grant or the uplink grant, the CSI request or the SRS request, or the random access response grant is transmitted to the secondary cell from the primary cell (PDCCH/EPDCCH (DCI format) transmitted in the primary cell) through cross-carrier scheduling, the terminal device 1 may monitor the PDCCH for the secondary cell. In this case, only in a case where the EPDCCH set is not configured for the terminal device 1 or the terminal device 1 does not support a function of receiving the DCI by using the EPDCCH, the terminal device 1 may monitor the PDCCH for the secondary cell.

In a case where the cross-carrier scheduling is invalid for the secondary cell in the deactivated state, the terminal device 1 may monitor the PDCCH in the secondary cell in the deactivated state.

In a case where the cross-carrier scheduling is invalid for the secondary cell in the deactivated state and various configurations related to the EPDCCH are not received, the terminal device 1 may monitor the PDCCH in the secondary cell in the deactivated state.

If the EPDCCH configuration and/or the configuration of the EPDCCH set are not performed for the secondary cell in the deactivated state, the terminal device 1 may monitor the PDCCH in the secondary cell in the deactivated state. The base station device 3 may determine whether or not the PDCCH is transmitted in the secondary cell in the deactivated state to the terminal device 1 depending on whether or not the EPDCCH configuration and/or the configuration of the EPDCCH set for the secondary cell in the deactivated state is set.

In a case where the secondary cell in the deactivated state is the primary secondary cell, if the information related to the uplink scheduling is transmitted to the secondary cell from the primary cell through the cross-carrier scheduling, the terminal device 1 may perform the uplink transmission based on the information related to the uplink scheduling. In this case, the terminal device 1 may support a function of performing the cross-carrier scheduling of the primary cell and the primary secondary cell.

If a certain serving cell is configured such that the terminal device 1 receives PDSCH data transmission according to Transmission Modes 1 to 9 through the higher layer signalling and is configured such that the terminal device 1 monitors the EPDCCH, the terminal device 1 assumes that the antenna ports 0 to 3 and 107 to 110 of the serving cell are quasi co-located for the Doppler shift, Doppler spread, average delay and delay spread.

In a case where a certain serving cell is configured such that the terminal device 1 receives the PDSCH data transmission according to Transmission Mode 10 through higher layer signalling and is configured such that the terminal device 1 monitors the EPDCCH for each EPDCCH-PRB set, and if the certain cell is configured by the higher layer such that the terminal device 1 decodes the PDSCH according to quasi co-location (QCL) type A, the terminal device 1 assumes that the antenna ports 0 to 3 and the antenna ports 107 to 110 of the serving cell are quasi co-located for the Doppler shift, Doppler spread, average delay, and delay spread. Meanwhile, if the certain cell is configured by the higher layer that the terminal device 1 decodes the PDSCH according to quasi co-location type B, the terminal device 1 assumes that the antenna ports 15 to 22 and the antenna ports 107 to 110 corresponding to a higher layer parameter (qcl-CSI-RS-ConfigNZPId) for the Doppler shift, Doppler spread, average delay, and delay spread.

According to the QCL type A, it may be assumed in the terminal device 1 that the antenna ports 0 to 3 and the antenna ports 107 to 110 of the serving cell are quasi co-located for the Doppler shift, Doppler spread, average delay, and delay spread.

According to the QCL type B, it may be assumed in the terminal device 1 that the antenna ports 107 to 110 and the antenna ports 15 to 22 corresponding to the higher layer parameter (qcl-CSI-RS-ConfigNZPId) are quasi co-located for the Doppler shift, Doppler spread, average delay, and delay spread.

That is, in a case where the type A is set to the terminal device 1 based on the higher layer parameter QCL operation, it is assumed that the antenna ports 0 to 3 and the antenna ports 107 to 110 of the serving cell are quasi co-located, and in a case where the type B is set, it is assumed that the antenna ports 107 to 110 and the antenna ports 15 to 22 corresponding to the higher layer parameter (qcl-CSI-RS-ConfigNZPId) are quasi co-located. In other words, in a case where the type A is set to the terminal device 1 configured so as to monitor the EPDCCH based on the higher layer parameter QCL operation, it is assumed that the CRS and the EPDCCH are quasi co-located, and in a case where the type B is set, it is assumed that the CSI-RS and the EPDCCH are quasi co-located.

In a case where a certain serving cell is configured such that the terminal device 1 receives PDSCH data transmission corresponding to Transmission Mode 10 through the higher layer signalling and each EPDCCH-PRB set is configured that the terminal device 1 monitors the EPDCCH, a parameter set (PDSCH-RE-MappingQCL-Config) indicated by the higher layer parameter (re-MappingQCL-ConfigId or PDSCH-RE-MappingQCL-ConfigId) is used in order to determine the quasi co-location of the EPDCCH antenna ports and the mapping of the EPDCCH resource elements. In order to determine the mapping of the EPDCCH resource elements and the quasi co-location of the EPDCCH antenna ports, various parameters (crs-PortsCount, crs-FreqShift, mbsfn-SubframeConfigList, csi-RS-ConfigZPId, pdsch-Start, and qcl-CSI-RS-ConfigNZPId) are included in the parameter set.

In a case where a certain serving cell (secondary cell) is configured such that the terminal device 1 receives the DRS through the higher layer signalling and is configured such that the terminal device 1 monitors the EPDCCH, the higher layer parameter (qcl-DRS-ConfigId) for determining the mapping of the DRS and EPDCCH resource elements and the quasi co-location of the EPDCCH antenna ports may be configured.

In a case where a certain serving cell (secondary cell) is configured such that the terminal device 1 receives the DRS through the higher layer signalling and is configured such that the terminal device 1 monitors the EPDCCH, the terminal device 1 assumes that the antenna ports 107 to 110 and one or more antenna ports corresponding to the higher layer parameter (qcl-DRS-ConfigId) are quasi co-located.

In order to determine the mapping of the EPDCCH resource elements and the quasi co-location of the EPDCCH antenna ports with respect to the DRS, various parameters (drs-PortsCount, drs-FreqShift, drs-ConfigZPId, qcl-DRS-ConfigNZPId, and qcl-DRS-ConfigId) may be set. That is, the number of DRS antenna ports (drs-PortsCount) may be included in the configuration of the quasi co-location of the EPDCCH and the DRS. The DRS frequency shift (drs-FreqShift) may be included in the configuration of the quasi co-location of the EPDCCH and the DRS. A zero power DRS-ID (drs-ConfigZPId) may be included in the configuration of the quasi co-location of the EPDCCH and the DRS. Non-zero power DRS ID (qcl-DRS-ConfigNZPId) that is quasi co-located may be included in the configuration of the quasi co-location of the EPDCCH and the DRS.

A signal as a target which is quasi co-located with the EPDCCH may be changed depending on the activated/deactivated state of the serving cell (secondary cell). For example, the terminal device 1 may assume that the DRS and the EPDCCH are quasi co-located in the deactivated state of the serving cell and may assume that the CRS and the EPDCCH are quasi co-located in the activated state of the serving cell. The terminal device 1 may assume that the CSI-RS and the EPDCCH are quasi co-located in the deactivated state of the serving cell and may assume that the CRS and the EPDCCH are quasi co-located in the activated state of the serving cell. The terminal device 1 may assume that the CSI-RS, the CRS, and the EPDCCH are quasi co-located in the activated state of the serving cell and may assume that the CSI-RS and the EPDCCH are quasi co-located in the deactivated state of the serving cell. That is, the terminal device 1 determines that the quasi co-location of the EPDCCH (the mapping of the resource elements and the antenna ports) based on the set configuration information. In a case where the quasi co-location of the EPDCCH is changed in the activated state and deactivated state, the base station device 3 may transmit the information related to the plurality of QCL configurations.

Hereinafter, the discontinuous reception (DRX) will be described.

The terminal device 1 may configure the DRX by the RRC accompanying by the DRX function in order to control the activation (whether or not to perform the PDCCH monitoring) of the PDCCH monitoring of the terminal device 1 for the C-RNTI, TPC-PUCCH-RNTI, TPC-PUSCH-RNTI, and SPS-RNTI of the terminal device 1. If the DRX is not configured, the terminal device 1 continues to successively monitor the PDCCH. In order to perform the DRX, a plurality of timers (onDurationTimer, drx-InactivityTimer, and drx-RetransmissionTimer) is configured for the terminal device 1. A cycle (longDRX-Cycle or shortDRX-Cycle) and a start offset (drxStartOffset) are configured, and thus, a subframe in which the PDCCH is monitored during the DRX is configured. Parameters (drxShortCycleTimer and shortDRX-Cycle) related to short DRX may be configured as options. A HARQ RTT timer is defined for each DL HARQ process (except for a broadcast process). A period during which the PDCCH can be monitored during the DRX is referred to as an active time.

The active time may be a time during which at least one timer of a plurality of timers (onDurationTimer, drx-InactivityTimer, drx-RetransmissionTimer, and mac-ContentionResolutionTimer) is started. The active timer is a time during which a scheduling request is transmitted through the PUCCH and is pending. The active time may be a timer during which there is an uplink grant for the HARQ transmission being pending and data is present in corresponding HARQ buffer. The active time may be a time during which the PDCCH indicating new transmission related to the C-RNTI of the terminal device 1 is not received after the reception of the random access response for a preamble which is not selected by the terminal device 1 succeeds. The active time may be the number of subframes configured as a DRX active time (drx-Activetime).

If the DRX is configured, the terminal device 1 starts a DRX retransmission timer (drx-RetransmissionTimer) of the corresponding HARQ process for each subframe if the HARQ RTT timer expires in each subframe and the decoding of the data If the DRX is configured, the terminal device 1 stops the duration timer (onDurationTimer) and the DRX inactivity timer (drx-InactivityTimer) for each subframe if the DRX command MAC control element (MAC CE) is received.

The duration timer (onDurationTimer) is used to define the successive PDCCH subframe at the inception of the DRX cycle.

The DRX inactivity timer (drx-InactivityTimer) is used to define the number of successive PDCCH subframes after the subframe in which the PDCCH indicating the transmission of initial uplink/downlink user data to a certain terminal device 1 is transmitted.

The DRX retransmission timer (drx-RetransmissionTimer) is used to define the maximum number of successive PDCCH subframes until the downlink transmission is received.

The HARQ RTT timer is used to define the minimum number (minimum amount) of subframes before the downlink HARQ transmission is expected by the terminal device 1.

A MAC contention resolution timer (mac-ContentionResolutionTimer) is used to define the number of successive subframes in which the terminal device 1 after Message 3 (PUSCH corresponding to the random access response grant) is transmitted monitors the PDCCH.

A DRX short cycle timer (drxShortCycleTimer) is used to define the number of successive subframes in which the terminal device 1 follows a short DRX cycle.

A DRX start offset (drxStartOffset) is used to define the subframe in which the DRX cycle is started.

The active timer defines a time associated to the DRX operation and a period (time) during which the terminal device 1 monitors the PDCCH in a PDCCH monitoring subframe.

The PDCCH monitoring subframe is basically the same as the PDCCH subframe. However, in a case where the terminal device 1 can perform the eIMTA in a certain serving cell, the PDCCH monitoring subframe is the determined downlink subframe and a subframe including the DwPTS depending on the TDD UL-DL configuration indicated by the L1 signalling (for example, the DCI format with which the eIMTA-RNTI is scrambled) related to the eIMTA.

If the DRX is configured, if the DRX inactivity timer expires or the DRX command MAC CE is received in each subframe and the short DRX cycle is configured, the terminal device 1 starts (restarts) the DRX short cycle timer (drxShortCycleTimer) for each subframe, and uses the DRX cycle. Otherwise, the terminal device uses a log DRX cycle.

If the DRX is configured, if the DRX short cycle timer expires, the terminal device 1 uses the log DRX cycle for each subframe.

If the DRX is configured, in a case where an expression satisfies a predetermined condition based on a system frame number, a subframe number, a short DRX cycle (and/or log DRX cycle), and a DRX start offset (drxStartOffset), the terminal device 1 starts the duration timer for each subframe.

If the DRX is configured, if the PDCCH subframe is not necessary in the uplink transmission for half-duplex FDD terminal device operation during the active time or this subframe is not a part of a measurement gap for this subframe is configured, the terminal device 1 monitors the PDCCH for each subframe. If the PDCCH indicates the downlink transmission or if the downlink assignment is configured for the subframe, the HARQ RTT timer for the corresponding HARQ process is started, and the DRX retransmission timer for the corresponding HARQ process is stopped. In a case where the PDCCH indicates the new transmission (downlink or uplink), the DRX inactivity timer is started (or restarted).

If the DRX is configured, if the timer is not in the active time in consideration of the scheduling request transmitted and the grant/assignment/DRX command MAC CE received until the subframe n−5 (including the subframe n−5) in which all the DRX active time conditions are evaluated by the terminal device 1 in the latest subframe n, the terminal device 1 does not transmit a trigger type 0 SRS to each subframe.

If the DRX is configured, if CQI masking (cqi-Mask) is set up by the higher layer, the terminal device 1 does not report the CQI/PMI/RI/PTI in the PUCCH for each subframe if the duration timer is not in the active time in consideration of the grant/assignment/DRX command MAC CE received until the subframe n−5 (including the subframe n−5) in which all the DRX active time conditions are evaluated in the latest subframe n. Otherwise, if the terminal device 1 is not in the active time in consideration of the grant/assignment/DRX command MAC CE received until the subframe n−5 (including the subframe n−5) in which all the DRX active time conditions are evaluated in the latest subframe n, the CQI/PMI/RI/PTI (that is, CSI) is not reported in the PUCCH.

If there is an occurrence possibility irrespective of whether or not the terminal device 1 monitors the PDCCH, the terminal device 1 may receive/transmit the HARQ feedback, and may transmit the trigger type 1 SRS.

The same active time may be applied to all activated serving cells.

In the case of the spatial multiplexing of the downlink, if the transport block is received during which the HARQ RTT timer is being started and during which the transmission before the same transport block is received in a subframe which is positioned before at least N subframes from the latest subframe, the terminal device 1 may process the transport block, and may restart the HARQ RTT timer. Here, N equivalent to a value set to the HARQ RTT timer or the HARQ RTT timer.

In a case where the DRX is configured in the primary cell and the configuration of the DRS for the secondary cell is set, and in a case where the measurement subframe set based on the configuration of the DRS and the PDCCH subframe set based on the configuration of the DRX overlap, the terminal device 1 may perform the DRS measurement and the PDCCH monitoring in the secondary cell in the deactivated state in the overlapped subframe. The DRX active timer is applied to the activation serving cell, that is, all the serving cell in the activated state, but is not applied to the deactivation serving cell, that is, the serving cells in the deactivated state. In a case where the DRS configuration is set, the DRX active timer may be applied in the serving cell (or secondary cell) even in the deactivation state (off state, deactivation, or dormant mode). In this case, the DRS configuration may not include the subframe configuration. That is, the base station device 3 may transmit the DRS based on the DRX active time.

In a case where the DRX is configured in all the activation serving cells, the terminal device 1 may measure the DRS in the subframe of which the timer becomes the active time by the DRX in the small cell in the deactivated state to which the configuration of the DRS is set.

In a case where the DRX deactivation timer or the duration timer expires, the terminal device 1 may not perform the measurement of the DRS even though the expired subframe can be measured based on the DRS measurement subframe. That is, in a case where the DRX deactivation timer or the duration timer expires, the terminal device 1 does not expect that the DRS is transmitted in the subsequent DRS measurement subframes.

In a case where the DRS configuration for the secondary cell in the deactivated state (as the small cell) is notified (provided or given) using the higher layer signalling in the terminal device 1 for which the DRX is configured, the terminal device 1 may perform the RPM (RSRP/RSRQ/RSSI) measurement of the DRS in the DRS transmission subframe of the secondary cell overlapping with the active time of the DRX.

The configuration of the DRX (drx-Config) may be individually set to the MCG and the SCG, or the primary cell and the primary secondary cell, or the MeNB and the SeNB. The DRX in the SCG may indicate the activated/deactivated state of the primary secondary cell. In a case where the DRX is configured for the SCG, the DRS and the PDCCH may be transmitted in the DRX subframe.

Here, although the configuration of the DRX has been performed, various parameters set to the configuration of the DRX may be set as the configuration of discontinuous transmission (DTX).

Hereinafter, radio link monitoring will be described. The radio link monitoring means that the downlink radio link quality of the primary cell is monitored by the terminal device 1 in order to indicate to the higher layer that the radio link quality is in-sync or out-of-sync.

In the non-DRX operation, the physical layer of the terminal device 1 evaluates the radio link quality evaluated over the past (previous) time period using thresholds ($Q_{in}$ and $Q_{out}$) defined based on the test associated with the radio link monitoring for each radio frame (the number of subframes constituting the radio frame)

In the DRX operation, the physical layer of the terminal device 1 evaluates the radio link quality evaluated over the past (previous) time period using thresholds ($Q_{in}$ and $Q_{out}$) defined based on the test associated with the radio link monitoring for each at least one DRX (the number of subframes constituting the DRX cycle).

If the higher layer signalling indicates a certain subframe in order to limit the radio link monitoring, the radio link quality is not monitored in the subframe other than the subframe indicated by the higher layer signalling. That is, in a case where the subframe in which the radio link monitoring is performed is limited by the higher layer signalling, the terminal device 1 performs the radio link monitoring only in the limited subframe.

In a case where the radio link quality is worse than the threshold $Q_{out}$ in the radio frame in which the radio link quality is evaluated, the physical layer of the terminal device 1 indicates to the higher layer that the radio link quality is the out-of-sync. In a case where the radio link quality is better than the threshold $Q_{in}$, the physical layer of the terminal device 1 indicates to the higher layer that the radio link quality is the in-sync in the radio frame in which the radio link quality is evaluated.

The physical layer of the terminal device 1 that supports the dual connectivity may perform the radio link monitoring on the primary cell and the primary secondary cell. The thresholds related to the radio link quality may be defined for the primary cell and the primary secondary cell.

The physical layer of the terminal device 1 that supports the dual connectivity may individually evaluate the radio link quality (out-of-sync or in-sync) on the primary cell and the primary secondary cell.

When the radio link quality is evaluated, in a case where the out-of-sync is continued a predetermined number of times, the physical layer of the terminal device 1 that supports the dual connectivity starts a protection timer. In a case where the protection timer expires, the physical layer of the terminal device 1 notifies the higher layer that the out-of-sync occurs in this cell (in other words, a physical layer problem is detected). The higher layer of the terminal device 1 recognizes that a radio link failure (RLF) is detected in a case where the cell in which the physical layer problem is detected is the primary cell. In this case, the higher layer of the terminal device 1 may notify the base station device 3 that the RLF is detected in the primary cell. The higher layer of the terminal device 1 may not recognize the RLF in a case where the cell in which the physical layer problem is detected is the primary secondary cell. The higher layer of the terminal device 1 may perform the same process as that of the primary cell in a case where the cell in which the physical layer problem is detected is the primary secondary cell.

Hereinafter, the semi-persistent scheduling (SPS) will be described. In a case where the semi-persistent scheduling is configured to be valid by the RRC layer (higher layer signalling, or the higher layer), the terminal device 1 receives the following information. This information includes the uplink semi-persistent scheduling interval (semiPersistSchedIntervalUL) and the number of times blank transmission is performed before being implicitly released (implicitReleaseAfter) in a case where the semi-persistent scheduling C-RNTI and the semi-persistent scheduling are effective for the uplink, and the downlink semi-persistent scheduling interval (semiPersistSchedIntervalDL) and the number of HARQ processes (numberOfConfSPS-Processes) configured for the semi-persistent scheduling in a case where two parameter configurations (twoIntervalsConfig) are effective for the uplink or the semi-persistent scheduling is effective for the downlink only in the TDD.

In a case where the semi-persistent scheduling for the uplink or downlink is configured to be invalid by the RRC layer (higher layer signalling or the higher layer), the corresponding configured grant or configured assignment is ignored.

The semi-persistent scheduling is supported only by the primary cell.

The semi-persistent scheduling is not supported for RN communication of the E-UTRAN of the connection accompanying by the RN subframe configuration.

After the semi-persistent downlink assignment is configured, if N-th assignment occurs in the subframe and system frame number that satisfies a certain condition, the terminal device 1 regards these frames to be continued. Here, the certain condition may be determined based on the system number ($SFN_{start\_time}$) and the subframe ($subframe_{start\_time}$) when the downlink assignment configured for the terminal device 1 is initialized (or reinitialized).

After the semi-persistent uplink grant is configured, the terminal device 1 sets a subframe offset (Subframe_Offset) based on a certain table if two interval configurations are configured to be valid in the higher layer, and sets the subframe offset to be 0 if not.

After the semi-persistent uplink grant is configured, if the N-th grant occurs in the subframe and the system number that satisfies a certain condition, the terminal device 1 regards these frames to be continued. Here, the certain condition may be determined based on the system frame number ($SFN_{start\_time}$) and the subframe ($subframe_{start\_time}$) when the uplink grant configured for the terminal device 1 is initialized (or reinitialized).

The terminal device 1 clears the configured uplink grant immediately after the number of times blank transmission is performed before successive MAC protocol data units (PDUs) including a zero MAC service data unit (SDU) are implicitly released is given by multiplexing and constructing entities.

In a case where the terminal device 1 supports a function of performing the dual connectivity, the SPS may be performed in the primary secondary cell in addition to the primary cell. That is, the SPS configuration may be set to the primary secondary cell in addition to the primary cell.

In the terminal device 1 that supports the function of performing the dual connectivity, in a case where only one SPS configuration is set, the SPS may be applied to only the primary cell.

In the terminal device 1 that supports the function of performing the dual connectivity, in a case where only one SPS configuration is set, the same configuration may be applied to the primary cell and the primary secondary cell.

In the terminal device 1 that supports the function of performing the dual connectivity, the downlink SPS configuration and/or the uplink SPS configuration may be individually set to the primary cell and the primary secondary cell. That is, the downlink SPS configuration and/or the uplink SPS configuration may be common to or may be individually configured for the primary cell and the primary secondary cell. Whether or not the SPS is individually performed in the primary cell and the primary secondary cell in the downlink and/or the uplink may be determined based on function information transmitted from the terminal device 1.

Hereinafter, the PDCCH and the EPDCCH transmitted in the primary secondary cell will be described.

The PDCCH transmitted in the primary secondary cell may be scrambled using the parameter common to the plurality of terminal devices and/or the previously defined parameter. In a case where the parameter common to the plurality of terminal devices is not configured, the PDCCH is scrambled using the physical cell identity.

The PDCCH transmitted in the primary secondary cell may be cyclic-shifted on a per REG basis based on the parameter common to the plurality of terminal devices and/or the previously defined parameter. In a case where the parameter common to the plurality of terminal devices is not configured, the PDCCH is cyclic-shifted based on a value of the physical cell identity.

The USS and the search space different from the USS are allocated to the primary secondary cell. The search space different from the USS is a search space which monitors a region common to the plurality of terminal devices. The CSS allocated to the primary cell is referred to as a first CSS, and the search space different from the USS allocated to the primary secondary cell is referred to as a second CSS.

The second CSS is a search space configured using the parameter common to the plurality of terminal devices and/or the previously defined parameter. The parameter common to the plurality of terminal device is notified from the higher layer. As an example of the parameter common to the plurality of terminal devices, the parameter specific to the base station device 3 (cell or transmission point) is used. For example, as the parameter specific to the transmission point, the virtual cell ID or TPID is used. As an example of the parameter common to the plurality of terminal devices, a parameter capable of being individually configured for the terminal device, or a parameter for which a value common to the plurality of terminals is configured is used. For example, as the parameter for which the value common to the plurality of terminal devices is configured, the RNTI is used.

The PDCCH may be allocated to the second CSS. In this case, in the second CSS, the CCE in which the search space is started is determined by using the parameter common to the plurality of terminals and/or the previously defined parameter. Specifically, the RNTI (for example, UE-group-RNTI or CSS-RNTI) common to the plurality of terminals is configured as an initial value of $Y_k$ used in the expression (1) of FIG. 14. The CCE in which the search space of the second CSS is started may be designated in common to the terminals by the higher layer parameter. Specifically, the $Y_k$ used in the expression (1) of FIG. 14 is constantly a fixed value, and the higher layer parameter (for example, the parameter for designating the CCE index) is set. Zero may be constantly set to the $Y_k$.

The aggregation levels 4 and 8 of the second CSS allocated to the PDCCH are supported. Four PDCCH candidates are defined in the aggregation level 4, and two PDCCH candidates are defined in the aggregation level 8. The aggregation levels 1, 2, 16 and 32 may be supported. In this case, the number of times blind decoding is performed is not increased in the second CSS by limiting the number of PDCCH candidates. For example, in a case where the aggregation levels 2, 4 and 8 of the second CSS are supported, two PDCCH candidates are defined in each aggregation level.

The EPDCCH may be allocated to the second CSS. In this case, in the second CSS, the ECCE in which the search space is started is determined using the parameter common to the plurality of terminals and/or the previously defined parameter. Specifically, the RNTI (for example, UE-group-RNTI or CSS-RNTI) common to the plurality of terminals is configured for an initial value of $Y_{p,k}$ used in the expression (2) of FIG. 14. The ECCE in which the search space of the second CSS is started may be designated in common to the terminals by the higher layer parameter. Specifically, the $Y_{p,k}$ used in the expression (2) of FIG. 14 is constantly a fixed value, and the higher layer parameter (for example, the parameter for designating the ECCE index) is set. Zero may be constantly set to the $Y_{p,k}$.

In a case where the EPDCCH is allocated to the second CSS, the EPDCCH set allocated to the second CSS may be configured. For example, the EPDCCH set 0 may be allocated to the USS, and the EPDCCH set 1 may be allocated to the second CSS. The USS and the second CSS may be allocated within one EPDCCH set. For example, the EPDCCH set 0 may be allocated to the USS and the second CSS.

The aggregation levels 4 and 8 of the second CSS to which the EPDCCH is allocated are supported. Four EPDCCH candidates are defined in the aggregation level 4, and two EPDCCH candidates are defined in the aggregation level 8. The aggregation levels 1, 2, 16 and 32 may be supported. In this case, the number of times blind decoding is performed is not increased in the second CSS by limiting the number of PDCCH candidates. For example, in a case where the aggregation levels 2, 4 and 8 of the second CSS are supported, two PDCCH candidates are defined in each aggregation level.

The second CSS is allocated to the primary secondary cell configured through the dedicated RRC signaling. Thus, it is not necessary to allocate control information associated with the broadcast information to the second CSS. Thus, it is not necessary to monitor the PDCCH by using the RNTI related to the information. The type (second RNTI group) of RNTI used in the PDCCH monitoring in the second CSS is different from the type (first RNTI group) of RNTI used in the PDCCH monitoring in the first CSS.

An example of the type (first RNTI group) of RNTI used in the PDCCH monitoring in the first CSS will be described.

The terminal device 1 monitors the PDCCH allocated to the first CSS by using C-RNTI, SPS C-RNTI, SI-RNTI, P-RNTI, RA-RNTI, TPC-PUCCH-RNTI, TPC-PUSCH-RNTI, temporal C-RNTI, M-RNTI, or TDD-ModeA-RNTI.

An example of the type (second RNTI group) of RNTI used in the PDCCH monitoring in the second CSS will be described.

The PDCCH for notifying of at least random access response, the PDCCH for indicating the TPC command to a specific terminal device 1, or the PDCCH for notifying of the TDD UL/DL configuration may be allocated to the second CSS. In a case where backhaul delay between the MeNB and SeNB is large, it is necessary to perform the transmission from the SeNB even at the time of the RRC reconfiguration. That is, the terminal device 1 monitors the PDCCH allocated to the second CSS by using the RA-RNTI, TPC-PUCCH-RNTI, TPC-PUSCH-RNTI, TDD-ModeA-RNTI, C-RNTI, SPS C-RNTI, and temporary C-RNTI.

Meanwhile, it is not necessary to arrange the PDCCH to which information related to paging is assigned in the second CSS. Since the primary secondary cell is used in the RRC connected mode, it is not necessary to arrange the PDCCH to which the downlink/uplink grant for transmission by a subordinate transmission scheme required at the time of the RRC reconfiguration is assigned. That is, the terminal device 1 may not monitor the PDCCH allocated to the second CSS by using the SI-RNTI or the P-RNTI.

An example of the type (second RNTI group) of RNTI used in the PDCCH monitoring in the second CSS will be described.

The PDCCH for notifying of at least random access response, the PDCCH for indicating the TPC command to a specific terminal device 1, or the PDCCH for notifying of the TDD UL/DL configuration may be allocated to the second CSS. That is, the terminal device 1 monitors the PDCCH allocated to the second CSS by using at least RA-RNTI, TPC-PUCCH-RNTI, TPC-PUSCH-RNTI, and TDD-ModeA-RNTI.

Meanwhile, it is not necessary to arrange the PDCCH to which the system information or information related to paging is assigned in the second CSS. Since the primary secondary cell is used in the RRC connected mode, it is not necessary to arrange the PDCCH to which the downlink/uplink grant for transmission by a subordinate transmission scheme required at the time of RRC reconfiguration is assigned. That is, the terminal device 1 may not monitor the PDCCH allocated to the second CSS by using the SI-RNTI, P-RNTI, C-RNTI, SPS C-RNTI or temporary C-RNTI.

The PDCCH including the information indicating the activated/deactivated state of the cell may be allocated to the second CSS. That is, the terminal device 1 monitors the PDCCH allocated to the second CSS by using the RNTI (SCE-RNTI) associated with the small cell ON/OFF.

The terminal device 1 increases the number of times the blind decoding is performed in the primary secondary cell by the second CSS. Specifically, only the USS is allocated to the secondary cell, and both the USS and the second CSS are allocated to the primary secondary cell. If the number of times the blind decoding is performed in the second CSS is the same as the number of times the blind decoding is performed in the first CSS, the number of times the blind decoding is performed is increased to twelve, and the load of the terminal device 1 is increased.

An example in which the number of times blind decoding is performed in the second CSS is reduced will be described.

In a case where the PDCCH allocated to the second CSS is not monitored using the C-RNTI, SPS C-RNTI or Temporary C-RNTI, the DCI format 0/1A is not allocated to the second CSS, and thus, it is possible to reduce the number of times the blind decoding is performed in the second CSS.

In this case, the DCI format 3/3A is padded so as to be adjusted for a payload size of the DCI format 1C. Alternatively, a new DCI format (DCI format 3B) in which the TPC command is transmitted is configured.

The DCI format 3B is used to transmit the TPC command for the PUCCH and PUSCH through 1-bit power adjustment. The terminal device 1 can detect the value of the transmission power control command corresponding to the PUSCH or PUCCH by detecting bit information corresponding to the index (TPC-index) assigned to the terminal device. It is determined whether the DCI format 3B indicates the transmission power control command for the PUSCH or the transmission power control command for the PUCCH depending on the type of the RNTI to be scrambled. The DCI format 3B is padded so as to be adjusted for a payload size of the DCI format 1C.

Accordingly, since only control information having the same payload size as that of the DCI format 1C is allocated to the second CSS, it is possible to reduce the number of times the blind decoding is performed. Specifically, in the second CSS, the decoding of six PDCCH candidates and the DCI format having one type of bit size is tried in the aggregation 4, or the decoding of two PDCCH candidates and the DCI format having one type of bit size is tried in the aggregation 8. That is, the terminal device 1 tries to decode in the second CSS six times. Accordingly, it is possible to halve the number of times the blind decoding is performed in the CSS.

An example in which the number of times the blind decoding is performed in the second CSS is reduced will be described.

In the second CSS, the parity bit is inserted until the payload size of the DCI format 1C becomes the same as that of the DCI format 0. Accordingly, since only the control information having the same payload size as that of the DCI format 0 is allocated to the second CSS, it is possible to reduce the number of times the blind decoding is performed. Specifically, in the second CSS, the decoding of 6 PDCCH candidates and the DCI format having one type of bit size is tried in the aggregation 4, and the decoding of 2 PDCCH candidates and the DCI format having one type of bit size is tried in the aggregation 8. That is, the terminal device 1 tries to decode in the second CSS six times. Accordingly, it is possible to halve the number of times the blind decoding is performed in the CSS.

All the terminal devices 1 do not support the monitoring of the second CSS in terms of the increase in the number of times the blind decoding is performed. Thus, information (capability) indicating ability of whether or not the terminal device 1 can monitor the second CSS may be notified to the base station device 3.

The terminal device 1 having high processing capability notifies the base station device 3 of information indicating that the terminal device can monitor the second CSS. Meanwhile, the terminal device 1 having low processing capability notifies the base station device 3 of information indicating that the terminal device is not able to monitor the second CSS. The base station device 3 acquires the information indicating the ability of whether or not the terminal device can monitor the second CSS from each terminal device 1, and performs the configuration of the second CSS for only the terminal device 1 capable of monitoring the second CSS. Here, the base station device 3 may configure the terminal device 1 capable of monitoring the second CSS as the UE group.

The base station device 3 arranges the PDCCH in the second CSS, and performs the notification of the random access response or the notification of the TDD UL/DL configuration to the terminal device 1 capable of monitoring the second CSS.

The base station device 3 arranges the PDCCH in the USS, and performs the notification of the random access response or the notification of the TDD UL/DL configuration to the terminal device 1 which is not capable of monitoring the second CSS. In this case, in terms of the number of times the blind decoding is performed, the DCI format 1A is used in the notification of the random access response, and the DCI format 1C used in the notification of the TDD UL/DL configuration is fed back until the payload size of the DCI format 1C becomes the same as that of the DCI format 0.

Accordingly, the notification of the random access response or the notification of the TDD UL/DL configuration may also be performed to the terminal device 1 having low processing capability, which is not able to monitor the second CSS.

The information indicating the ability of whether or not the terminal device is not able to monitor the second CSS may be notified in association with information indicating that the terminal device can be operated in the dual connectivity mode. That is, if the terminal device can be operated in the dual connectivity mode, the terminal device may monitor the second CSS.

The processes of the terminal device 1 and the base station device 3 in a case where the information indicating the activated/deactivated state of the secondary cell as the small cell is transmitted using the DCI format (PDCCH/EPDCCH accompanying by the DCI format) will be described.

One bit indicating the activated/deactivated state of each of the plurality of cells (small cell, secondary cell, and serving cell) may be set to a certain DCI format. For example, a case where the DCI format including the information indicating the activated/deactivated state is constituted by 15 bits may mean that as much information indicating the activated/deactivated state as 15 cells is included. That is, the activated/deactivated state is represented by one bit. The activated state being represented by one bit may be simultaneously recognized as the CSI request for the cell corresponding to one bit. When the activated state is represented by one bit, the CSI corresponding to one bit is transmitted in the first uplink subframe after a predetermined subframe after the CSI is received. Positions of the bits constituting the DCI format and a cell index (for example, serving cell index, small cell index, or ON/OFF cell index) may be previously correlated.

The DCI format may indicate only the activated state. For example, "1" in one bit indicates activation, and "0" indicates that the current state is the same as the previous state. In this case, it is preferable that another method of indicating the deactivated state such as the deactivation timer is also used.

The DCI format may indicate only the deactivated state. For example, "1" in one bit indicates deactivation, and "0" indicates that the current state is the same as the previous state. In this case, it is preferable that another method of indicating the activated state such as activation notification through the MAC CE is also used.

n bits indicating the activated/deactivated state of each of the plurality of cells (small cell, secondary cell, and serving cell) may be set to a certain DCI format. For example, a case where the DCI format including the information indicating the activated/deactivated state is constituted by 15 bits may mean that as much information indicating the activated/deactivated state as (15/n) cell is included. That is, the activated/deactivated state may be represented by n bits. For example, information notified in n bits is information of the activated/deactivated states of the cells of n subframes. Each bit of n bits corresponds to the subframe. Specifically, information notified in 8 bits is information indicating the activated/deactivated states of 8 subframes. For example, the information notified in n bits is information indicating subframe patterns in the activated/deactivated state. The subframe pattern in the activated/deactivated state may be previously determined. The subframe pattern in the activated/deactivated state may be notified in the higher layer. Specifically, information notified in 2 bits indicates four subframe patterns. A length of the bit indicating the activated/deactivated state is determined depending on the maximum number of the types of subframe patterns. The maximum number of the types of subframe patterns may be configured in the higher layer.

The PDCCH/EPDCCH including the information indicating the activated/deactivated state is scrambled by the RNTI (for example, SCE-RNTI) for indicating the activated/deactivated state. In a case where the decoding of a certain PDCCH/EPDCCH by the SCE-RNTI succeeds, the terminal device 1 recognizes that the information indicating the activated/deactivated state is included in the PDCCH/EPDCCH. Accordingly, even though the information indicating the activated/deactivated state is included in the same DCI format as that of another control information, the terminal device 1 can recognize that the information for indicating the activated/deactivated state is included.

The information indicating the activated/deactivated state of the secondary cell as the small cell may be combined with the DCI including another information scrambled with another RNTI. For example, the deactivated state of the cell may be indicated using the state of UL/DL configuration 7 in the dynamic TDD. In other words, UL/DL configurations 1 to 6 may indicate the activated state of the cell. For example, the activated/deactivated state of the cell may be indicated using extra bits other than the information indicating the UL/DL configuration in the dynamic TDD. For example, the activated/deactivated state of the cell may be indicated using the extra bits other than the information for notifying of the TPC command.

A field may be configured for the DCI format indicating the downlink grant/uplink grant, and information indicating the activated state of the secondary cell may be notified. For example, a 3-bit field indicating the serving cell is configured for the DCI format 4 or the DCI format 2D. The terminal device 1 recognizes that the serving cell indicated by the DCI format of the downlink grant/uplink grant is in the activated state.

The field may be configured for the DCI format indicating the downlink grant/uplink grant, and information indicating the deactivated state of the secondary cell may be notified. For example, a 3-bit field indicating the serving cell is configured for the DCI format 4 or the DCI format 2D. The terminal device 1 recognizes that the serving cell indicated by the DCI format of the downlink grant/uplink grant is in the deactivated state.

It is preferable that the activated/deactivated state is not indicated by the DCI format including the information indicating the activated/deactivated state over the plurality of cell groups. For example, the information indicating the activated/deactivated state corresponding to the secondary cell belonging to the master cell group and the information indicating the activated/deactivated state corresponding to the secondary cell belonging to the secondary cell group are not included in one DCI format. In other words, the information indicating the activated/deactivated state included in one DCI format corresponds to only the serving cell belonging to one cell group.

The DCI format including the information indicating the activated/deactivated state of the cell belonging to the master cell group is allocated to the first CSS of the primary cell. In terms of the processing load of the blind decoding, it is preferable that the DCI format including the information indicating the activated/deactivated state has the same number of bits as that of another DCI format allocated to the first CSS. Specifically, the bits of the DCI format including the information indicating the activated/deactivated state are padded such that the payload size of this DCI format becomes the same as that of the DCI format 0/1A/3/3A or the DCI format 1C, and this DCI format is allocated to the first CSS. The terminal device 1 monitors the CSS of the primary cell, and acquires the activated/deactivated states of the plurality of secondary cells (small cells) of the cell group to which the primary cell belongs by using the DCI format. Accordingly, it is easy to notify the plurality of terminal devices by using one PDCCH, and thus, overhead is reduced.

The DCI format including the information indicating the activated/deactivated state of the cell belonging to the secondary cell group is allocated to the SS of the primary secondary cell. It is preferable that the DCI format including the information indicating the activated/deactivated state of the cell belonging to the secondary cell group is allocated to the SS capable of being monitored by the plurality of terminal devices as the primary secondary cells. For example, the DCI format including the information indicating the activated/deactivated state of the cell belonging to the secondary cell group is allocated to the second CSS. In terms of the processing load of the blind decoding, it is preferable that the DCI format including the information indicating the activated/deactivated state has the same number of bits as that of another DCI format allocated to the second CSS. Specifically, the bits of the DCI format including the information indicating the activated/deactivated state are padded such that the payload size of this DCI format becomes the same as that of the DCI format 0/1A/3/3A or the DCI format 1C, and this DCI format is allocated to the CSS. The terminal device 1 monitors the second CSS of the primary secondary cell, and acquires the activated/deactivated states of the plurality of secondary cells (small cells) of the cell group to which the primary secondary cell belongs to by using the DCI format. Accordingly, it is easy to notify the plurality of terminal devices by using one PDCCH/EPDCCH, and thus, overhead is reduced.

The DCI format including the information indicating the activated/deactivated state of the cell may be allocated to the USS in the cell. In this case, the notification may be performed using 1-bit information indicating the activated/deactivated state.

The terminal device 1 may continue to recognize the activated/deactivated state indicated by the transmitted DCI format until the activated/deactivated state is indicated by the next DCI format indicating the activated/deactivated state of the cell. In this case, t is preferable that the DCI format indicating the activated/deactivated state of the cell is periodically transmitted. The cycle and timing (subframe) in which the DCI format indicating the activated/deactivated state is transmitted is notified to the terminal device 1. The cycle in which the DCI format indicating the activated/deactivated state is transmitted is for example, one radio frame (10 subframes) or one half frame (5 subframes). The timing in which the DCI format indicating the activated/deactivated state is transmitted is, for example, the subframe 0 or the subframe 5. The terminal device 1 can explicitly recognize the period during which the activated/deactivated state is recognized by periodically transmitting the DCI format.

The terminal device 1 may change the state such that the state is recognized as the deactivated state before the activated/deactivated state is indicated by the next DCI format indicating the activated/deactivated state of the cell. In this case, for example, a timer (small cell deactivation timer) for performing transition to the deactivated state is set, and the terminal device 1 recognizes the state as the deactivated state before the indication from the base station device 3 is received in a case where the timer exceeds.

The activated/deactivated state of each cell (neighbour cell or transmission point) having a transmission point different that of the serving cell may be indicated by the DCI format. In this case, it is preferable that the cell having a transmission point different from that of the serving cell is connected through low-delay backhaul such as an optical cable.

The ON/OFF cell PDCCH configuration is used to define the RNTI and index for indicating the activated/deactivated state of the small cell (or the secondary cell/serving cell equivalent to the small cell). The ON/OFF function of the small cell together with this configuration may be set up or released.

The ON/OFF cell PDCCH configuration may include the RNTI (for example, SCE-RNTI) indicating that the DCI format is the DCI format indicating the activated/deactivated state of the small cell (serving cell). The ON/OFF cell PDCCH configuration may include the list of the index of the small cell of which the activated/deactivated state is indicated by the DCI format. The activated/deactivated state may be notified to a specific small cell by this list. For example, in a case where a certain DCI format is constituted by 15 bits, the terminal device 1 may check the activated/deactivated state of only the bit corresponding to the index indicated by the list without checking the activated/deactivated states for all the bits. The terminal device may recognize that other bits are all in the deactivated state.

In a case where the DCI format including the information indicating the activated state of a certain cell is detected in a certain subframe (i=0, 1, 2, . . . ), the terminal device 1 recognizes that this cell is in the activated state in a subframe i+k (k is a predetermined value). The same process may be performed in the deactivated state. The value of k may be different between the activated state and the deactivated state.

In a case where the information indicating the activated/deactivated state is included in the first DCI format, the size of the first DCI format may be the same as the size of another DCI format. The sizes of the DCI formats are equal, and thus, new indication information can be configured without increasing the number of times the blind decoding is performed. In a case where the number (type) of transmitted control information items or the number of required bits are different between the first DCI format and the second DCI format, the bits that are not used as the control information may be padded.

In a case where the information indicating the activated/deactivated state us included in the first DCI format, bits other than the bits required for the information indicating the activated/deactivated state may be removed. That is, the size of the first DCI format may be increased or decreased if necessary.

In a case where the activated state is indicated by the information indicating the activated/deactivated state, the terminal device 1 may perform the CSI measurement on the cell of which the activated state is indicated, and may perform the CSI report in the first uplink subframe after a predetermined subframe.

In a case where the PDCCH/EPDCCH and the DRS are transmitted in the same subframe, the URS (or DMRS) may be transmitted in the same subframe in order to demodulate and decode the PDCCH/EPDCCH.

In a case where the PDCCH/EPDCCH and the DRS are transmitted in the same subframe, the terminal device 1 may demodulate and decode the PDCCH/EPDCCH by using the DRS (one of the plurality of signals constituting the DRS).

In a case where the configuration of the DRS is set to a certain cell through the higher layer signalling, if the measurement result does not satisfy a threshold in the measurement subframe of the DRS on a certain cell a predetermined number of times, the terminal device 1 may request the reconfiguration of the DRS by using the primary cell.

Hereinafter, the implicit OFF state (implicit deactivation) of the ON/OFF cell will be described.

The ON/OFF cell may be the same as the small cell.

In a case where the inter-cell interference is suppressed by performing the transition of the base station device 3 from the ON state (operating state or activated state) to the OFF state (deactivated state) (referred to as a case where the base station device 3 uses the ON/OFF cell for the sake of convenience in the description), it is assumed that the ON/OFF cell is in the OFF state before the OFF state timer associated with the ON/OFF state configured for the terminal device 1 expires.

The OFF state of the ON/OFF cell may be a state in which the terminal device 1 does not expect the downlink transmission from the base station device 3. That is, the OFF state may be a state in which at least one of the PSS/SSS, the CRS, the CSI-RS, the PBCH, the PDCCH, the EPDCCH, and the PDSCH is not transmitted. For example, the OFF state may be a state in which the PSS/SSS is not transmitted over one or more half frame (5 or more subframes). For example, the OFF state of the base station device 3 is a state in which only the DRS is transmitted.

The OFF state of the ON/OFF cell may be a state in which the terminal device 1 performs a process different from that in the terminal device of the related art, and the ON state of the ON/OFF cell may be a state in which the terminal device 1 can perform the same process as that in the terminal device of the related art.

In the OFF state of the ON/OFF cell, the terminal device 1 may perform the uplink transmission of the PUCCH or the PUSCH in the ON/OFF cell. That is, the ON/OFF cell may also perform the reception process in the OFF state.

In the OFF state of the ON/OFF cell, the terminal device 1 may not release (remove) the information associated with the ON/OFF cell. For example, in the OFF state of the ON/OFF cell, the terminal device 1 may retain the information associated with the ON/OFF cell, and may reuse the information associated with the ON/OFF cell when the ON/OFF cell is in the ON state.

The ON/OFF cell being in the OFF state and the ON/OFF cell being deactivated may be the same, and the deactivation of the ON/OFF cell may be the same as the deactivation (deactivation of the non-ON/OFF cell) of the related art.

The OFF state of the ON/OFF cell and the deactivation of the related art may be simultaneously performed.

If the base station device 3 notifies the terminal device 1 of the OFF state of the ON/OFF cell by the L1 signalling (DCI format) or the L2 signalling (MAC CE) whenever the ON/OFF cell performs transition from the ON state to the OFF state (the base station device 3 performs transition from the activated state to the deactivated state), the overhead of the control information is increased.

However, if the ON state/OFF state of the ON/OFF cell is notified to the terminal device 1 whenever the ON/OFF cell performs transition from the ON state to the OFF state, the terminal device 1 excessively consumes the battery in order to perform the operation such as the monitoring of the PDCCH in the ON/OFF cell in the OFF state until the OFF state timer of the cell in the OFF state expires.

Thus, in a case where the base station device 3 uses the ON/OFF cell, a case where the terminal device 1 implicitly determines (assumes) the OFF state of the ON/OFF cell and the terminal device 1 implicitly recognizes the ON/OFF cell determined (assumed) to be in the OFF state as the OFF state (implicit deactivation), or a case where the terminal device performs transition to the operation in a case where the communication with the ON/OFF cell in the OFF state is performed in the ON/OFF cell determined (assumed) to be in the OFF state is effective. For example, the operation in the case where the communication with the ON/OFF state in the OFF state is performed is an operation assumed that at least one of the PSS/SSS, the CRS, the CSI-RS, the PBCH, the PDCCH, the EPDCCH and the PDSCH is not transmitted. For example, the operation in the case where the communication with the ON/OFF cell in the OFF state is performed may be a state in which the terminal device 1 performs a process different from that of the terminal device of the related art. For example, the operation in the case where the communication with the ON/OFF cell in the OFF state is performed may be an operation in which the terminal device 1 performs only the uplink transmission of the PUCCH or the PUSCH.

The terminal device 1 may receive information indicating whether or not the cell configured for the terminal device 1 is the ON/OFF cell from the base station device 3. That is, the base station device 3 may transmit the information indicating whether or not the cell configured for the terminal device 1 is the ON/OFF cell to the terminal device 1.

An example of the implicit OFF state of the ON/OFF cell will be described.

The terminal device 1 reports the channel quality indicator (CQI)/precoding matrix indicator (PMI)/rank indicator (RI)/precoding type indicator (PTI) for the ON/OFF cell for which the ON state is configured. That is, in a case where the ON/OFF cell performs transition from the ON state to the OFF state, information associated with the calculation of the channel quality indicator (CQI)/precoding matrix indicator (PMI)/rank indicator (RI)/precoding type indicator (PTI) is measured until the OFF state timer associated with the ON/OFF cell expires or the OFF state of the ON/OFF cell is notified by the base station device 3.

In the ON/OFF cell in the OFF state, the reference signal (CRS, CSI-RS or DRS) used by the terminal device 1 to measure the information associated with the calculation of the channel quality indicator (CQI)/precoding matrix indicator (PMI)/rank indicator (RI)/precoding type indicator (PTI) is not transmitted in some cases. That is, if the terminal device 1 calculates the channel quality indicator (CQI)/precoding matrix indicator (PMI)/rank indicator (RI)/precoding type indicator (PTI) for the ON/OFF cell in the OFF state, a possibility that a specific channel quality indicator (CQI)/precoding matrix indicator (PMI)/rank indicator (RI)/precoding type indicator (PTI) is calculated becomes high. Thus, if the terminal device 1 calculates the specific channel quality indicator (CQI)/precoding matrix indicator (PMI)/rank indicator (RI)/precoding type indicator (PTI) a predetermined number of times or more in the ON/OFF cell for which the ON state is configured, the reference signal is not transmitted in the ON/OFF cell, that is, it is determined (assumed) that the base station device 3 is in the OFF state and it is recognized that the ON/OFF cell is in the OFF state (performs transition to an operation in a case where the communication with the ON/OFF cell in the OFF state is performed).

For example, in a case where "out of range (out of allowable range)" is calculated a predetermined number of times, in a case where "out of range (out of allowable range)" is calculated in subframes in which a predetermined number of subframes are continued a predetermined number of times, or in a case where "out of range (out of allowable range)" is successively calculated a predetermined number of times, the ON/OFF cell may be recognized as the OFF state (transition to the operation in which the communication with the ON/OFF cell in the OFF state is performed in the ON/OFF cell may be performed).

The predetermined number of subframes and the predetermined number of times with which the terminal device 1 determines the OFF state of the ON/OFF cell may be previously defined, or may be notified from the base station device 3.

An example of the implicit OFF state of the ON/OFF cell will be described.

The DRS is not transmitted in the ON/OFF cell in the OFF state in some cases. In a case where the DRS is not detected in the ON/OFF cell for which the ON state is configured or in a case where the reception power of the resource assumed that the DRS is transmitted does not a threshold, the terminal device 1 does not transmit the DRS in the ON/OFF state, that is, determines (assumes) that the base station device 3 is in the OFF state and recognizes that the ON/OFF cell is in the OFF state (performs transition to the operation in a case where the communication with the ON/OFF cell in the OFF state is performed in the ON/OFF cell).

For example, in a case where the DRS is not detected a predetermined number of times, in a case where the DRS is not detected in the subframes in which a predetermined number of subframes is continued a predetermined number of times, or in a case where the DRS is not successively detected a predetermined number of times, it may be recognized that the ON/OFF cell is in the OFF state (transition to the operation in a case where the communication with the ON/OFF cell in the OFF state in the ON/OFF cell may be performed).

The case where the RS is not detected is a case where the average power of the RE to which the RS is mapped does not exceed a threshold. The RE of which the power is calculated may be averaged over the plurality of subframes. The RE of which the power is calculated may be averaged only in a specific subframe. The RE of which the power is calculated may be averaged in a partial resource block having the system bandwidth, and may not be averaged in a partial resource block.

The subframe in which a part or all of the RSs is not present is notified to the terminal device 1. The terminal device 1 does not add the average of the power calculated for the RE in which the RS is not present in the subframe in which a part or all of the RSs is not present.

The predetermined number of subframes and/or the predetermined number of times with which the terminal device 1 determines the OFF state of the ON/OFF cell may be previously defined, or may be notified from the base station device 3.

In a case where the DRS is not detected, the determination may be performed based on the RSRP and/or RSRQ.

In a case where the DRS is not detected, the determination may be performed by comparing the average reception power of the subframe or the reception power of the resource assumed that the DRS is transmitted with a predetermined threshold. The predetermined threshold may be previously defined, or may be notified from the base station device 3.

A DRS pattern indicating the ON state and a DRS pattern indicating the OFF state may be independently defined, and in a case where the DRS pattern indicating the OFF state is detected, it may be recognized that the ON/OFF cell is in the OFF state (transition to the operation in a case where the communication with the ON/OFF cell in the OFF state in the ON/OFF cell may be performed). That is, the base station device 3 may transmit the DRS using a different DRS pattern between the ON state and the OFF state.

An example of the implicit OFF state of the ON/OFF cell will be described.

The CRS is not transmitted in the ON/OFF cell in the OFF state in some cases. In a case where the CRS is not detected in the ON/OFF cell for which the ON state is configured, or in a case where the reception power of the resource assumed that the CRS is transmitted does not a threshold, the terminal device 1 does not transmit the CRS in the ON/OFF cell, that is, determines (assumes) that the base station device 3 is in the OFF state and recognizes that the ON/OFF cell is in the OFF state (performs transition to the operation in a case where the communication with the ON/OFF cell in the OFF state is performed in the ON/OFF cell).

For example, in a case where the CRS is not detected a predetermined number of times, in a case where the CRS is not detected in the subframes in which a predetermined number of subframes are continued a predetermined number of times, in a case where the CRS is not successively detected a predetermined number of times, it may be recognized that the ON/OFF cell is in the OFF state (transition to the operation in which the communication with the ON/OFF cell in the OFF state is performed in the ON/OFF cell may be performed).

The predetermined number of subframes and/or the predetermined number of times with which the terminal device 1 determines the OFF state of the ON/OFF cell may be previously defined, or may be notified from the base station device 3.

In a case where the CRS is not detected, the determination may be performed based on the RSRP and/or the RSRQ.

In a case where the CRS is not detected, the determination may be performed by comparing the average reception power of the subframes or the reception power of the resource assumed that the CRS is transmitted with a predetermined threshold. The predetermined threshold may be previously defined, or may be notified from the base station device 3.

In a case where a CRS pattern indicating the ON state and a CRS pattern indicating the OFF state are independently defined and the CRS pattern indicating the OFF state is detected, it may be recognized that the ON/OFF cell is in the OFF state (transition to the operation in a case where the communication with the ON/OFF cell in the OFF state is performed in the ON/OFF cell may be performed). That is, the base station device 3 may transmit the CRS by using a CRS pattern between the ON state and the OFF state.

An example of the implicit OFF state of the ON/OFF cell will be described.

The terminal device 1 monitors the PDCCH/EPDCCH in the ON/OFF cell for which the ON state is configured. In a case where the PDCCH/EPDCCH is not successively detected over a predetermined number of subframes or more in the ON/OFF cell for which the ON state is configured, the terminal device 1 determines (assumes) that the base station device 3 is in the OFF state, and recognizes that the ON/OFF cell is in the OFF state (performs transition to the operation in a case where the communication with the ON/OFF cell in the OFF state is performed in the ON/OFF cell). That is, in a case where the PDCCH/EPDCCH is not successively detected over a predetermined number of subframes or more in the search space based on the value of the CIF associated with the ON/OFF cell for which the ON state is configured, the terminal device 1 determines (assumes) that the base station device 3 is in the OFF state, recognizes that the ON/OFF cell is in the OFF state (performs transition to the operation in a case where the communication with the ON/OFF cell in the OFF state is performed in the ON/OFF cell). That is, the base station device 3 does not arrange the PDCCH/EPDCCH in the search space based on the value of the CIF associated with the ON/OFF cell for which the OFF state is configured.

The predetermined number of subframes with which the terminal device 1 determines the OFF state of the ON/OFF cell may be previously defined, or may be notified from the base station device 3.

In a case where the PDCCH/EPDCCH is not detected, an error is not detected by a cyclic redundancy check (CRC) or the average reception power of the subframes is compared with a predetermined threshold, and thus, the determination may be performed. The predetermined threshold may be previously defined or may be notified from the base station device 3.

An example of the implicit OFF state of the ON/OFF cell will be described.

In a case where the PDCCH/EPDCCH indicating the downlink grant for the ON/OFF cell for which the ON state is configured or the uplink grant for the ON/OFF cell for which the ON state is configured in the ON/OFF cell for which the ON state is configured is not successively detected over a predetermined number of subframes or, the terminal device 1 determines (assumes) that the base station device 3 is in the OFF state, and recognizes that the ON/OFF cell in the OFF state (perform transition to the operation in a case where the communication with the ON/OFF cell in the OFF state is performed in the ON/OFF cell).

The predetermined number of subframes with which the terminal device 1 determines the OFF state of the ON/OFF cell may be previously defined, or may be notified from the base station device 3.

An example of the implicit OFF state of the ON/OFF cell will be described.

In a case where the PDCCH/EPDCCH indicating the downlink grant for the ON/OFF cell for which the ON state is configured or the uplink grant for the ON/OFF cell for which the ON state is configured is not successively detected over a predetermined number of subframes or more in the serving cell that schedules the ON/OFF cell for which the ON state is configured, the terminal device 1 determines (assumes) that the base station device 3 is in the OFF state, and recognizes that the ON/OFF cell is in the OFF state (perform transition to the operation in a case where the communication with the ON/OFF cell in the OFF state is performed in the ON/OFF cell). That is, in a case where the PDCCH/EPDCCH indicating the downlink grant for the ON/OFF cell for which the ON state is configured or the uplink grant for the ON/OFF cell for which the ON state is configured is not successively detected over a predetermined number of subframes or more in the search space based on the value of the CIF associated with the ON/OFF cell for which the ON state is configured, the terminal device 1 determines (assumes) that the base station device 3 is in the OFF state, and recognizes that the ON/OFF cell is in the Off state (performs transition to the operation in a case where the communication with the ON/OFF cell in the OFF state is performed in the ON/OFF cell). That is, the base station device 3 does not arrange the PDCCH/EPDCCH indicating the downlink grant for the ON/OFF cell for which the ON state is configured or the uplink grant for the ON/OFF cell for which the ON state is configured in the search space based on the value of the CIF associated with the ON/OFF cell for which the OFF state is configured.

The predetermined number of subframes with which the terminal device 1 determines the OFF state of the ON/OFF cell may be previously defined, or may be notified from the base station device 3.

An example of the implicit OFF state of the ON/OFF cell will be described.

In a case where discontinuous reception (DRX) is configured for the ON/OFF cell for which the ON state is configured, the terminal device 1 determines (assumes) that the base station device 3 is in the OFF state, and recognizes that the ON/OFF cell is in the OFF state (performs transition to the operation in a case where the communication with the ON/OFF cell in the OFF state is performed in the ON/OFF cell).

In a case where a parameter related to short DRX is configured, it is preferable that the terminal device 1 determines (assumes) that the base station device 3 is in the ON state and does not recognize that the ON/OFF cell in the OFF state (it is preferable that transition to the operation in a case where the communication with the ON/OFF cell in the OFF state is performed in the ON/OFF cell is not performed).

Discontinuous reception (DRX) for the ON/OFF cell may be independently configured for each ON/OFF cell.

A timer associated with duration of discontinuous reception (DRX) for the ON/OFF cell may be configured on a per subframe basis.

An example of the implicit OFF state of the ON/OFF cell will be described.

In the ON/OFF cell in the OFF state, the PHICH is not transmitted (the HARQ indicator (HARQ feedback or response information) indicating acknowledgement (ACK) or negative acknowledgement (NACK) for the uplink data (uplink shared channel: UL-SCH) transmitted by the terminal device 1 is not transmitted) in some cases. In a case where the PHICH is not detected in the ON/OFF cell for which the ON state is configured (the HARQ indicator (HARQ feedback or response information) indicating the acknowledgement (ACK) or negative acknowledgement (NACK) for the uplink data (uplink shared channel: UL-SCH) transmitted by the terminal device 1 is not detected), the terminal device 1 determines (assumes) that the base station device 3 is in the OFF state, and recognizes that the ON/OFF cell is in the OFF state (performs transition to the operation in a case where the communication with the ON/OFF cell in the OFF state is performed in the ON/OFF cell).

For example, in a case where the PHICH is not detected a predetermined number of times, in a case where the PHICH is not detected in the subframes in which a predetermined number of subframes are continued a predetermined number of times, or in a case where the PHICH is not successively detected a predetermined number of times, it may be recognized that the ON/OFF cell is in the OFF state (transition to the operation in a case where the communication with the ON/OFF cell in the OFF state is performed in the ON/OFF cell may be performed).

The predetermined number of subframes and/or the predetermined number of times with which the terminal device 1 determines the OFF state of the ON/OFF cell may be previously defined, or may be notified from the base station device 3.

In a case where the PHICH is not detected, the determination may be performed by comparing the average reception power of the subframes or the reception power of the resource assumed that the PHICH is transmitted with a predetermined threshold. The predetermined threshold may be previously defined, or may be notified from the base station device 3.

The example of the implicit OFF state of the ON/OFF cell is not limited to the case where the OFF state is individually performed, and two or more OFF states may be simultaneously performed, or may be simultaneously performed with another deactivation defined by the specifications.

The OFF state of the ON/OFF cell determined (assumed) to be in the OFF state (transition to the operation in a case where the communication with the ON/OFF cell in the OFF state is performed) may be applied to a radio frame and/or a subframe determined (assumed) to be in the OFF state, or may be applied to a radio frame and/or a subframe which is positioned after a predetermined number of radio frames or a predetermined number of subframes from the radio frame and/or the subframe determined (assumed) to be in the OFF state.

The predetermined number of radio frames or the predetermined number of subframes before the OFF state of the ON/OFF cell determined (assumed) to be in the OFF state is applied (transition to the operation in a case where the communication with the ON/OFF cell in the OFF state is performed) may be previously defined, or may be notified from the base station device 3.

Hereinafter, the implicit ON state (implicit activation) of the ON/OFF cell will be described.

The ON state of the base station device 3 is a state in which the terminal device 1 can perform the same process as that of the terminal device of the related art. A specific example of the ON state of the base station device 3 is as follows. The terminal device 1 expects to receive the PSS, the SSS and the PBCH. The terminal device 1 monitors the PDCCH and/or the EPDCCH in a predetermined subframe. The terminal device 1 performs the CSI reporting based on the configured CSI reporting mode. The terminal device 1 expects that the CSI reference resource and the reference signal (for example, CRS or CSI-RS) for the CSI reporting are present.

In the ON state of the ON/OFF cell, the terminal device 1 may use information which is retained in the OFF state and is associated with the ON/OFF cell again.

The ON/OFF cell being in the ON state and the ON/OFF cell being activated may be the same, or the activation of the ON/OFF cell may be the same as the activation (activation of the non-ON/OFF cell) of the related art.

The ON state of the ON/OFF cell and the activation of the related art may be simultaneously performed.

If the base station device 3 notifies the terminal device 1 of the ON state of the ON/OFF cell by the L1 signalling (DCI format) or the L2 signalling (MAC CE) whenever the ON/OFF cell performs transition to the ON state from the OFF state (the base station device 3 performs transition to the activated state from the deactivated state), the overhead of the control information is increased.

Thus, in a case where the base station device 3 uses the ON/OFF cell, a case where the terminal device 1 implicitly determines (assumes) the ON state of the ON/OFF cell and the terminal device 1 implicitly changes the ON/OFF cell determined (assumed) to be in the ON state to the ON state (implicit activation) or a case where the terminal device performs transition in a case where the communication with the ON/OFF cell in the ON state is performed is effective. For example, the operation in the case where the communication with the ON/OFF cell in the ON state may be an operation in which the terminal device 1 uses information which is retained in the OFF state of the ON/OFF cell and is associated with the ON/OFF cell again. The operation in the case where the communication with the ON/OFF cell in the ON state may be an operation in which the terminal device 1 can perform the same process as that in the terminal device of the related art.

The terminal device 1 may receive information indicating whether or not the cell configured for the terminal device 1 is the ON/OFF cell from the base station device 3. That is, the base station device 3 may transmit the information indicating whether or not the cell configured for the terminal device 1 is the ON/OFF cell to the terminal device 1.

An example of the implicit ON state of the ON/OFF cell will be described.

In the ON/OFF cell in the OFF state, the DRS is not transmitted in some cases, that is, the DRS is transmitted only in the ON state of the ON/OFF cell in some cases. In a case where the DRS is detected in the ON/OFF cell for which the OFF state is configured, or in a case where the reception power of the resource assumed that the DRS is transmitted exceeds a threshold, the terminal device 1 transmit the DRS in the ON/OFF cell, that is, determines (assumes) that the base station device 3 is in the ON state, and recognizes that the ON/OFF cell is in the ON state (performs transition to the operation in a case where the communication with the ON/OFF cell in the ON state is performed in the ON/OFF cell).

In a case where the DRS is detected, the determination may be performed based on the RSRP and/or the RSRQ.

In a case where the DRS is detected, the determination may be performed by comparing the average reception power of the subframes or the reception power of the resource assumed that the DRS is transmitted with a predetermined threshold. The predetermined threshold may be previously defined, or may be notified from the base station device 3.

A DRS pattern indicating the ON state and a DRS pattern indicating the OFF state may be independently defined, and in a case where the DRS pattern indicating the ON state is detected, it may be recognized that the ON/OFF cell is in the ON state (transition to the operation in a case where the communication with the ON/OFF cell in the ON state is performed in the ON/OFF cell may be performed). That is, the base station device 3 may transmit the DRS by using a different DRS pattern between the ON state and the OFF state.

An example of the implicit ON state of the ON/OFF cell will be described.

In the ON/OFF cell in the ON state, the DRS is not transmitted in some cases, that is, the DRS is transmitted only in the OFF state of the ON/OFF cell in some cases. In a case where the DRS is not detected in the ON/OFF cell for which the OFF state is configured, or in a case where the reception power of the resource assumed that the DRS is transmitted does not exceed a threshold, the terminal device 1 does not transmit the DRS in the ON/OFF cell, that is, determines (assumes) that the base station device 3 is in the ON state, and recognizes that the ON/OFF cell is in the ON state (performs transition to the operation in a case where the communication with the ON/OFF cell in the ON state is performed in the ON/OFF cell).

In a case where the DRS is not detected, the determination may be performed based on the RSRP and/or the RSRQ.

In a case where the DRS is not detected, the determination may be performed by comparing the average reception power of the subframes or the reception power of the resource assumed that the DRS is transmitted with a predetermined threshold. The predetermined threshold may be previously defined, or may be notified from the base station device 3.

An example of the implicit ON state of the ON/OFF cell will be described.

In the ON/OFF cell in the OFF state, the CRS is not transmitted in some cases, that is, the CRS is transmitted only in the ON state of the ON/OFF cell in some cases. In a case where the CRS is detected in the ON/OFF cell for which the OFF state is configured, or in a case where the reception power of the resource assumed that the CRS is transmitted exceeds a threshold, the terminal device 1 transmits the CRS in the ON/OFF cell, that is, determines (assumes) that the base station device 3 is in the ON state, and recognizes that the ON/OFF cell is in the ON state (performs transition to the operation in a case where the communication with the ON/OFF cell in the ON state is performed in the ON/OFF cell).

In a case where the CRS is detected, the determination may be performed based on the RSRP and/or the RSRQ.

In a case where the CRS is detected, the determination may be performed by comparing the average reception power of the subframes or the reception power of the resource assumed that the CRS is transmitted with a predetermined threshold. The predetermined threshold may be previously defined, or may be notified from the base station device 3.

A CRS pattern indicating the ON state and a CRS pattern indicating the OFF state are independently defined, and in a case where the CRS pattern indicating the ON state is detected, it may be recognized that the ON/OFF cell is in the ON state (transition to the operation in a case where the communication with the ON/OFF cell in the ON state is performed in the ON/OFF cell may be performed). That is, the base station device 3 may transmit the CRS by using a different CRS pattern between the ON state and the OFF state.

An example of the implicit ON state of the ON/OFF cell will be described.

In a case where the PDCCH/EPDCCH indicating the downlink grant for the ON/OFF cell for which the OFF state is configured or the uplink grant for the ON/OFF cell for which the OFF state is configured in the serving cell that schedules the ON/Off cell for which the OFF state is configured is detected, the terminal device 1 determines (assumes) that the base station device 3 is in the ON state, and recognizes that the ON/OFF cell is in the ON state (performs transition to the operation in a case where the communication with the ON/OFF cell in the ON state is performed in the ON/OFF cell).

It is preferable that the PDCCH/EPDCCH indicating the downlink grant for the ON/OFF cell for which the OFF state is configured or the uplink grant for the ON/OFF cell for which the OFF state is configured in the serving cell that schedules the ON/OFF cell for which the OFF state is configured is not allocated to the search space based on the carrier indicator field (CIF) associated with the ON/OFF cell for which the OFF state is configured (it is preferable that the PDCCH/EPDCCH is allocated to the search space based on the carrier indicator field (CIF) associated with the cell for which the ON state is configured).

It is preferable that the PDCCH/EPDCCH indicating the downlink grant for the ON/OFF cell for which the OFF state is configured or the uplink grant for the ON/OFF cell for which the OFF state is configured in the serving cell that schedules the ON/OFF cell for which the OFF state is configured is CRC-masked with the RNTI associated with the ON/OFF cell for which the OFF state is configured.

It is preferable that the PDCCH/EPDCCH indicating the downlink grant for the ON/OFF cell for which the OFF state is configured or the uplink grant for the ON/OFF cell for which the OFF state is configured in the serving cell that schedules the ON/OFF cell for which the OFF state is configured is a payload size including bit information related to the carrier indicator field (CIF) associated with the ON/OFF cell for which the OFF state is configured.

An example of the implicit ON state of the ON/OFF cell will be described.

In a case where the timer associated with the discontinuous reception (DRX) for the ON/OFF cell for which the OFF state is configured expires, the terminal device 1 determines (assumes) that the base station device 3 is in the ON state, and recognizes that the ON/OFF cell is in the ON state (performs transition to the operation in a case where the communication with the ON/OFF cell in the ON state is performed in the ON/OFF cell).

The discontinuous reception (DRX) for the ON/OFF cell may be independently configured for each ON/OFF cell.

The timer associated with the duration of the discontinuous reception (DRX) for the ON/OFF cell may be configured on a per subframe basis.

An example of the implicit ON state of the ON/OFF cell will be described.

In a case where the timer associated with the short DRX for the ON/OFF cell for which the OFF state is configured expires, the terminal device 1 determines (assumes) that the base station device 3 is in the ON state, and recognizes that the ON/OFF cell is in the ON state (performs transition to the operation in a case where the communication with the ON/OFF cell in the ON state is performed in the ON/OFF cell).

The short DRX for the ON/OFF cell may be independently configured for each ON/OFF cell.

The timer associated with the duration of the short DRX for the ON/OFF cell may be configured on a per subframe basis.

The example of the implicit ON state of the ON/OFF cell is not limited to the case where the ON state is individually performed, and two or more ON states may be simultaneously performed, or may be simultaneously performed with another activation defined by the specifications.

The ON state of the ON/OFF cell determined (assumed) to be in the ON state (transition to the operation in a case where the communication with the ON/OFF cell in the ON state is performed) may be applied to a radio frame and/or a subframe determined (assumed) to be in the ON state, or may be applied to a radio frame and/or a subframe which is positioned after a predetermined number of radio frames or a predetermined number of subframes from the radio frame and/or the subframe determined (assumed) to be in the ON state.

The predetermined number of radio frames or the predetermined number of subframes before the ON state of the ON/OFF cell determined (assumed) to be in the ON state is applied (transition to the operation in a case where the communication with the ON/OFF cell in the ON state is performed) may be previously defined, or may be notified from the base station device 3.

The implicit ON state and/or implicit OFF state of the ON/OFF cell may be performed in a case where the terminal device 1 waits for a predetermined function (capability or UE capability).

The implicit ON state and/or implicit OFF state of the ON/OFF cell may be performed by the terminal device 1 in a predetermined mode. For example, in a case where an implicit/explicit activation mode is defined, the implicit ON state and/or implicit OFF state of the ON/OFF cell may be performed in a case where the terminal device 1 is in the implicit mode. It is preferable that the switching of the implicit/explicit activation mode is notified using a R field reserved in the MAC CE, and it is preferable that a case where the R field is set to be "0" indicates the explicit activation mode and a case where the R field is set to be "1" indicates the implicit activation mode.

Hereinafter, the OFF state timer (OFF timer or small cell deactivation timer) of the ON/OFF cell will be described.

In a case where the indication of the ON state of the ON/OFF cell is received, the terminal device 1 starts or restarts the OFF state timer associated with the ON/OFF cell.

In a case where the PDCCH of the ON/OFF cell does not indicate the downlink grant or the uplink grant, in a case where the PDCCH of the serving cell that schedules the ON/OFF cell does not indicate the downlink grant for the ON/OFF cell or the uplink grant for the ON/OFF cell, or in a case where there is no indication of the PDCCH for the ON/OFF cell, the terminal device 1 counts up the OFF state timer associated with the ON/OFF cell (increases 1 or adds 1). In a case where the OFF state timer is present on a per radio frame basis, the timer counts up in all predetermined radio frames in a case where there is no indication of the PDCCH. In a case where the OFF state timer is present for a plurality of subframes, the timer counts up in all the plurality of subframes in a case where there is no indication of the PDCCH.

The OFF state timer may count up only in a specific subframe. In other words, the OFF state timer does not count up in the subframes other than the specific subframe. For example, the OFF state timer does not count up in the uplink subframe even though the timer satisfies the above-described condition. For example, the OFF state timer does not count in the MBSFN subframe even though the timer satisfies the above-described condition. For example, the OFF state timer does not count up in the subframe indicated in the higher layer even though the timer satisfies the above-described condition.

In a case where the OFF state timer associated with the ON/OFF cell expires, the terminal device 1 recognizes that the ON/OFF cell is in the OFF state.

In a case where the PDCCH of the ON/OFF cell indicates the downlink grant or the uplink grant, or in a case where the PDCCH of the serving cell that schedules the ON/OFF cell indicates the downlink grant for the ON/OFF cell or the uplink grant for the ON/OFF cell, the terminal device 1 starts or restarts the OFF state timer associated with the ON/OFF cell.

In a case where the indication of the OFF state of the ON/OFF cell is received, or in a case where the OFF state timer associated with the ON/OFF cell expires, the terminal device 1 stops the OFF timer associated with the ON/OFF cell.

The OFF state timer of the ON/OFF cell may be the same as the deactivation timer (timer associated with the duration of the cell). The OFF state timer of the ON/OFF cell may be a timer associated with the duration of the ON/OFF cell.

In a case where the inter-cell interference is suppressed using the ON/OFF cell, the ON state and the OFF state of the ON/OFF cell are dynamically switched depending on the position or traffic amount of the terminal device 1. As the switching speed between the ON state and the OFF state of the ON/OFF cell becomes higher, the adaptability for the position or traffic amount of the terminal device 1 becomes high.

The ON/OFF cell and/or the non-ON/OFF cell may be configured for the primary cell, may be configured for the secondary cell, or may be configured for the secondary cell (primary secondary cell or special cell) having a special function (for example, a function of the primary cell) among the secondary cells.

The ON state may be constantly configured for the ON/OFF cell and/or the non-ON/OFF cell.

That is, it is preferable that the ON/OFF cell and the non-ON/OFF cell are independently maintained in the terminal device 1. That is, an initial value of the OFF state timer associated with the ON/OFF cell and an initial value of the deactivation timer associated with the non-ON/OFF cell are independently configured.

An example of the configuration of the initial value of the OFF state timer will be described.

The initial value of the OFF state timer associated with the ON/OFF cell may be configured using a parameter of sCellDeactivationTimer-r12 from the higher layer (RRC layer), and the initial value of the deactivation timer associated with the non-ON/OFF cell may be configured using a parameter of sCellDeactivationTimer-r10 from the higher layer (RRC layer).

An example of the configuration of the initial value of the OFF state timer will be described.

The initial value of the OFF state timer associated with the ON/OFF cell and the initial value of the deactivation timer associated with the non-ON/OFF cell may be configured using two or more same parameters. For example, the initial value of the OFF state timer associated with the ON/OFF cell and the initial value of the deactivation timer associated with the non-ON/OFF cell may be configured using two or more parameters of sCellDeactivationTimer-r10.

An example of the configuration of the initial value of the OFF state timer will be described.

The initial value of the OFF state timer associated with the ON/OFF cell may be configured by replacing the initial value of the OFF state timer associated with the ON/OFF cell with the parameter of sCellDeactivationTimer-r10 associated with the initial value of the deactivation timer associated with the non-ON/OFF cell. For example, in a case where rf2 which is a value associated with the number of radio frames is configured for the parameter of sCellDeactivationTimer-r10, the initial value of the OFF state timer associated with the ON/OFF cell may be configured by being replaced with rf1.

The parameter of sCellDeactivationTimer-r10 associated with the initial value of the deactivation timer associated with the non-ON/OFF cell may be configured as the initial value of the OFF state timer associated with the ON/OFF cell.

It is preferable that at least one of rf2, rf4, rf8, rf16, rf32, rf64 and rf128 which are values associated with the number of radio frames is configured for the parameter of sCellDeactivationTimer-r12 and the parameter of sCellDeactivationTimer-r10. Here, rf2 corresponds to 2 radio frames, rf4 corresponds to 4 radio frames, rf8 corresponds to 8 radio frames, rf16 corresponds to 16 radio frames, rf32 corresponds to 32 radio frames, rf64 corresponds to 64 radio frames, and rf128 corresponds to 128 radio frames.

The values associated with the number of radio frames configured for the parameter of sCellDeactivationTimer-r12 and the parameter of sCellDeactivationTimer-r10 may be selected from different values. For example, it is preferable that at least one of rf2, rf4, rf8, rf16, rf32, rf64 and rf128 which are values associated with the number of radio frames is configured for the parameter of sCellDeactivationTimer-r10 and at least one of rf1, rf2, rf4, rf8, rf16, rf32 and rf64 which are values associated with the number of radio frames is configured for the parameter of sCellDeactivationTimer-r12. Here, rf1 corresponds to one radio frame, rf2 corresponds to 2 radio frames, rf4 corresponds to 4 radio frames, rf8 corresponds to 8 radio frames, rf16 corresponds to 16 radio frames, rf32 corresponds to 32 radio frames, rf64 corresponds to 64 radio frames, and rf128 corresponds to 128 radio frames.

The values configured for the parameter of sCellDeactivationTimer-r12 and the parameter of sCellDeactivationTimer-r10 may be selected from values associated with the number of subframes.

The initial value of the OFF state timer may be applied to a radio frame and/or a subframe in which the configuration is received, or may be applied to a radio frame and/or a subframe which is positioned after a predetermined number of radio frames or a predetermined number of subframes from the radio frame and/or the subframe in which the configuration is received.

In a case where an initial value of a second OFF state timer is configured for the terminal device 1 for which an initial value of a first OFF state timer is configured, the initial value may be applied to a radio frame and/or a subframe in which the configuration of the initial value of the second OFF state timer is received, or may be applied to a radio frame or a subframe which is positioned after a predetermined number of radio frames or a predetermined number of subframes from the radio frame and/or the subframe in which the configuration of the initial value of the second OFF state timer is received, or the initial value of the second OFF state timer may be ignored.

The predetermined number of radio frames or the predetermined number of subframes to which the initial value of the OFF state timer is applied may be previously defined, or may be notified from the base station device 3.

The initial value of the OFF state timer associated with the ON/OFF cell may be configured using the higher layer (RRC layer).

The initial value of the OFF state timer associated with the ON/OFF cell may be configured using the L1 signalling (for example, DCI format). For example, the initial value of the OFF state timer associated with the ON/OFF cell may be configured using the L1 signalling (for example, DCI format), and the initial value of the deactivation timer associated with the non-ON/OFF cell may be configured using the higher layer (RRC layer).

In a case where a plurality of ON/OFF cells is configured for the terminal device 1, as the initial value of the OFF state timer associated with the ON/OFF cell, a value common to the plurality of configured ON/OFF cells may be configured, individual values for the plurality of configured ON/OFF cells may be configured, or a value common to groups acquired by grouping the plurality of configured ON/OFF cells may be configured.

Hereinafter, the details of the CSI measurement and CSI reporting of the terminal device 1 will be described.

The CSI includes a channel quality indicator (CQI), a precoding matrix indicator (PMI), a precoding type indicator (PTI) and/or a rank indicator (RI). The RI indicates the number of transmission layers (the number of ranks). The PMI is information indicating a predefined precoding matrix. The PMI indicates one precoding matrix by using one information item or two information items. The PMI in a case where two information items are used is referred to as a first PMI and a second PMI. The CQI is information indicating the combination of a predefined modulation scheme and coding rate. The terminal device reports a recommended CSI to the base station device 3. The terminal device 2 reports the CQI that satisfies predetermined reception quality for each transport block (code word).

The subframe (reporting instances) in which the CSI reporting can be periodically performed is determined by a reporting cycle and a subframe offset based on the information (CQI PMI index or RI index) configured in the higher layer. The information configured in the higher layer can be configured for each subframe set configured in order to measure the CSI. In a case where only one information item is configured for a plurality of subframe sets, the information may be regarded as being common to the subframe sets.

One P-CSI reporting event to each serving cell is configured for the terminal device 2 configured in Transmission Modes 1 to 9 by the higher layer signalling.

One or more P-CSI reporting events to each serving cell are configured for the terminal device 2 configured in Transmission Mode 10 by higher layer signalling.

Eight CSI-RS ports are configured for the terminal device 2 configured in Transmission Mode 9 or 10, and a reporting mode (Mode 1-1) of a single PMI in a feedback CQI is configured in Submode 1 or Submode 2 using a certain parameter (PUCCH_format-1-1_CSI_reporting_mode) by the higher layer signalling.

The CQI reporting in a certain subframe of a certain serving cell for a UE-selected subband CQI is to report channel quality in a specific portion (a part) of a bandwidth of the serving cell indicated as a bandwidth part.

A CSI reporting type supports a PUCCH CSI reporting mode. The CSI reporting type is referred to as a PUCCH reporting type in some cases. Type 1 reporting supports CQI feedback for the UE-selected subband. Type 1a reporting supports a subband CQI and second PMI feedback. Type 2, type 2b and type 2c reporting events support a feedback CQI and PMI feedback. Type 2a reporting supports feedback PMI feedback. Type 3 reporting supports RI feedback. Type 4 reporting supports a feedback CQI. Type 5 reporting supports RI and feedback PMI feedback. Type 6 reporting supports RI and PTI feedback.

Hereinafter, the details of the CSI measurement and CSI reporting of the terminal device 1 in the base station device 3 that supports the ON state and the OFF state will be described.

Information related to the CSI measurement and CSI reporting is configured for the terminal device 1 from the base station device 3. The CSI measurement is performed based on the reference signal and/or the reference resource (for example, CRS, CSI-RS, CSI-IM resource and/or DRS). The reference signal used in the CSI measurement is determined based on the configuration of the transmission mode. The CSI measurement is performed based on the channel measurement and the interference measurement. For example, the channel measurement is to measure the power of a desired cell. The interference measurement is to measure the power and noise power in cells other than the desired cell.

As an example, the terminal device 1 performs the channel measurement and the interference measurement based on the CRS. As another example, the terminal device 1 performs the channel measurement based on the CSI-RS, and performs the interference measurement based on the CRS. As another example, the terminal device 1 performs the channel measurement based on the CSI-RS, and performs the interference measurement based on the CSI-IM resource. As another example, the terminal device 1 performs the channel measurement and the interference measurement based on the DRS.

The terminal device 1 may perform the CSI measurement in consideration of the ON state and the OFF state of the base station device 3. For example, the terminal device 1 may take account of the ON state and the OFF state of the base station device 3 for the reference signal and/or the reference resource for performing the CSI measurement. In the following description, the reference signal in the CSI measurement also includes the reference resource. Particularly, the reference signal for the interference measurement may be replaced with the resource to be referred to in order to perform the interference measurement. That is, a signal may not be mapped to the resource for performing the interference measurement. Thus, it is possible to determine whether the resource for performing the interference measurement is valid or invalid depending on the ON state and the OFF state of the base station device 3.

As an example, in the CSI measurement, the terminal device 1 assumes that the reference signal for the channel measurement is transmitted only in the ON state of the base station device 3 and the reference signal for the interference measurement is transmitted only in the ON state of the base station device 3. That is, the terminal device 1 assumes that the reference signal for the channel measurement is transmitted in the subframe in the ON state of the base station device 3 and the reference signal for the channel measurement is not transmitted in the subframe in the OFF state of the base station device 3. The terminal device 1 assumes that the reference signal for the interference measurement is transmitted in the subframe in the ON state of the base station device 3 and the reference signal for the interference measurement is not transmitted in the subframe in the OFF state of the base station device 3. In other words, the terminal device 1 performs the channel measurement based on the reference signal transmitted in a predetermined subframe of the subframes in the ON state of the base station device 3, and performs the interference measurement based on the reference signal transmitted in a predetermined subframe of the subframes in the ON state of the base station device 3. Accordingly, in the OFF state, the base station device 3 may stop the reference signal for the CSI measurement in the terminal device 1.

As another example, in the CSI measurement, the terminal device 1 assumes that the reference signal for the channel measurement is transmitted only in the ON state of the base station device 3 and the reference signal for the interference measurement is transmitted in the ON state and the OFF state of the base station device 3. That is, the terminal device 1 assumes that the reference signal for the channel measurement is transmitted in the subframe in the ON state of the base station device 3 and the reference signal for the channel measurement is not transmitted in the subframe in the OFF state of the base station device 3. The terminal device 1 assumes that the reference signal for the interference measurement is transmitted in the subframe of the ON state and the OFF state of the base station device 3. In other words, the terminal device 1 performs the channel measurement based on the reference signal transmitted in a predetermined subframe of the subframes in the ON state of the base station device 3, and performs the interference measurement based on the reference signal transmitted in a predetermined subframe of the subframes in the ON state and the OFF state of the base station device 3. Accordingly, in the OFF state, the base station device 3 may stop the reference signal for the channel measurement in the terminal device 1. Since the terminal device 1 can perform the interference measurement irrespective of the ON state or the OFF state of the base station device 3, in a case where the terminal device 1 performs a process such as averaging in a time direction in the interference measurement, it is possible to improve the accuracy of the process.

As another example, in the CSI measurement, the terminal device 1 assumes that the reference signal for the channel measurement is transmitted in the ON state and the OFF state of the base station device 3 and the reference signal the interference measurement is transmitted only in the ON state of the base station device 3. That is, the terminal device 1 assumes that the reference signal for the channel measurement is transmitted in the subframe in the ON state and the OFF state of the base station device 3. The terminal device 1 assumes that the reference signal for the interference measurement is transmitted in the subframe in the ON state of the base station device 3 and the reference signal for the interference measurement is not transmitted in the subframe in the OFF state of the base station device 3. In other words, the terminal device 1 performs the channel measurement based on the reference signal transmitted in a predetermined subframe of the subframes in the ON state and the OFF state of the base station device 3, and performs the interference measurement based on the reference signal transmitted in a predetermined subframe of the subframes in the ON state of the base station device 3. Accordingly, in the OFF state, the base station device 3 may stop the reference signal for the interference measurement in the terminal device 1. Since the terminal device 1 can perform the channel measurement irrespective of the ON state or the OFF state of the base station device 3, in a case where the terminal device 1 performs a process such as averaging in a time direction in the channel measurement, it is possible to improve the accuracy of the process.

As another example, in the CSI measurement, the terminal device 1 assumes that the reference signal for the channel measurement is transmitted in the ON state and the OFF state of the base station device 3 and the reference signal for the interference measurement is transmitted in the ON state and the OFF state of the base station device 3. That is, the terminal device 1 assumes that the reference signal for the channel measurement is transmitted in the subframe in the ON state and the OFF state of the base station device 3. The terminal device 1 assumes that the reference signal for the interference measurement is transmitted in the subframe in the ON state and the OFF state of the base station device 3. In other words, the terminal device 1 performs the channel measurement based on the reference signal transmitted in a predetermined subframe of the subframes in the ON state and the OFF state of the base station device 3, and performs the interference measurement based on the reference signal transmitted in a predetermined subframe of the subframes in the ON state and the OFF state of the base station device 3. Accordingly, in the OFF state, the base station device 3 can perform the CSI measurement in the terminal device 1 even in a case where the transmission of the signal and channel other than the reference is stopped. Since the terminal device 1 can perform the CSI measurement irrespective of the ON state or the OFF state of the base station device 3, in a case where the terminal device 1 performs a process such as averaging in a time direction in the interference measurement, it is possible to improve the accuracy of the process.

Hereinafter, a specific example of the reference signal for the channel measurement and the interference measurement will be described.

In the terminal device 1 for which a predetermined transmission mode is configured, the terminal device 1 performs the channel measurement for calculating the value of the CQI. The value of the CQI is reported in a predetermined subframe, and corresponds to a certain CSI process. The channel measurement is performed based on only a non-zero power CSI-RS of the configuration of the CSI-RS resource associated with the CSI process. In the CSI process, in a case where the RRC parameter related to the ON state and the OFF state is configured for the terminal device 1 for which a predetermined transmission mode is configured by the higher layer, the CSI-RS resource within the subframe in the ON state is used to perform the channel measurement.

In the terminal device 1 for which a predetermined transmission mode is configured, the terminal device 1 performs the channel measurement for calculating the value of the CQI. The value of the CQI is reported in a predetermined subframe, and corresponds to a certain CSI process. The channel measurement is performed based on only a non-zero power CSI-RS of the configuration of the CSI-RS resource associated with the CSI process. In the CSI process, in a case where the RRC parameter related to the ON state and the OFF state is configured for the terminal device 1 for which a predetermined transmission mode is configured by the higher layer, the CSI-RS resource within the subframe in the ON state and the OFF state is used to perform the channel measurement.

In the terminal device 1 for which a predetermined transmission mode is configured, the terminal device 1 performs the interference measurement for calculating the value of the CQI. The value of the CQI is reported in a predetermined subframe, and corresponds to a certain CSI process. The interference measurement is performed based on only a zero power CSI-RS of the configuration of the CSI-IM resource associated with the CSI process. In the CSI process, in a case where the CSI subframe set is configured for the terminal device 1 for which a predetermined transmission mode is configured by the higher layer, the CSI-IM resource within a subset of the subframe belonging to the CSI reference resource is used to perform the interference measurement. In the CSI process, in a case where the RRC parameter related to the ON state and the OFF state is configured for the terminal device 1 for which a predetermined transmission mode is configured by the higher layer, the CSI-RS resource within the subframe in the ON state is used to perform the interference measurement.

In the terminal device 1 for which a predetermined transmission mode is configured, the terminal device 1 performs the interference measurement for calculating the value of the CQI. The value of the CQI is reported in a predetermined subframe, and corresponds to a certain CSI process. The interference measurement is performed based on only the zero power CSI-RS of the configuration of the CSI-IM resource associated with the CSI process. In the CSI process, in a case where the CSI subframe set is configured for the terminal device 1 for which a predetermined transmission mode is configured by the higher layer, the CSI-IM resource within the subset of the subframe belonging to the CSI reference resource is used to perform the interference measurement. In the CSI process, in a case where the RRC parameter related to the ON state and the OFF state is configured for the terminal device 1 for which a predetermined transmission mode is configured by the higher layer, the CSI-RS resource within the subframe in the ON state and the OFF state is used to perform the interference measurement.

In the description of the present embodiment, the RRC parameter related to the ON state and the OFF state is configured in the higher layer. The configuration of the RRC parameter related to the ON state and the OFF state is also referred to as a configuration for the cell state information. The configuration for the cell state information is used for the cell state information which is explicitly or implicitly notified in the physical layer. For example, the configuration for the cell state information includes information required to receive the cell state information which is explicitly or implicitly notified in the physical layer. The configuration for the cell state information may be individually performed for each CSI process. The configuration for the cell state information may be individually performed for each CSI subframe set.

The CSI process is configured as information specific to the terminal device 1 in the higher layer. One or more CSI processes are configured for the terminal device 1, and the terminal device 1 performs the CSI measurement and the CSI reporting based on the configuration of the CSI process. For example, in a case where a plurality of CSI processes is configured, the terminal device 1 independently reports a plurality of CSIs based on these CSI processes. Each CSI process includes configuration for the cell state information, identity of the CSI process, configuration information related to the CSI-RS, configuration information related to the CSI-IM, a subframe pattern configured in order to perform the CSI reporting, configuration information related to periodic CSI reporting, and/or configuration information related to aperiodic CSI reporting. The configuration for the cell state information may be common to the plurality of CSI processes.

Hereinafter, the details of the CSI reference resource in a certain serving cell will be described.

The CSI reference resource is a resource used by the terminal device 1 to perform the CSI measurement. For example, the terminal device 1 measures the CSI in a case where the PDSCH is transmitted by using the group of downlink physical resource blocks indicated by the CSI reference resource. In a case where the CSI subframe set is configured in the higher layer, the CSI reference resource belongs to any one of the CSI subframe set, and does not belong to both the set of CSI subframes.

In a frequency direction, the CSI reference resource is defined by the group of downlink resource blocks corresponding to the band associated with the value of the required CQI.

In a layer direction (space direction), the CSI reference resource is defined by the RI and the PMI of which conditions are set by the required CQI. In other words, in the layer direction (space direction), the CSI reference resource is defined by the RI and the PMI assumed or generated when the CQI is required.

In a time direction, the CSI reference resource is defined by one predetermined downlink subframe. Specifically, the CSI reference resource is defined by a subframe which is positioned before a predetermined number of subframes earlier from the subframe in which the CSI is reported. The predetermined number of subframes that defines the CSI reference resource is determined based on the transmission mode, frame constituting type, the number of CSI processes to be configured, and/or the CSI reporting mode. For example, in a case where one CSI process and the periodical CSI reporting mode are configured for the terminal device 1, the predetermined number of subframes that defines the CSI reference resource is a minimum value of 4 or more among effective downlink subframes.

Hereinafter, the details of the effective downlink subframe will be described.

In a case where a part or all of the following conditions is satisfied, it is considered that the downlink subframe of a certain serving cell is effective. As one condition, the effective downlink subframe is the subframe in the ON state in the terminal device 1 for which the RRC parameter related to the ON state and the OFF state is configured. As one condition, the effective downlink subframe is configured as the downlink subframe in the terminal device 1. As one condition, the effective downlink subframe is not the multimedia broadcast multicast service single frequency network (MBSFN) subframe in a predetermined transmission mode. As one condition, the effective downlink subframe is not included in the range of the measurement gap configured for the terminal device 1. As one condition, the effective downlink subframe is an element or a part of the CSI subframe set linked to the periodical CSI reporting when the CSI subframe set is configured for the terminal device 1 in the periodical CSI reporting. As one condition, the effective downlink subframe is an element or a part of the CSI subframe set linked to the downlink subframe accompanying by the corresponding CSI request within the DCI format of the uplink in the aperiodic CSI reporting for the CSI process. In the condition, a predetermined transmission mode, a plurality of CSI processes, and a CSI subframe set for the CSI process are configured for the terminal device 1.

In a case where there is no effective downlink subframe for the CSI reference resource within a certain serving cell, the CSI reporting in the serving cell is excluded from the uplink subframe. That is, in the condition in which the effective downlink subframe is the subframe in the ON state, the terminal device 1 assumes that the subframe in the OFF state is not the effective downlink subframe.

In a case where the base station device 3 (serving cell) is in the OFF state, the terminal device 1 may assume that all the subframes including the subframe in the previous ON state are not the effective downlink subframes. That is, in a case where the base station device 3 (serving cell) is in the OFF state, the terminal device 1 assumes that the effective downlink subframe is a predetermined subframe after the subframe in the subsequent ON state or the subframe notified as being in the ON state.

The terminal device 1 may have a condition in which even the subframe in the OFF state is the effective downlink subframe. That is, the terminal device 1 may determine whether or not the subframe is the effective downlink subframe irrespective of the subframe in the ON state or the OFF state.

The terminal device 1 may have a condition in which the subframe in the ON state and a part of the subframes in the OFF state are the effective downlink subframe. The part of the subframes in the OFF state is a predetermined subframe that is previously defined, a predetermined subframe configured so as to be specific to the base station device 3, or a subframe configured so as to be specific to the terminal device 1. For example, the part of the subframes in the subframes in the OFF state is a subframe between a predetermined subframe and a subframe which is positioned before a predetermined number of subframes from the predetermined subframe. For example, the predetermined subframe is a subframe in the ON state or a subframe notified as being in the ON state. The predetermined subframe is a subframe in which the DCI format including the CSI request is received. The predetermined subframe is a subframe in which the CSI is reported.

Hereinafter, a specific example of the method of notifying of the cell state (ON state or OFF state) of the base station device 3 will be described.

The base station device 3 performs configuration related to the cell state information for the terminal device 1 through the RRC signaling. The base station device 3 notifies of the cell state by a predetermined method based on the configuration related to the cell state information configured for the terminal device 1. The cell state information is configured for the terminal device 1 from the base station device 3 through the RRC signaling. The terminal device 1 recognizes the cell state by a predetermined method based on the configuration related to the cell state information configured from the base station device 3.

As the method of notifying of the cell state, there is an explicit method or an implicit method. As an example, the cell state is explicitly notified based on the cell state information notified using the DCI transmitted by the PDCCH or the EPDCCH. For example, the terminal device 1 recognizes that the cell is in the ON state in a case where the cell state information indicates 1 and the cell is in the OFF state in a case where the cell state information indicates 0. As another example, the cell state is implicitly notified based on the presence or absence of the reference signal. The presence or absence of the reference signal is determined by comparing the reception power or the reception level of the reference signal with a predetermined threshold. As another example, the cell state is implicitly notified based on the procedure or configuration of the DRX. For example, the terminal device 1 recognizes that the cell is in the ON state in a non-DRX period and the cell is in the OFF state in a DRX period. As another example, the cell state is implicitly notified based on the activation or deactivation of the cell notified by the MAC layer. For example, the terminal device 1 recognizes that the cell is in the ON state in an activation period of the cell and the cell is in the OFF state in an activation period of the cell.

As the configuration related to the cell state, information used by the terminal device 1 to recognize the cell state is configured. For example, the configuration related to the cell state information includes subframe information, information related to the search space, and information related to the RNTI, as information used to receive or monitor the PDCCH or the EPDCCH in which the cell state information is notified. The configuration related to the cell state information includes information related to the reference signal, virtual cell identity, a predetermined threshold, and subframe information, as information used to recognize the presence or absence of the reference signal.

Hereinafter, the details of the recognition of the notification of the cell state in the terminal device 1 will be described.

As an example, the recognition of the notification of the cell state in the terminal device 1 is performed based on the cyclic redundancy check (CRC) added to the PDCCH or the EPDCCH including the DCI for notifying of the cell state information. For example, in a case where the value acquired by the cyclic redundancy check is not correct, the terminal device 1 determines that the notification of the cell state is not able to be recognized (detected).

As another example, the recognition of the notification of the cell state in the terminal device 1 is performed based on whether or not the reception power or reception level of the reference signal is within a range of a predetermined threshold. For example, if a first threshold and a second threshold greater than the first threshold are defined or configured and the reception power or reception level of the reference signal is within a range from the first threshold to the second threshold, the terminal device 1 determines that the notification of the cell state is not able to be recognized (detected). In a case where the reception power or reception level of the reference signal is less than the first threshold, the terminal device 1 determines that the cell is in the OFF state. In a case where the reception power or reception level of the reference signal is greater than the second threshold, the terminal device 1 determines that the cell is in the ON state.

A process (operation) in a case where the terminal device 1 is not able to recognize (detect) the notification of the cell state will be described.

As an example, in a case where the terminal device 1 is not able to recognize (detect) the notification of the cell state in a certain subframe, the terminal device 1 assumes that the cell is in the OFF state until the subframe in which the notification of the next cell state is performed. That is, the terminal device 1 performs the same process in a case where the OFF state is notified until the subframe in which the next cell state is notified.

As an example, in a case where the terminal device 1 is not able to recognize (detect) the notification of the cell state in a certain subframe, the terminal device 1 assumes that the cell is in the ON state until a subframe in which the notification of the next cell state is performed. That is, the terminal device 1 performs the same process in a case where the ON state is notified until the subframe in which the notification of the next cell state is performed.

As an example, in a case where the terminal device 1 is not able to recognize (detect) the detection of the cell state in a certain subframe, the terminal device 1 assumes that the cell is in a state different from the ON state or the OFF state until the subframe in which the next cell state is notified. That is, the terminal device 1 performs a process different from that in a case where the ON state or the OFF state is notified until the subframe in which the next cell state is notified.

For example, in a certain subframe in a state different form the ON state or the OFF state, the terminal device 1 assumes that the downlink subframe is in the ON state and the uplink subframe is in the OFF state. That is, the terminal device 1 receives or monitors a part or all of the downlink signals and/or channels, and does not transmit a part or all the uplink signals and/or channels. For example, the terminal device 1 receives the reference signal, monitors the PDCCH and/or monitors the EPDCCH, and does not perform the periodic CSI reporting and/or SRS transmission.

For example, in a subframe in a state different from the ON state or the OFF state, the terminal device 1 assumes that the downlink subframe is in the OFF state and the uplink subframe is in the ON state. That is, the terminal device 1 does not receive or monitor a part or all of the downlink signals and/or channels, and performs a part or all of the uplink signals and/or channels. For example, the terminal device 1 does not receive the reference signal, monitor the PDCCH and/or monitor the EPDCCH, and performs the periodical CSI reporting and/or SRS transmission.

For example, in a subframe in a state different from the ON state or the OFF state, the terminal device 1 monitors a predetermined PDCCH and/or EPDCCH different from that in the ON state. The predetermined PDCCH and/or EPDCCH are monitored in a predetermined search space different from that in the ON state. The CRC scrambled with a predetermined RNTI different that in the ON state is added to the predetermined PDCCH and/or EPDCCH.

Although it has been described above that in a case where the terminal device 1 is not able to recognize (detect) the notification of the cell state in a certain subframe, the terminal device 1 assumes that the cell is in a predetermined state until the subframe in which the next cell state is notified, the present invention is not limited thereto. For example, in a case where the terminal device 1 is not able to recognize (detect) the detection of the cell state in a certain subframe, the terminal device 1 may assume that the cell is in a predetermined state until a subframe in which a cell state indicated by the notification of the next cell state is applied. Accordingly, the subframe in which the cell state is notified and the subframe in which the cell state indicated by this notification is applied may be independently defined or configured.

The various methods, procedures, configurations and/or processes described in the present embodiment may be independent between the Pcell and the pScell in the dual connectivity.

The terminal device 1 according to the above-described embodiment may support a function (ul-CoMP) of performing uplink CoMP.

The terminal device 1 according to the above-described embodiment may support a function (supportedBandCombination or supportedBandListEUTRA) of performing band combination (CA or non-CA).

The terminal device 1 according to the above-described embodiment may support a function (crossCarrierScheduling) of performing cross carrier scheduling.

The terminal device 1 according to the above-described embodiment may support a function (multipleTimingAdvance) of multiple timing advances.

The terminal device 1 according to the above-described embodiment may support a CSI process function.

The terminal device 1 according to the above-described embodiment may support a function of performing communication using cells (a plurality of cells) of different TDD UL-DL configurations.

The terminal device 1 according to the above-described embodiment may support a function of performing eIMTA.

The terminal device 1 according to the above-described embodiment may support a function of performing communication using the small cell.

The terminal device 1 according to the above-described embodiment may support a function (dual-connectivity) of simultaneously performing communication with a plurality of base station devices.

The terminal device 1 according to the above-described embodiment may support a function of performing communication using cell (a plurality of cells) of different frame structure types.

The terminal device 1 according to the above-described embodiment may support a function of simultaneously performing transmission and reception.

The terminal device 1 according to the above-described embodiment may support a function of receiving the EPDCCH.

The terminal device 1 according to the above-described embodiment may transmit information (UE-EUTRA-capability or FeatureGroupIndicator) indicating the supported function to the base station device 3.

In the above-described embodiment, the PDCCH subframe may be defined as the subframe accompanying by EPDCCH (EnhancedPDCCH) or R-PDCCH (Relay-PDCCH) in addition to being defined as the subframe accompanying by the PDCCH.

From the details of the above-described embodiment, it is possible to improve transmission efficiency in the wireless communication system in which the base station device 3 and the terminal device 1 communicate.

The programs operated in the base station device 3 and the terminal device 1 according to the present invention may be programs (causing a computer to function) for controlling a central processing unit (CPU) such that the functions of the above-described embodiments according to the present invention are realized. The information treated in these devices is temporarily accumulated in a random access memory (RAM) at the time of the processing, and then is stored in various ROMs such as flash read-only memory (ROM) or hard disk drive (HDD). When necessary, the information is read by the CPU, and is modified or rewritten.

A part of the terminal device 1 and the base station device 3 according to the above-described embodiment may be realized as a computer. In this case, the program for realizing the control function may be recorded in a computer-readable recording medium, and the program recorded in the recoding medium may be realized by being read and executed in a computer system.

It is assumed that the "computer system" mentioned herein is a computer system built into the terminal device 1 or the base station device 3, and includes OS or hardware such as peripheral devices. The "computer-readable recording medium" refers to a portable medium such as a flexible disk, a magneto-optical disk, a ROM or a CD-ROM, and a storage device such as a hard disk built into the computer system.

The "computer-readable recording medium" may include a medium that dynamically retains programs for a short period of time such as a communication line in a case where programs are transmitted via a network such as the Internet or a communication circuit such as a telephone line, and a medium that retains programs for a regular period of time such as a volatile memory within the computer system which is a server or a client in this case. The program may be used to realize a part of the above-described functions, or may be realized by a combination of the above-described functions and programs already recorded in the computer system.

The base station device 3 according to the above-described embodiment may be realized as an aggregate (device group) constituted by a plurality of devices. Each of the devices constituting the device group may include a part or all of the functions or functional blocks of the base station device 3 according to the above-described embodiment. The device group may have the general functions or functional blocks of the base station device 3. The terminal device 1 according to the above-described embodiment may communicate with the base station device 3 as the aggregate.

The base station device 3 according to the above-described embodiment may be Evolved Universal Terrestrial Radio Access Network (EUTRAN). The base station device 3 according to the above-described embodiment may have a part or all of the functions of the higher node for the eNodeB.

A part or all of the terminal device 1 and the base station device 3 according to the above-described embodiment may be typically realized as LSI which is an integrated circuit, or may be realized as a chipset. The functional blocks of the terminal device 1 and the base station device 3 may be individually realized as a chip, or a part or all thereof may be realized as a chip by being integrated. The method of realizing the devices or functional blocks as the integrated circuit is not limited to the LSI, and a dedicated circuit or a general-purpose processor may be used. In a case where a technology of realizing the devices or functional blocks as the integrated circuit has appeared instead of the LSI due to the advance of semiconductor technology, it is possible to use an integrated circuit produced using this technology.

Although it has been described in the embodiment that the terminal device is used as an example of the terminal device or the communication device, the present invention is not limited thereto. The present invention may also be applied to terminal devices or communication devices of stationary or non-movable electronic devices which are installed indoors or outdoors, such as AV devices, kitchen devices, cleaning and washing machines, air conditioners, office devices, vending machines, and other home appliances.

CONCLUSION (1) In order to achieve the above-described object, the present invention provides the following means. That is, a terminal device according to the present embodiment is a terminal device including: a reception unit that receives PDCCH; and a channel measurement unit that measures CSI based on a CSI reference resource defined by one effective downlink subframe. It is expected that a subframe indicated by the PDCCH is the effective downlink subframe.

(2) In the terminal device according to the present embodiment, it is not expected that a subframe which is not indicated by the PDCCH is the effective downlink subframe.

(3) In the terminal device according to the present embodiment, the PDCCH includes information indicating one subframe or a plurality of successive subframes.

(4) In the terminal device according to the present embodiment, the PDCCH is allocated to a common search space.

(5) In the terminal device according to the present embodiment, the PDCCH includes information indicating a subframe for a plurality of serving cells.

(6) In the terminal device according to the present embodiment, the subframe indicated by the PDCCH is a subframe associated with a subframe in which the PDCCH is received.

(7) A base station device according to the present embodiment is a base station device including: a transmission unit that transmits PDCCH. A CSI reference resource is defined by one effective downlink subframe, and the effective downlink subframe is indicated by the PDCCH.

(8) In the base station device according to the present embodiment, the PDCCH includes information indicating one subframe or a plurality of successive subframes.

(9) In the base station device according to the present embodiment, the PDCCH is allocated to a common search space.

(10) In the base station device according to the present embodiment, the PDCCH includes information indicating a subframe for a plurality of serving cells.

(11) In the base station device according to the present embodiment, a subframe indicated by the PDCCH is a subframe associated with a subframe in which the PDCCH is transmitted.

(12) A communication method according to the present embodiment is a communication method of a terminal device. The method includes: a step of receiving PDCCH; and a step of measuring CSI based on a CSI reference resource defined by one effective downlink subframe. It is expected that a subframe indicated by the PDCCH is the effective downlink subframe.

(13) A communication method according to the present embodiment is a communication method in a base station device. The method includes: a step of transmitting PDCCH. A CSI reference resource is defined by one effective downlink subframe, and the effective downlink subframe is indicated by the PDCCH.

(14) An integrated circuit according to the present embodiment is an integrated circuit mounted in a terminal device. The integrated circuit is adapted to have: a function of receiving PDCCH; and a function of measuring CSI based on a CSI reference resource defined by one effective downlink subframe. It is expected that a subframe indicated by the PDCCH is the effective downlink subframe.

(15) An integrated circuit according to the present embodiment is an integrated circuit mounted in a base station device. The integrated circuit is adapted to have: a function of transmitting PDCCH. A CSI reference resource is defined by one effective downlink subframe, and the effective downlink subframe is indicated by the PDCCH.

The embodiments of the present invention have been described with reference to the drawings. However, the detailed structure is not limited to the above-described embodiments, and the present invention also includes a change in the design within the gist of the invention. The present invention may be variously changed without departing from the claims, and embodiments acquired by appropriately combining technical means disclosed in different embodiments are included in the technical range of the present invention. The elements described in the respective embodiments and structures acquired by replacing the elements that exhibit the same effects are included therein.

REFERENCE SIGNS LIST

1(1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Subframe configuration unit
1015 Scheduling information interpretation unit
1017 CSI report control unit
3011 Radio resource control unit
3013 Subframe configuration unit
3015 Scheduling unit
3017 CSI report control unit
1301 Measurement unit
13011 Layer 1 filtering unit
13012 Layer 3 filtering unit
13013 Report criteria evaluation unit

The invention claimed is:

1. A user equipment comprising:
a receiver configured to detect a Physical Downlink Control Channel (PDCCH) and to perform a measurement for computing a Channel Quality Indicator (CQI) value, wherein
the receiver detects the PDCCH with Downlink Control information (DCI) with a Cyclic Redundancy Check (CRC) scrambled by a Radio Network Temporary Identifier (RNTI) according to a DCI format 1C on a serving cell,
the reciever does not use a subframe n for Channel State Information (CSI) measurement in a case that the receiver does not detect the PDCCH in a subframe n−1 and the subframe n.

2. The user equipment according to claim 1, wherein
the user equipment use a subframe n for CSI measurement in a case that the receiver detect the PDCCH in the subframe n.

3. The user equipment according to claim 1, wherein
a field in the DCI indicates a configuration in subframes.

4. The user equipment according to claim 3, wherein
the configuration means the user equipment assumes that the subframes are used for transmission of a downlink physical channel or a downlink physical signal.

5. The user equipment according to claim 1, wherein
the RNTI is common value among user equipments.

6. The user equipment according to claim 1, wherein
the receiver monitors candidates of the PDCCH at both aggregation level 4 and 8.

7. The user equipment according to claim 6, wherein
the candidates of the PDCCH include an control channel elements numbered 0, 1, 2, and 3.

8. The user equipment according to claim 1, wherein
the serving cell is a secondary cell.

9. A communication method of a user equipment, comprising:
a receiving step of detecting a Physical Downlink Control Channel (PDCCH), and
a measuring step of performing a measurement for computing a Channel Quality Indicator (CQI) value, wherein
in the receiving step, the PDCCH with Down Control Information (DCI) with a Cyclic Redundancy Check (CRC) scrambled by a Radio Network Temporary identifier (RNTI) according to a DCI format 1C on a serving cell is detected, in the measuring step, in a case that, in the receiving step, the PDCCH is not detected in a subframe n−1 and a subframe n, the subframe n is not used for Channel State information (CSI)measurement.

* * * * *